United States Patent [19]
Murata et al.

[11] Patent Number: 5,870,101
[45] Date of Patent: Feb. 9, 1999

[54] IMAGE SYNTHESIZING SYSTEM WITH TEXTURE MAPPING

[75] Inventors: Hiroyuki Murata, Tokyo; Takashi Yokota, Yokohama; Katsuhiro Miura, Ichikawa, all of Japan

[73] Assignee: Namco Ltd., Tokyo, Japan

[21] Appl. No.: 774,320

[22] Filed: Dec. 24, 1996

Related U.S. Application Data

[63] Continuation of Ser. No. 211,398, Apr. 1, 1994, Pat. No. 5,621,867.

[30] Foreign Application Priority Data

Aug. 26, 1992 [JP] Japan .................................. 4-252139

[51] Int. Cl.⁶ .................................................. G06T 11/40
[52] U.S. Cl. ............................................................ 345/430
[58] Field of Search ...................................... 345/430, 425, 345/437, 505, 526

[56] References Cited

U.S. PATENT DOCUMENTS

| | | | |
|---|---|---|---|
| 3,887,763 | 6/1975 | Hinoshita et al. | 348/425 |
| 3,889,107 | 6/1975 | Sutherland | 345/425 |
| 4,594,673 | 6/1986 | Holly | 345/421 |
| 4,697,178 | 9/1987 | Heckel | 345/422 |
| 4,819,192 | 4/1989 | Kuragano et al. | 345/421 |
| 4,847,789 | 7/1989 | Kelly et al. | 345/421 |
| 5,075,876 | 12/1991 | Seki et al. | 345/421 |
| 5,086,496 | 2/1992 | Mulmuley | 345/421 |
| 5,125,074 | 6/1992 | Labeaute et al. | 345/421 |
| 5,179,638 | 1/1993 | Dawson et al. | 345/421 |
| 5,224,208 | 6/1993 | Miller, Jr. et al. | 345/425 |
| 5,280,568 | 1/1994 | Obata | 345/421 |
| 5,283,860 | 2/1994 | Einkauf et al. | 345/434 |
| 5,361,386 | 11/1994 | Watkins et al. | 345/430 |
| 5,546,530 | 8/1996 | Grimaud et al. | 345/502 |

FOREIGN PATENT DOCUMENTS

| | | |
|---|---|---|
| 49-29718 | 3/1974 | Japan . |
| 60-246481 | 12/1985 | Japan . |
| 60-250479 | 12/1985 | Japan . |
| 60-256880 | 12/1985 | Japan . |
| 62-186373 | 8/1987 | Japan . |
| 63-80375 | 4/1988 | Japan . |
| 1-131976 | 5/1989 | Japan . |
| 2-308376 | 12/1990 | Japan . |
| 2181929 | 4/1987 | United Kingdom . |
| 2194656 | 3/1988 | United Kingdom . |
| 2259432 | 3/1993 | United Kingdom . |

OTHER PUBLICATIONS

Foley et al., Computer Graphics: Principles and Practice, pp. 871–873, 887–890, 1990.

Molnar et al., PixelFlow: High Speed Rendering Using Image Composition, Computer Graphics, pp. 231–240, Jul. 1992.

Foley et al. "Viewing in 3D" and Scan–Line Algorithms, Computer Graphics: Principles and Practice, Second Edition, 1990 pp. 266–271 & 680–685.

Takeshi Shibamoto et al., "Texture Mapping (1)" *The Collected Papers of Thirty First Information Processing Institute Lecture*, Information Processing Institute, Sep. 9, 1985, pp. 1703–1704.

Primary Examiner—Anton Fetting
Attorney, Agent, or Firm—Oliff & Berridge, PLC

[57] ABSTRACT

An image synthesizing system is provided which can output a high-quality image in real time through the texture mapping without preventing the hardware from being increased in speed and reduced in scale. A 3-D image is formed by a game space processing unit (13) and image supply unit (10) to perform a 3-D computation. At a processor unit (30), coordinates for each dot in a polygon and the corresponding texture coordinates are determined. A field buffer unit (40) stores the texture coordinates at an address specified by the coordinates for each dot. A texture data storage unit (42) has stored a rendering data. The texture coordinates are read out from the field buffer unit (40) and then used to read out the rendering data from the texture coordinate storage unit (42) to synthesize and output a pseudo 3-D image. By thus storing the texture coordinates in the field buffer unit (40), the subsampling/interpolation and the like may be carried out.

14 Claims, 46 Drawing Sheets

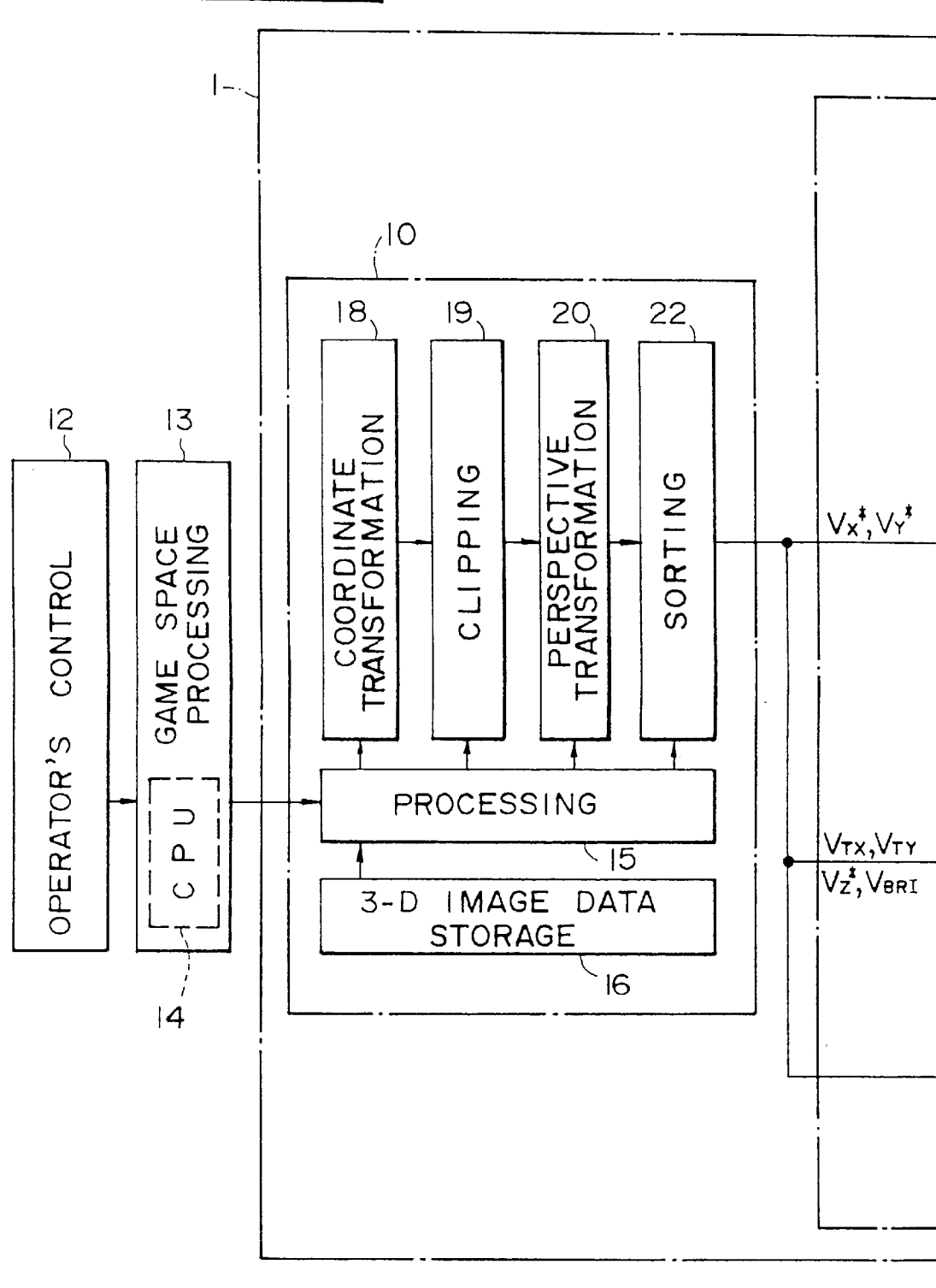

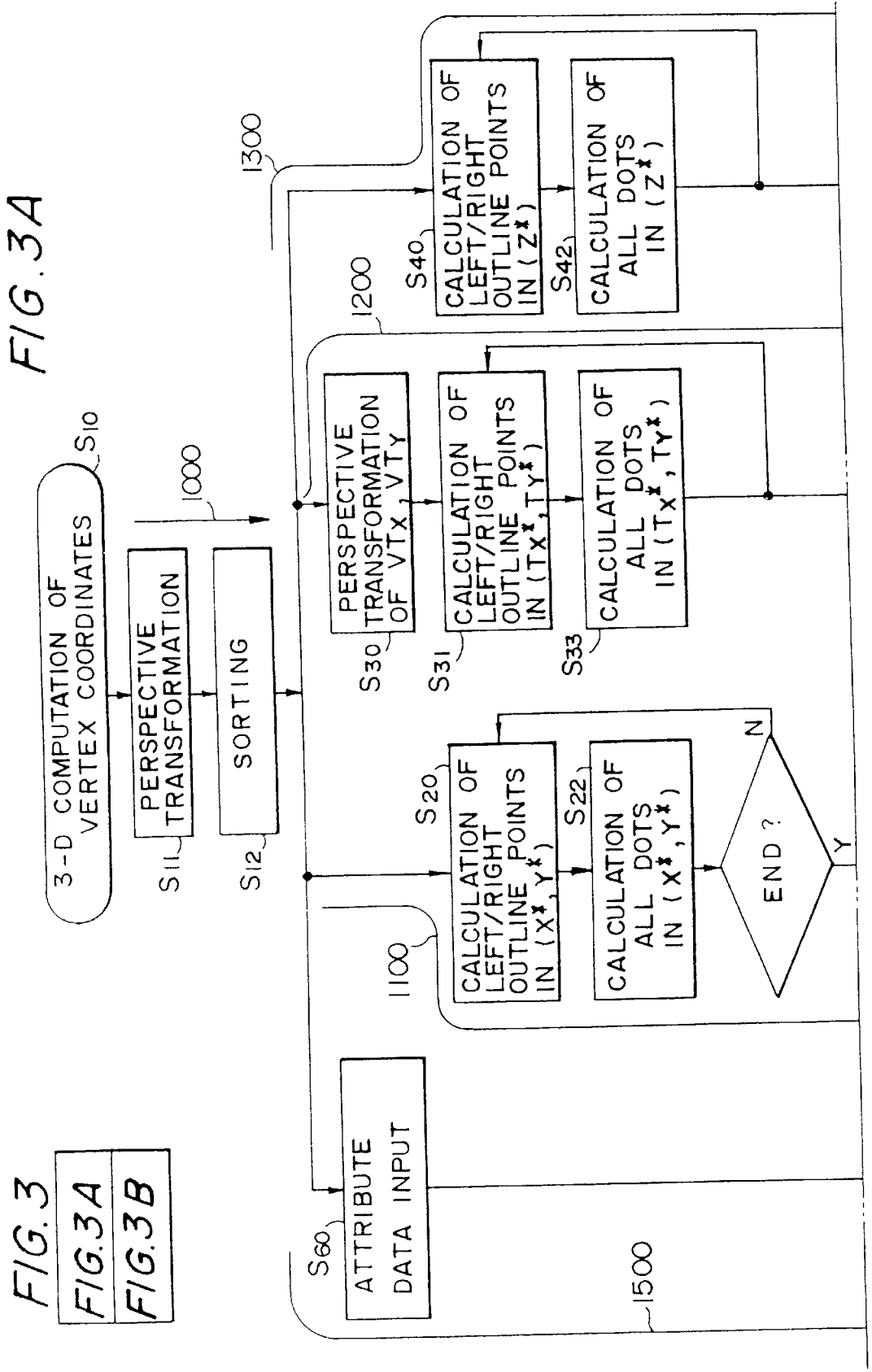

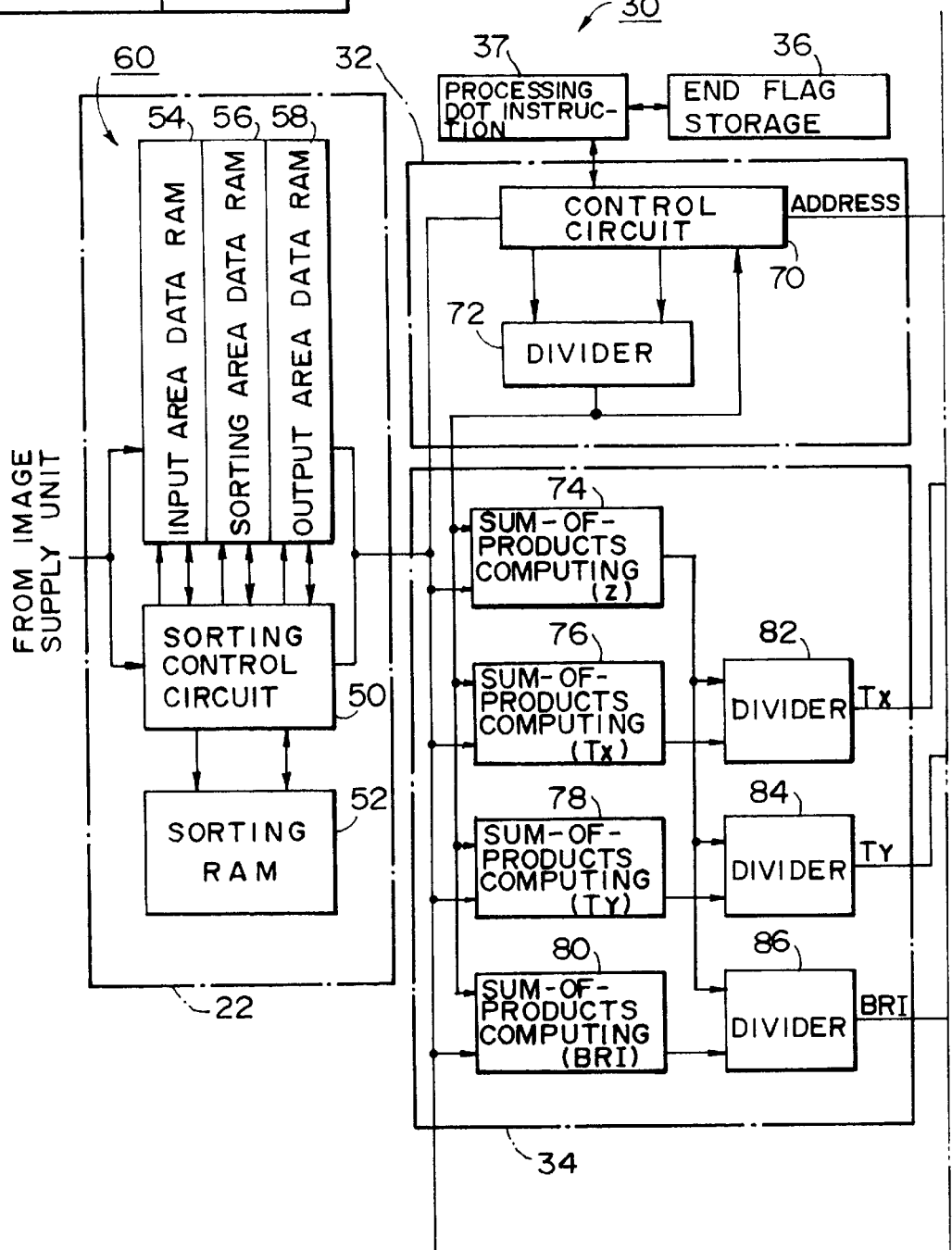

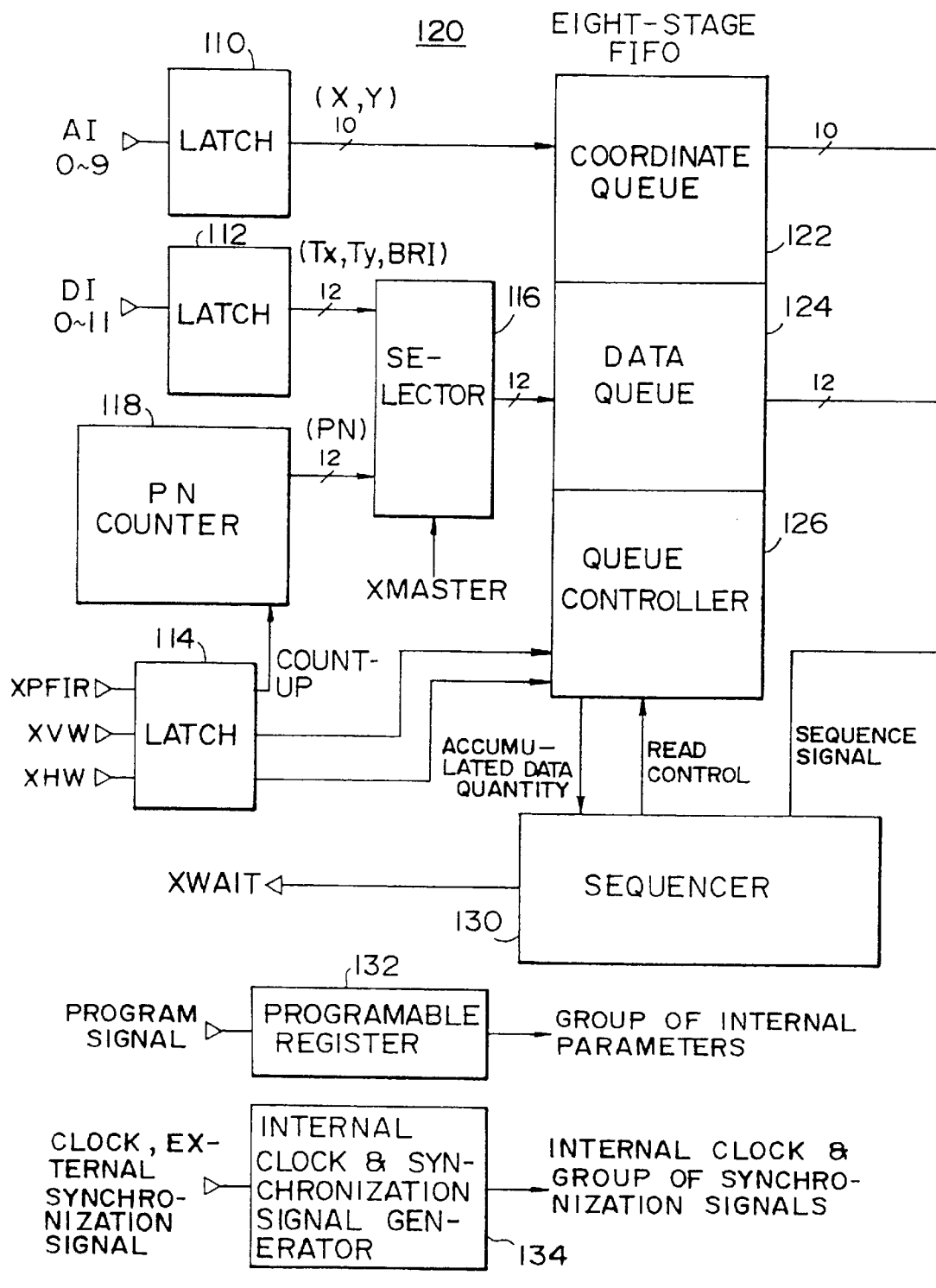

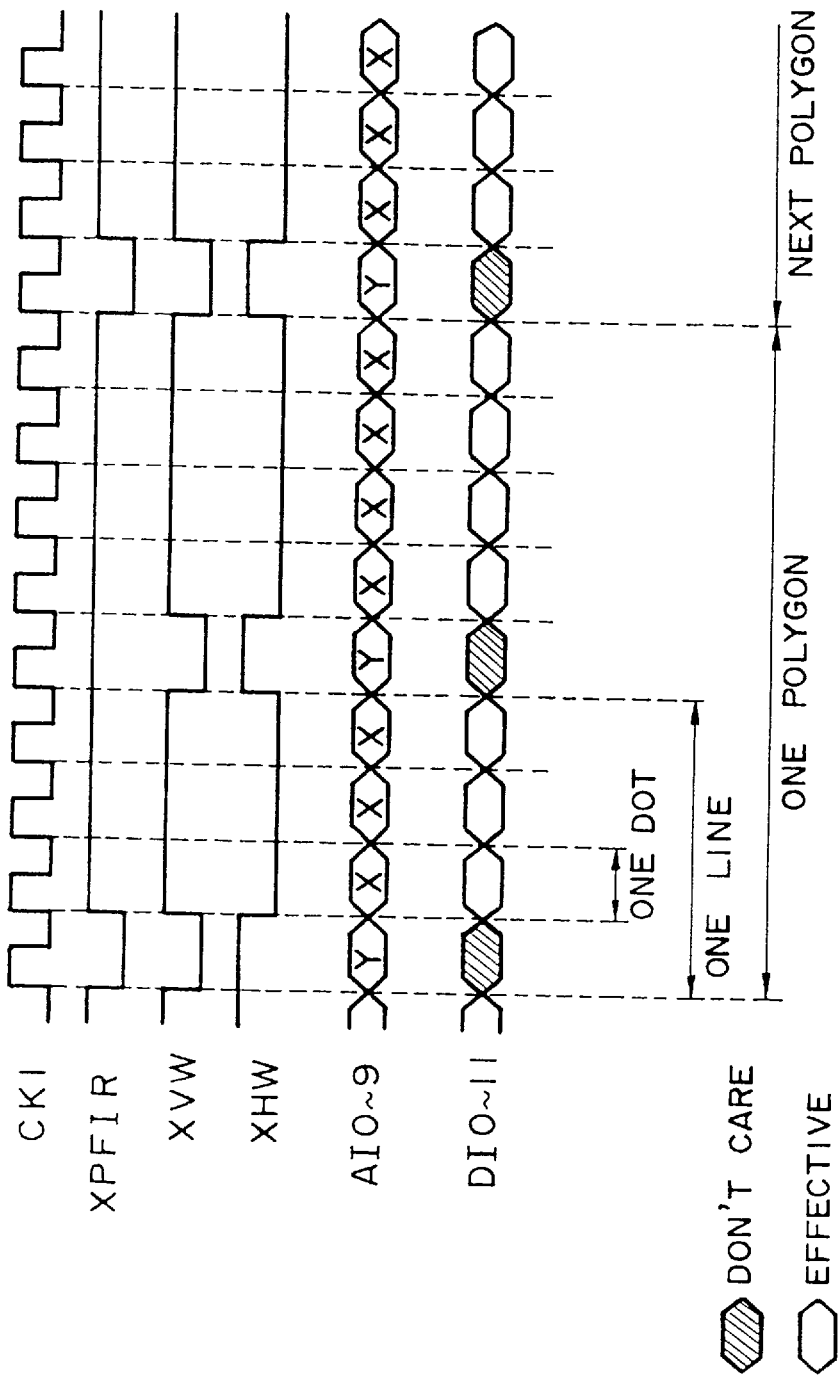

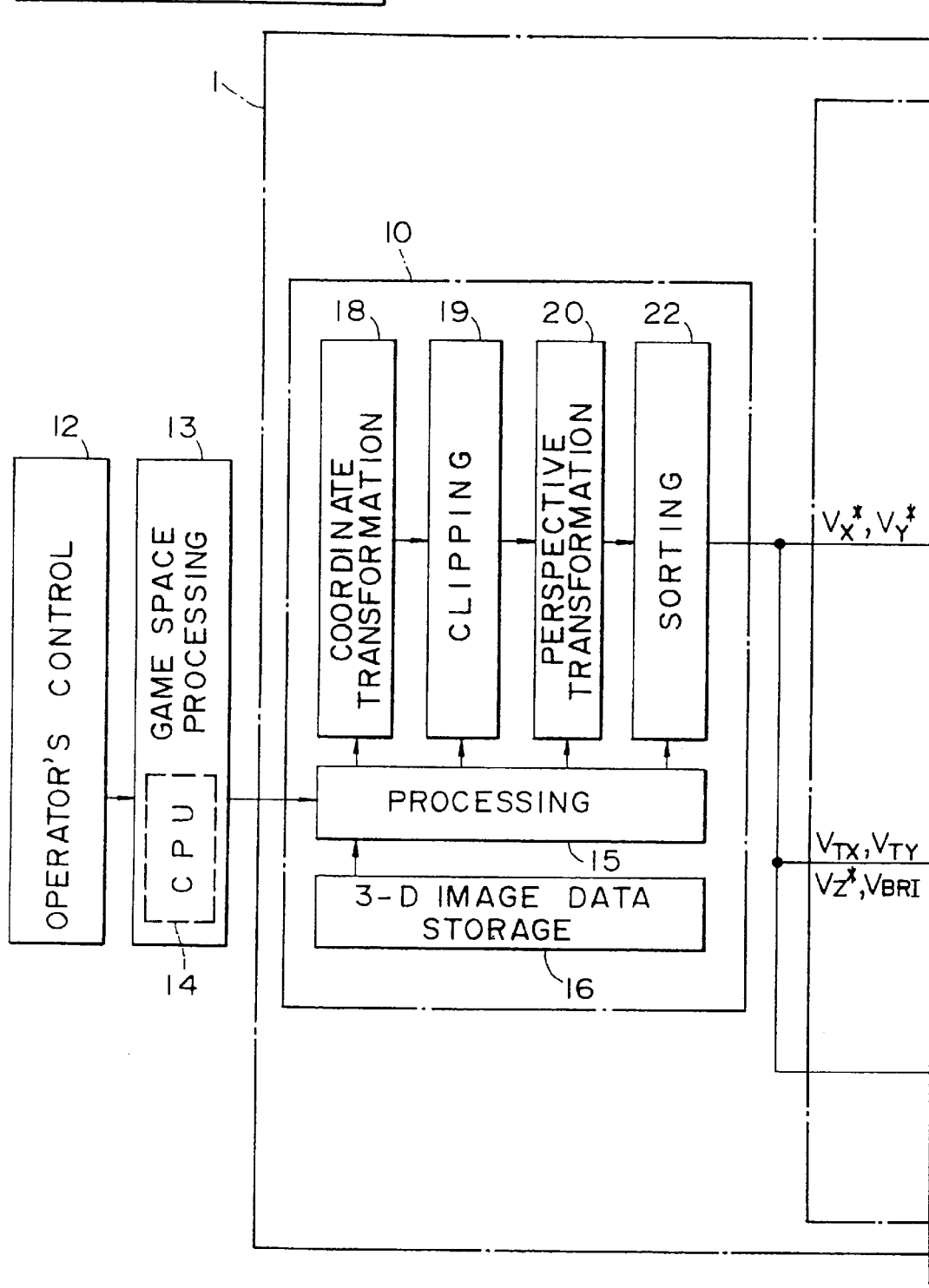

FIG. 15

ONE-LINE DATA ON FIELD BUFFER (SUBSAMPLED DATA)

| EMPTY | EMPTY | PN=0<br>TX=<br>TY=<br>BRI= | PN=0<br>TX=100<br>TY=24<br>BRI=64 | EMPTY | PN=0<br>TX=200<br>TY=36<br>BRI=32 | EMPTY | PN=1<br>TX=1024<br>TY=777<br>BRI=86 |

- EMPTY DOT AND ADJACENT DOTS HAVE SAME PN
- EMPTY DOT BUT ADJACENT DOTS HAVE DIFFERENT PN

⇒ INTERPOLATION

SERIAL READ DATA OUTPUT (OUTPUT AT DO 0~11 TERMINALS)

| EMPTY | EMPTY | PN=0<br>TX=<br>TY=<br>BRI= | PN=0<br>TX=100<br>TY=24<br>BRI=64 | PN=0<br>TX=150<br>TY=30<br>BRI=48 | PN=0<br>TX=200<br>TY=36<br>BRI=32 | EMPTY | PN=1<br>TX=1024<br>TY=777<br>BRI=86 |

THE SAME PN AND TX,TY AND BRI ARE AVERAGE VALUES OF LEFT/RIGHT

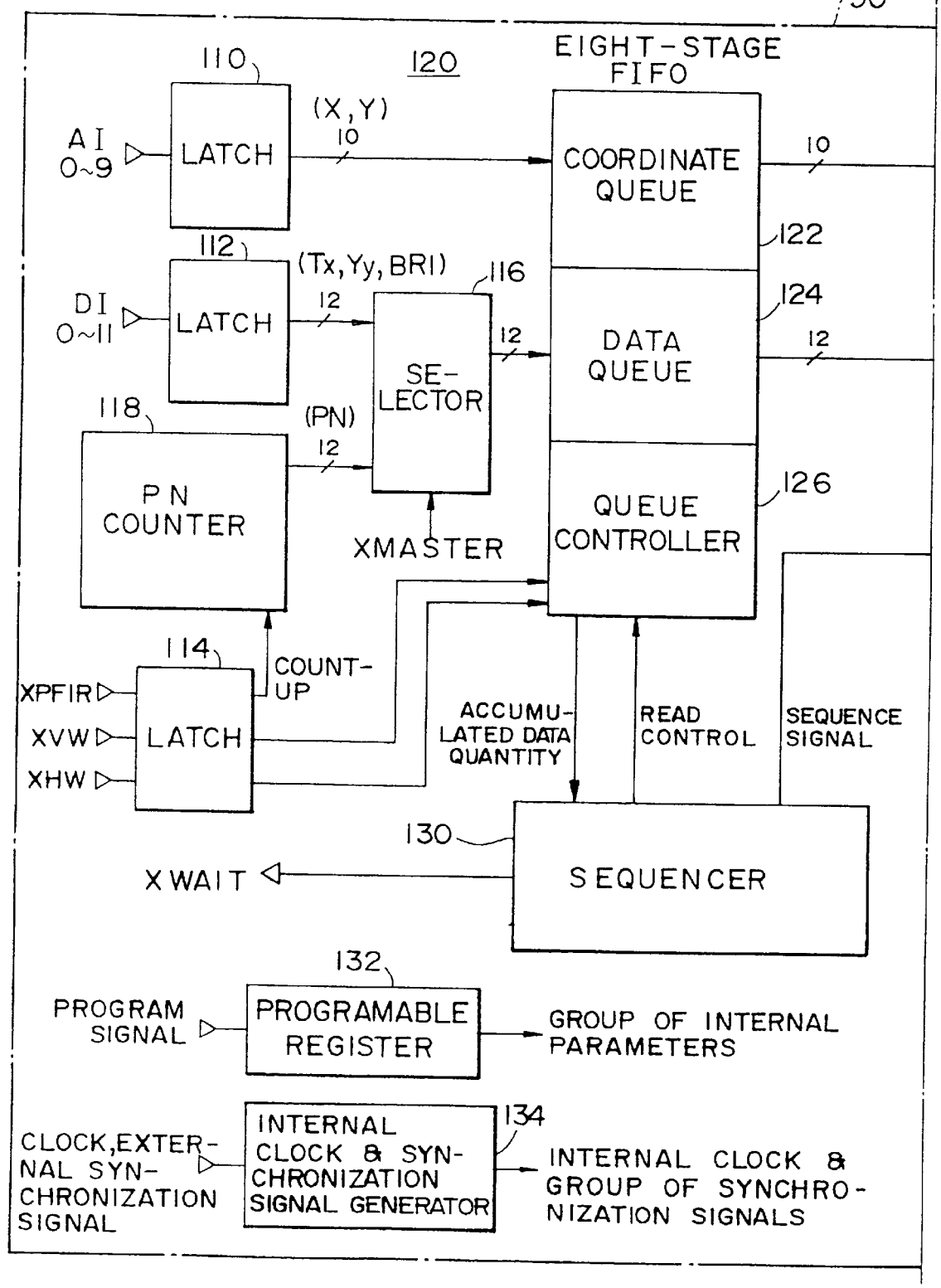

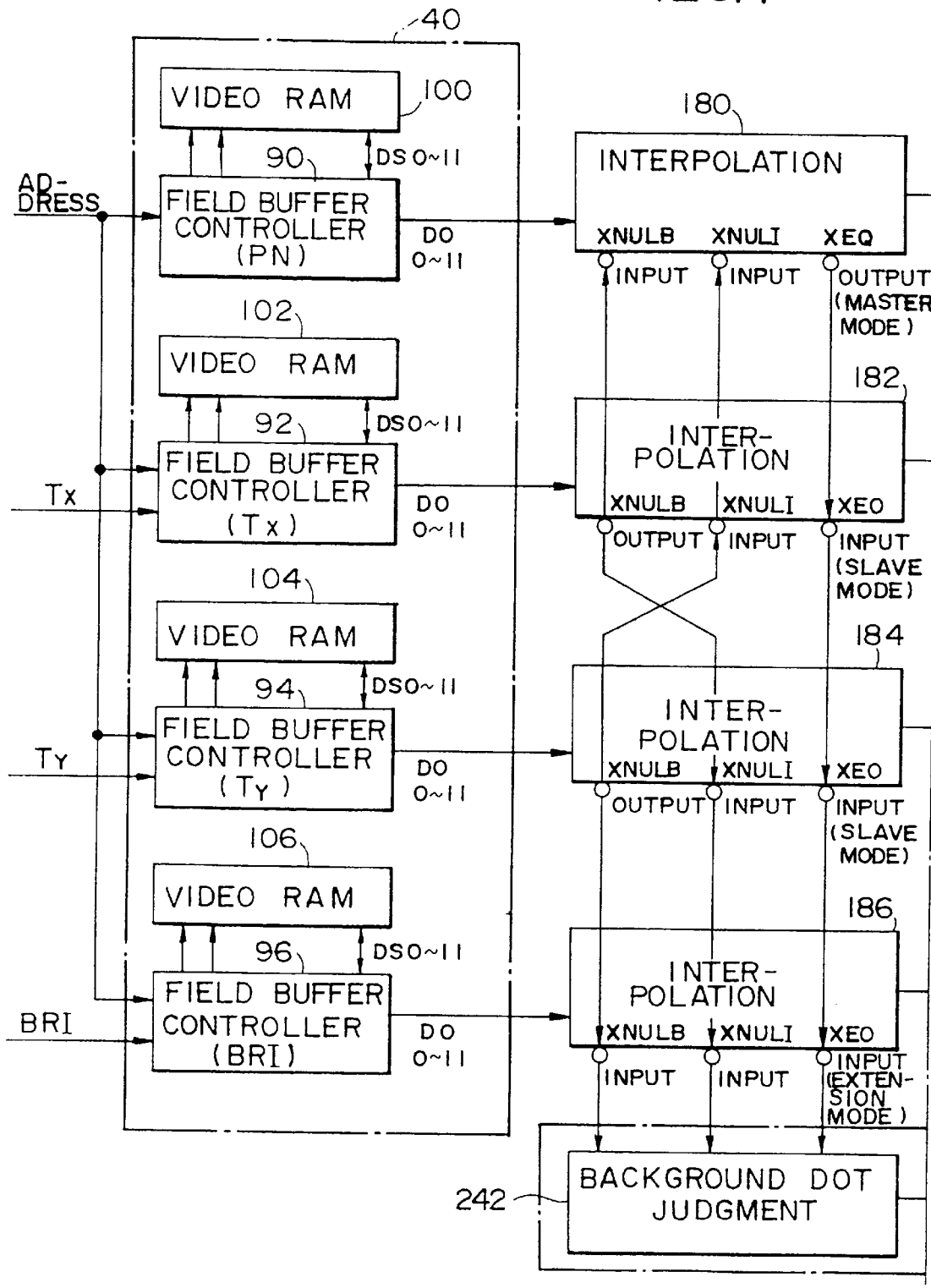

IMAGE SYNTHESIZING SYSTEM WITH TEXTURE MAPPING

This is a Continuation of application Ser. No. 08/211,398 filed Apr. 1, 1994, now U.S. Pat. No. 5,621,867.

[TECHNICAL FIELD]

The present invention relates to an image synthesizing system and particularly to such a system which can perform the synthesization of high-quality image in real time.

[BACKGROUND TECHNIQUES]

There are known various image synthesizing systems used as in three-dimensional (3-D) games, airplane or other vehicle simulators and so on. Typically, such image synthesizing systems have information of image relating to a 3-D object 300 as shown in FIG. 33, which has previously been stored therein. Information of image is perspectively transformed into a pseudo 3-D image 308 on a screen 306. As a player 302 makes an operation with a control panel 304 such as rotation, translation or the like, the system responds to the control signal to perform the processing with respect to rotation, translation or the like of the image of the 3-D object 300 in real time. Thereafter, the processed 3-D image is perspectively transformed into the pseudo 3-D image on the screen 306. As a result, the player 302 itself can rotate or translate the three-dimensional objects in real time to experience a virtual 3-D space.

FIG. 34 shows one of such image synthesizing systems. The image synthesizing system will be described as being applied to a 3-D game.

As shown in FIG. 34 the image synthesizing system comprises an operator's control unit 510 a game space processing unit 500 an image synthesizing unit 512 and a CRT 518.

The game space processing unit 500 sets a game space in response to control signals from the operator's control unit 510 and in accordance with a game program which has been stored in a central processing unit 506. Namely the processing is performed with respect to what position and direction the 3-D object 300 should be arranged in.

The image synthesizing unit 512 comprises an image supply unit 514 and an image forming unit 516. The image synthesizing unit 512 performs the synthesization of a pseudo 3-D image in accordance with information of a game space set by the game space processing unit 500.

In this image synthesizing system, 3-D objects in the game space are defined as polyhedrons which are divided into 3-D polygons. As shown in FIG. 33 for example the 3-D object 300 is represented as a polyhedron which is divided into 3-D polygons 1–6 (polygons 4–6 not shown herein). The coordinates and associated data of each vertex in each of the 3-D polygons (which will be referred to "image data of vertices") have been stored in a 3-D image data storage 552.

The image supply unit 514 performs various mathematical treatments such as rotation translation and others and various coordinate conversions such as perspective transformation and others for the image data of vertices in accordance with the setting of the game space processing unit 500. After the image data of vertices has been processed it is permuted in a given order before outputted to the image forming unit 516.

The image forming unit 516 comprises a polygon generator 570 and a palette circuit 30. The polygon generator 570 comprises an outline (polygon edges) point processing unit 324 and a line processor 326. The image forming unit 516 is adapted to perform a process of painting all the dots (pixels) in the polygon with a predetermined color data or the like in the following procedure:

First of all, the outline point processing unit 324 calculates left-hand and right-hand outline points which are intersection points between polygon edges AB, BC, CD, DA and other polygon edges and scan lines, as shown in FIG. 35. Subsequently the line processor 326 paints with specified color data, sections between the left-hand and right-hand outline points, for example, sections between L and Q; Q and R as shown in FIG. 35. In FIG. 35, the section between L and Q is painted by red color data while the section between Q and R is painted by blue color data. Thereafter, the color data used on painting are transformed into RGB data in the palette circuit 580 and then the RGB data in turn is outputted to and displayed in CRT 518.

In such an image synthesizing system of the prior art, all the dots on a single polygon can be painted only by the same color, as described. As can be seen in FIG. 35, for example, the dots on the polygon 1 are only painted by red color; the dots on the polygon 2 are only painted by yellow color; and the dots on the polygon 3 are only painted by blue color. Thus, the formed image is monotonous without reality.

If an object having its complicated surface is to be displayed to avoid such a monotonousness the number of divided polygons must greatly be increased. For example if a 3-D object 332 having a texture of color data as shown in FIG. 36 is to be formed by the image synthesizing system of the prior art, it is required to divide a polyhedron into polygons 1–80 (polygons 41–80 not shown herein) for processing. Namely various processing operations including the rotation, translation and perspective transformation, the treatment of polygon outline, the painting and the like must be performed for all the polygons. It is thus required to treat polygons ten-odd times those of the 3-D object 300 having no texture as shown in FIG. 33. However, the system for synthesizing an image in real time must terminate the drawing of an image to be displayed by treating all the dots for every field ($\frac{1}{60}$ seconds). In order to draw such a 3-D object 332 having a texture of color data, one requires a hardware having a very increased speed or an increased scale to perform a parallel operation. As the number of polygons to be processed is increased, the memory and data processor of the system is necessarily increased in scale. In image synthesizing systems such as video game machines which are limited in cost and space, it is therefore subsequently impossible to draw a pseudo 3-D image having a delicate texture with high quality.

In the field of computer graphics and the like, there is known a texture mapping technique shown in FIG. 37. The texture mapping separates the image data of a 3-D object 332 into the image data of a polyhedron 334 and the texture data of textures 336 and 338, which are in turn stored in the system. On displaying an image, the texture data of the textures 336, 338 are applied to the polyhedron 334 to perform the image synthesization. (One of the texture mapping type image synthesizing techniques is disclosed in Japanese Patent Laid-Open No. Sho 63- 80375, for example).

The texture mapping technique is realized in the field of very large-scale and expensive image processing systems such as exclusive image-processing computers known as graphics work stations, flight simulators and so on. Very few image synthesizing systems which are relatively inexpensive, like video game machines, utilize the texture mapping technique since it is difficult to increase the speed and scale of their hardwares. In addition such video game machines can only display limited numbers and sizes of 3-D objects and the mapping they provide is inaccurate since the operation is performed by a simple approximation. As a result, the reality of the image is very degraded. Furthermore, the real-time display is insufficient since the frequency of updating the scene is low, that is, several frames per second.

In the bit-map type image synthesizing system of the prior art, the color data itself is stored in a memory known as a so-called field buffer unit. Even if the texture mapping technique is applied to such a bit-map type image synthesizing system, thus, the color data itself will be stored in the field buffer unit. As a result, the hardware could not be increased in speed and reduced in scale through the subsampling/interpolation technique. If a plurality of image computing units are used for parallel processing, the scale of the hardware could not be reduced by using a common texture data storage unit in which texture data was stored.

When pseudo 3-D images are to be synthesized to realize a 3-D game or the like, an image formed by a 3-D object which is expressed by polygons must be synthesized with a background image formed by a background. To this end, the image synthesizing system of the prior art newly requires a memory in which background image data have been stored and a circuit for mixing polygon images with background images. It is therefore difficult to increase the processing speed of the hardware and to reduce the scale thereof, according to the prior art.

In view of the aforementioned problems of the prior art, an object of the present invention is to provide an image synthesizing system which can output high-quality images through the texture mapping technique in real time without prevention of the hardware from being increased in speed and reduced in scale.

[DISCLOSURE OF THE INVENTION]

To this end, the present invention provides an image synthesizing system comprising:

an image computing unit for forming a 3-D image composed of polygons in a virtual 3-D space and performing a 3-D computation on data of said 3-D image and also for determining coordinates of each of dots in polygons forming the 3-D image and texture coordinates corresponding to the coordinates of each dot, a field buffer unit for storing said texture coordinates determined by said image computing unit at an address specified by said coordinates of each dot, and a rendering data storage unit for storing a rendering data at an address specified by said texture coordinates, whereby a pseudo 3-D image can be synthesized and outputted by reading said texture coordinates from said field buffer unit and then using said texture coordinates to read the rendering data from said rendering data storage unit.

According to the present invention, not the color data, but the texture coordinates, are stored in the field buffer unit. After read out from the field buffer unit, the texture coordinate can be used to read a given rendering data (texture data) out of the rendering data storage unit (texture data storage unit). Thus, the synthesization of high-quality image through the texture mapping can be realized in a very simple configuration. Since the texture coordinate is stored in the field buffer unit rather than the color data, the subsampling/interpolation technique for improving the hardware in scale and speed can be realized without substantial degradation of the image quality. If the image processing units are connected parallel to one another, the rendering data storage unit can be formed into a single common unit. Thus, the texture mapping type image synthesizing system for providing high-quality images can be realized by a relatively small-scale hardware.

The present invention also provides an image synthesizing system comprising:

an image computing unit for forming a 3-D image composed of polygons in a virtual 3-D space and performing a 3-D computation on data of said 3-D image and also for determining coordinates of each of dots in polygons forming the 3-D image and texture coordinates corresponding to the coordinates of each dot, a field buffer unit for storing said texture coordinates determined by said image computing unit at an address specified by said coordinates of each dot, and a function computing unit for applying a function computation to the texture coordinates determined by said image computing unit to determine a rendering data.

whereby a pseudo 3-D image can be synthesized and outputted by reading said texture coordinates from said field buffer unit and then using said read texture coordinates to determine the rendering data at said function computing unit.

According to the present invention, the high-quality image synthesization can be carried out through the texture mapping by using the texture coordinate to form the desired rendering data at the function computing unit. In such an arrangement, a texture mapping known as the bump mapping can be performed by a relatively small-scale circuitry. Particularly, a unique image effect which would not be provided by the prior art can be produced by using a random number generator or the like. In this case, the texture coordinate also is stored in the field buffer unit. Therefore, the subsampling/interpolation process can be carried out. Even when the image processing units are connected parallel to one another, the rendering data storage unit can be formed into a single common unit.

In this case, the image synthesizing system is desirable wherein at least one type of rendering data stored in said rendering data storage unit is color data and wherein said color data being read out by the use of said texture coordinates to form an image data.

Furthermore, the image synthesizing system is possible wherein at least one type of rendering data stored in said rendering data storage unit is surface shape data and wherein said surface shape data being read out by the use of said texture coordinates to form an image data.

In such a manner, the color data and surface shape data can be used as rendering data for performing the texture mapping. The present invention may also use the other type of rendering data such as brightness data, transparency data, diffuse reflectance data and so on. For example, if a normal vector, the displacement of the normal vector (perturbation component) or the height of reliefs formed on the surface of the object is used as surface shape data, the texture mapping can be carried out through the bump mapping.

Moreover, the image synthesizing system further comprises an attribute data storage unit for storing attribute data which is an image data common within each of polygons forming a 3-D image and wherein a polygon identification number for identifying a polygon is further written in said field buffer unit in addition to said texture coordinates, whereby the attribute data is read out from said attribute data storage unit to form an image data, based on the polygon identification number read out from said field buffer unit.

Thus, the attribute data which is a common image data in one polygon is a stored in the attribute data storage unit. By reading the attribute data by the use of the polygon identifying number written in the field buffer unit, further high-quality image synthesization can be realized by a simpler circuitry. For example, if the bump mapping is to be performed through the displacement of the normal vector, the original normal vector can be specified by this attribute data.

Moreover, the image synthesizing system is possible wherein said image computing unit performs part of or all of the computation in parallel and wherein said texture coordinates outputted from said image computing unit are stored in one or more field buffer units, the stored texture coordinates being used to read out the rendering data from said rendering data storage unit to form an image data.

In such an arrangement, the computations in the image processing units can be performed in parallel so as to increase the processing speed. Thus, a further high-quality image can be synthesized. Even in this case, the rendering data storage unit can be formed into a single common unit which can minimize the scale of the hardware and the complicated control.

Moreover, the image synthesizing system is possible wherein said pseudo 3-D image is composed of background and polygon images and wherein said image synthesizing system further comprises a background image generating unit for generating the background images, said background image generating unit comprising:

a background texture coordinate generating unit for generating background texture coordinates through a given computation; and a background dot judgment unit for judging that dots not used to display polygon images in the displayed scene are background dots, whereby with respect to the background dots judged by said background dot judgment unit, the background texture coordinates generated by said background texture coordinate generating unit are set as reading texture coordinates used in said texture data storage unit to generate the background images.

In such an arrangement, the Image synthesization by separating the polygon images from the background image can very easily realized. Furthermore, the rendering data is read out from the rendering data storage unit by the use of the texture coordinate after it has been judged whether or not the dots to be processed are the background dots. It is therefore not required to provide two separate rendering data storage units for polygon and background images, respectively. As a result, the scale of hardware can be reduced and speed in processing can be increased. Furthermore, the rendering data stored in the rendering data storage unit can be shared between the polygons and background without need of separate rendering data for polygons and background.

In this case, the image synthesizing system is desirable wherein the computation carried out by said background texture coordinate generating unit includes rotation, enlargement and reduction in a given direction relative to the texture coordinates.

By performing such a computation, a pseudo 3-D image synthesization using the background image can be performed through a very simple arrangement.

Furthermore, the image synthesizing system is possible wherein dots not used to draw the polygon images are written in said field buffer unit as empty dots and wherein said background dot judgment unit judges that when dots to be processed are empty dots, these dots are background images.

Thus, a very simple arrangement can be used to judge whether or not dots to be processed are background dots, by setting dots not used to draw polygon images as empty dots in the field buffer unit.

Moreover, the image synthesizing system is desirable wherein said image computing unit computes the coordinates of subsampled dots and corresponding texture coordinates. Dots not used to draw the polygon images are written in said field buffer unit as empty dots and a polygon identification number for identifying a polygon is further wyritten in said field buffer unit in addition to said texture coordinates. Said background dot judgment unit judges that a dot to be processed is a background dot when the dot, to be processed is an empty dot and either a) dots adjacent to the empty dot do not have the same polygon identification number or b) at least one of the dots adjacent to the empty dot is an empty dot. The interpolation is carried out to a dot to be processed when the dot to be processed is an empty dot and when dots adjacent to the empty dot have the same polygon identification number and are not empty dots.

According to such an arrangement, it is judged whether or not the interpolation should be carried out simply by judging whether or not dots to be processed are empty dots, whether or not dots adjacent to those empty dots have the same identification number or whether or not dots adjacent to the empty dots are empty dots. At the same time, it can be judged whether or not these dots are dots usable to display the background image. Consequently, the image synthesization by separating the polygon images from the background image can be realized, simply by adding a necessary minimum circuit to a circuit for performing the subsampling/interpolation.

In this case, the image synthesizing system is possible wherein said subsampling in said image computing unit is carried out by ignoring a plurality of dots and wherein the background dot judgment in said background dot judgment unit and said interpolation are carried out for a plurality of dots.

By increasing the rate of subsampling in such a manner, the hardware can further be reduced in scale and increased in processing speed.

[BRIEF DESCRIPTION OF THE DRAWINGS]

FIGS. 1A and 1B is a block diagram of one embodiment of an image synthesizing system constructed in accordance with the present invention.

FIGS. 3A and 3B is a flowchart showing the summary of an image processing computation in the image synthesizing system relating to the present invention.

FIGS. 6A and 6B is a block diagram showing details of the embodiment of the present invention.

FIGS. 8A and 8B is a block diagram showing the internal circuits of the field buffer controller.

FIG. 9 is a timing chart illustrating a writing sequence to the field buffer unit.

FIGS. 13A and 13B is a block diagram showing an example in which the subsampling/interpolation is carried out according to the present embodiment.

FIG. 15 is a schematic view illustrating one of the interpolation techniques.

FIGS. 17A and 17B is a block diagram showing the concrete connection between the field buffer controller and the interpolation circuit.

FIGS. 26A and 26B is a block diagram showing an example in which a simple background image generating unit is provided in the present embodiment.

[BEST MODE FOR CARRYING OUT THE INVENTION]

(1) General Arrangement

Figure 1B:
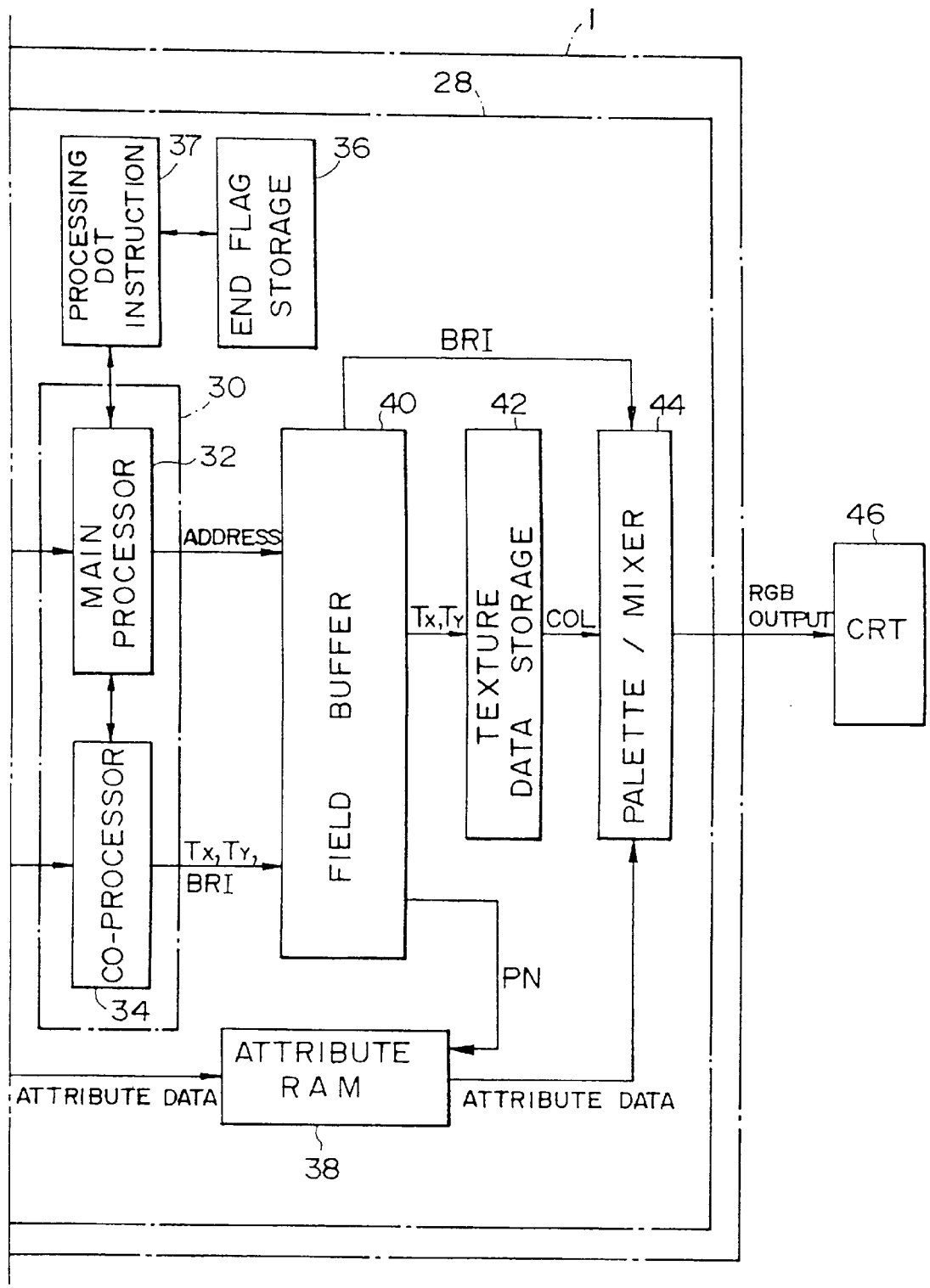

Referring to FIG. 1, there is shown one embodiment of an image synthesizing system constructed in accordance with the present invention, which comprises an operator's control unit 12 a game space processing unit 13, an image synthesizing unit 1 and a CRT 46. The image synthesizing unit 1 comprises an image supply unit 10 and an image forming unit 28. The image synthesizing system will be described as applied to a 3-D game.

The game space processing unit 13 sets a game space in accordance with a game program stored in a central processing unit 14 and a control signal from the operator's control unit 12. More particularly, the game space processing unit 13 computes the setting data of a game space which is defined by the positions and directions of 3-D objects (e.g. airplanes, mountains, buildings etc.), the position and view of a player and so on. The computed setting data is then outputted to the image supply unit 10 in the image synthesizing unit 1.

The image supply unit 10 performs a given computing process, based on the setting data of the game space. More particularly, the computing process includes the coordinate transformation from the absolute coordinate system to the view coordinate system, the clipping, the perspective transformation, the sorting and so on. The processed data is outputted to the image forming unit 28. In such a case, the output data is represented as divided into data in the respective polygons. More particularly, the data is defined by image data of vertices including the representing coordinates, texture coordinates and other associated information of each vertex in the polygons.

The image forming unit 28 computes the image data in the interior of the polygon from the image data of vertices with the computed data being outputted to the CRT 46.

The image synthesizing system of this embodiment can carry out the image synthesization more effectively through two techniques known as texture mapping and Gouraud shading. The concepts of these techniques will briefly be described.

Figure 36:
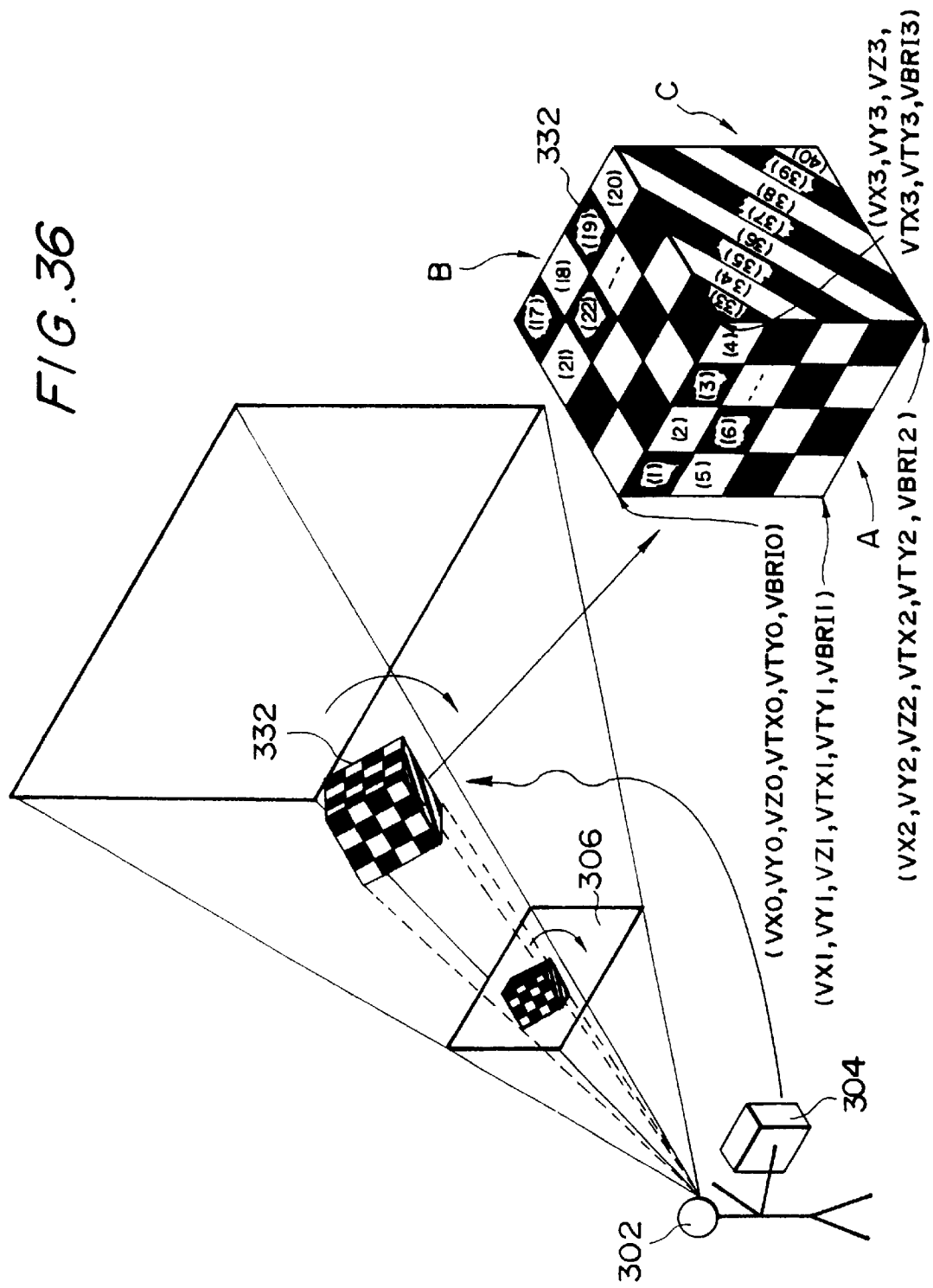
FIG. 36 is a schematic view illustrating an image device for synthesizing a 3-D object having a mapped texture into an image.
Figure 37:
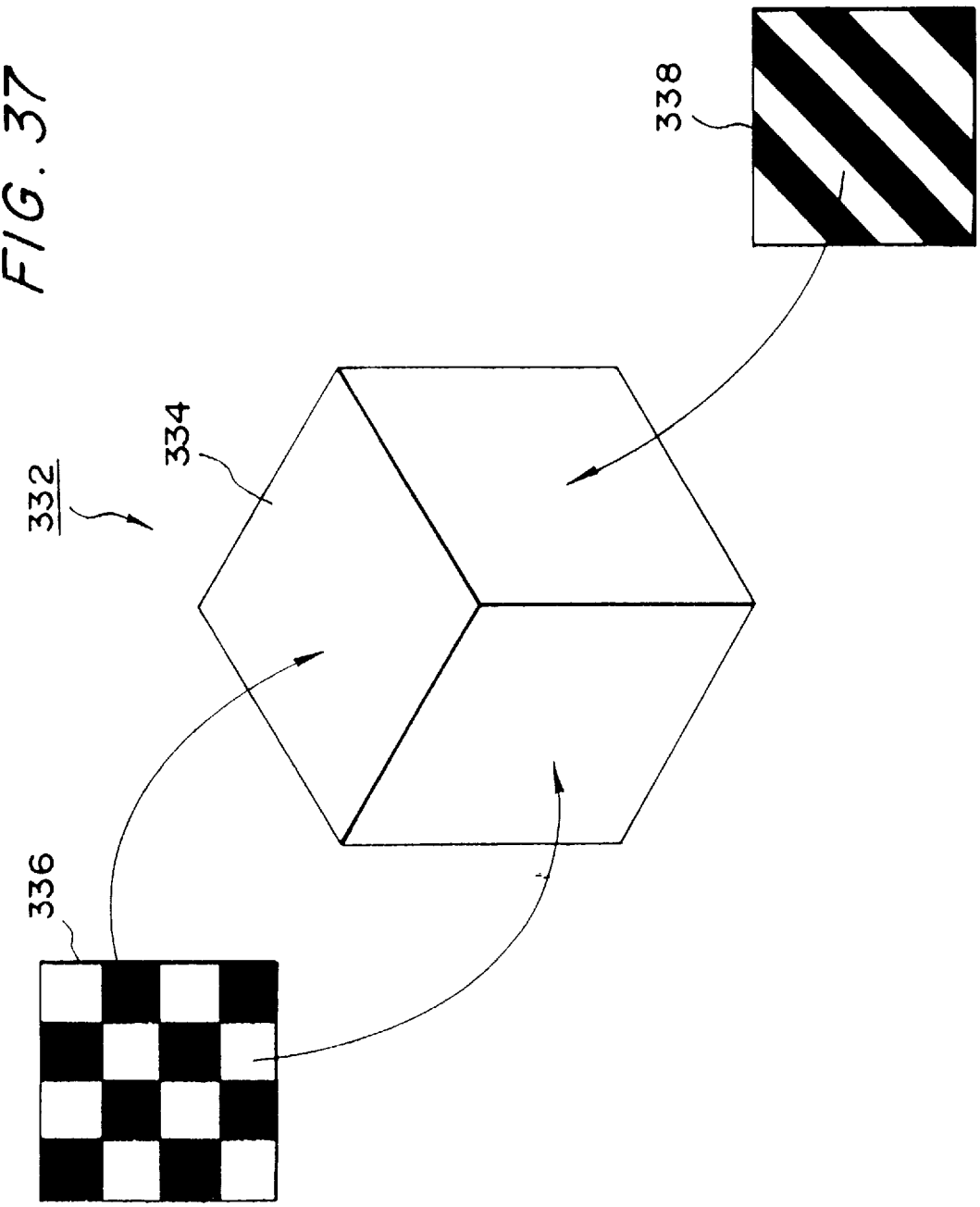
FIG. 37 is a schematic view illustrating the concept of the texture mapping.

FIG. 36 shows the concept of the texture mapping technique. To synthesize a pattern such as grid or stripe on a 3-D object 332 at each surface as shown in FIG. 36, the prior art divided the 3-D object 332 into 3-D polygons 1–80 (polygons 41–80 not shown herein), all of which were processed. This is because the image synthesizing system of the prior art can paint the interior of one polygon with only one color. When it is wanted to synthesize a high-quality image having a complicated pattern, therefore, the number of polygons will so increase that the synthesization of high-quality image substantially becomes impossible.

Therefore, the image synthesizing system of the present invention performs various treatments such as rotation, translation, coordinate transformation such as perspective transformation and clipping to each of 3-D polygons A, B and C defining the respective surfaces of the 3-D object 332 (more particularly, each of the vertices in the respective 3-D polygons). Patterns such as grids and stripes are handled as texture, separately from the treatment of the polygons. Namely, as shown in FIG. 1, the image forming unit 28 includes a texture data storage unit (rendering data storage unit) 42 in which texture data (rendering data) to be applied to the 3-D polygons, that is, image data relating to the patterns such as grids, stripes and the like have been stored.

The texture data storage unit 42 stores the texture data each of which has an address given as texture coordinate VTX, VTY of each vertex in the respective 3-D polygons. More particularly, texture coordinates (VTX0, VTY0), (VTX1, VTY1), (VTX2, VTY2) and (VTX3, VTY3) are set for each vertex in the polygon A, as shown in FIG. 36.

Figure 2:
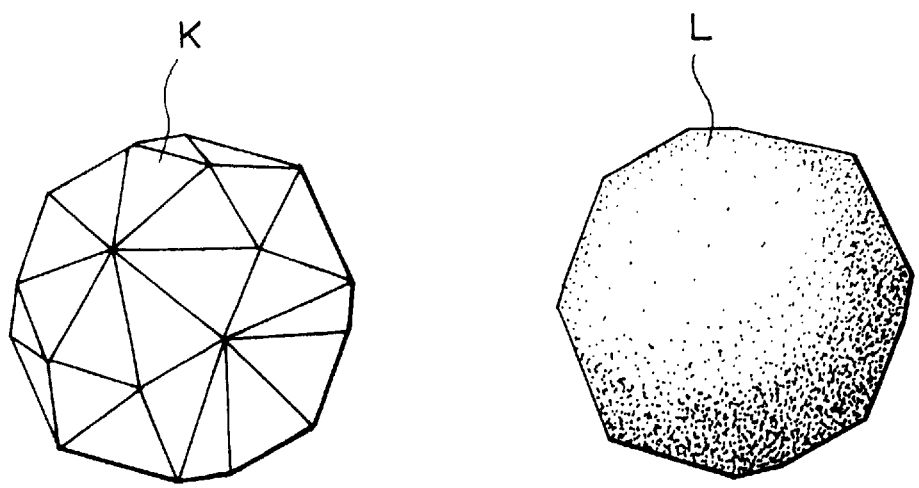
FIG. 2 is a schematic view illustrating a problem of brightness continuity.

The image forming unit 23 uses the texture coordinates VTX, VTY for each vertex to determine texture coordinates TX, TY for all dots in the polygon. Texture data corresponding to the determined texture coordinates TX, TY is read out from the texture data storage unit 42. Thus, the image of the 3-D object onto which the texture of grids or stripes as shown in FIG. 2 is applied can be synthesized.

Such a technique can greatly reduce the amount of data to be processed. As a result, the present invention can provide an image synthesizing system which is optimum for synthesizing a high-quality image in real time.

As described, the image synthesizing system of the present invention represents the 3-D object 332 of FIG. 36 as a mass of 3-D polygons. It thus raises a problem with respect to the continuity in brightness data at the boundary of each 3-D polygon. For example, when it is wanted to represent a sphere using a plurality of 3-D polygons and if all the dots (pixels) in the polygon are set at the same brightness, the boundary of the 3-D polygon will not be represented to have a "rounded surface." In order to overcome such a problem, the image synthesizing system of the present invention uses a technique known as Gouraud shading. Like the aforementioned texture mapping, Gouraud shading has given brightness data VBRI0–VRI3 to each vertex in the respective 3-D polygons, as shown in FIG. 36. When the image forming unit 28 is to display a final image, brightness data for all the dots in the polygon are determined by an interpolation method using the brightness data of vertices, namely VBRI0, VRI1, VBRI2, VRI3. Through such a technique, thus, a 3-D object K represented by a polygon polyhedron can be image synthesized as a 3-D object L in which a "rounded surface" in the boundaries is represented as shown in FIG. 2.

According to such a technique, the aforementioned "rounded surface" problem can be overcome while at the same time reducing the processing required by the image synthesizing system. Therefore, the present invention can provide an image synthesizing system which is optimum for synthesizing a high-quality image in real time.

(2) Image Supply Unit

The image supply unit 10 performs the following treatment. First of all, a processing unit 15 reads out the image data of a 3-D object to be arranged in a game space from a 3-D image data storage unit 16. The processing unit 15 then outputs the image data of the 3-D object to a coordinate transformation unit 18 after adding positional and directional data. Thereafter, the coordinate transformation unit 18 performs the coordinate transformation from the absolute coordinate system to the view coordinate system. Subsequently, clipping, perspective transformation and sorting units 19, 20 and 22 perform clipping, perspective transformation and sorting, respectively. The image data of vertices of the processed polygon is outputted to the image forming unit 28.

The sorting unit 22 permutes the output order of the image data of vertices of the polygon in accordance with a predetermined priority. More particularly, the sorting unit 22 sequentially outputs the image data of vertices of the polygons to the image forming unit 28, starting from the closest polygon to the view point in the scene. Therefore, the image forming unit 28 will sequentially process the polygons, starting from the more overlying polygon in the scene.

(3) Image Forming Unit

The image forming unit 28 functions to compute the image data of all the dots in the polygons from the image data of vertices of the polygons which are inputted from the sorting unit 22 into the image forming unit 28 in a given sequence. The operation of the image forming unit 28 will be described below.

First of all, a processor unit 30 sequentially receives the image data of vertices of polygons including the representing coordinates, texture coordinates, brightness data and other associated information of vertices from the sorting unit 22. Common data shared by all of the dots in a polygon is inputted into an attribute RAM unit 38 as attribute data.

The processor unit 30 uses the representing coordinates, texture coordinates and brightness data of vertices to determine representing coordinates, texture coordinates TX, TY and brightness data BRI all the dots in the polygons. The texture coordinates TX, TY and the brightness data BRI thus determined are written in a field buffer unit 40 using said representing coordinates as addresses.

A main processor 32 is connected to processing dot instruction unit 37 and end flag storage unit 36. These units 37 and 36 are used to omit the processing operation for any dot which has already been processed and painted. Load on the subsequent computing process can greatly be reduced.

On displaying an image, the texture coordinates TX, TY are read out from the field buffer unit 40 and used as addresses to read the texture data from the texture storage unit 42. The texture data is used in a palette/mixer circuit 44 with the attribute data from the attribute RAM unit 38 to form RGB data which in turn is outputted as an image through CRT 486.

Figure 3B:
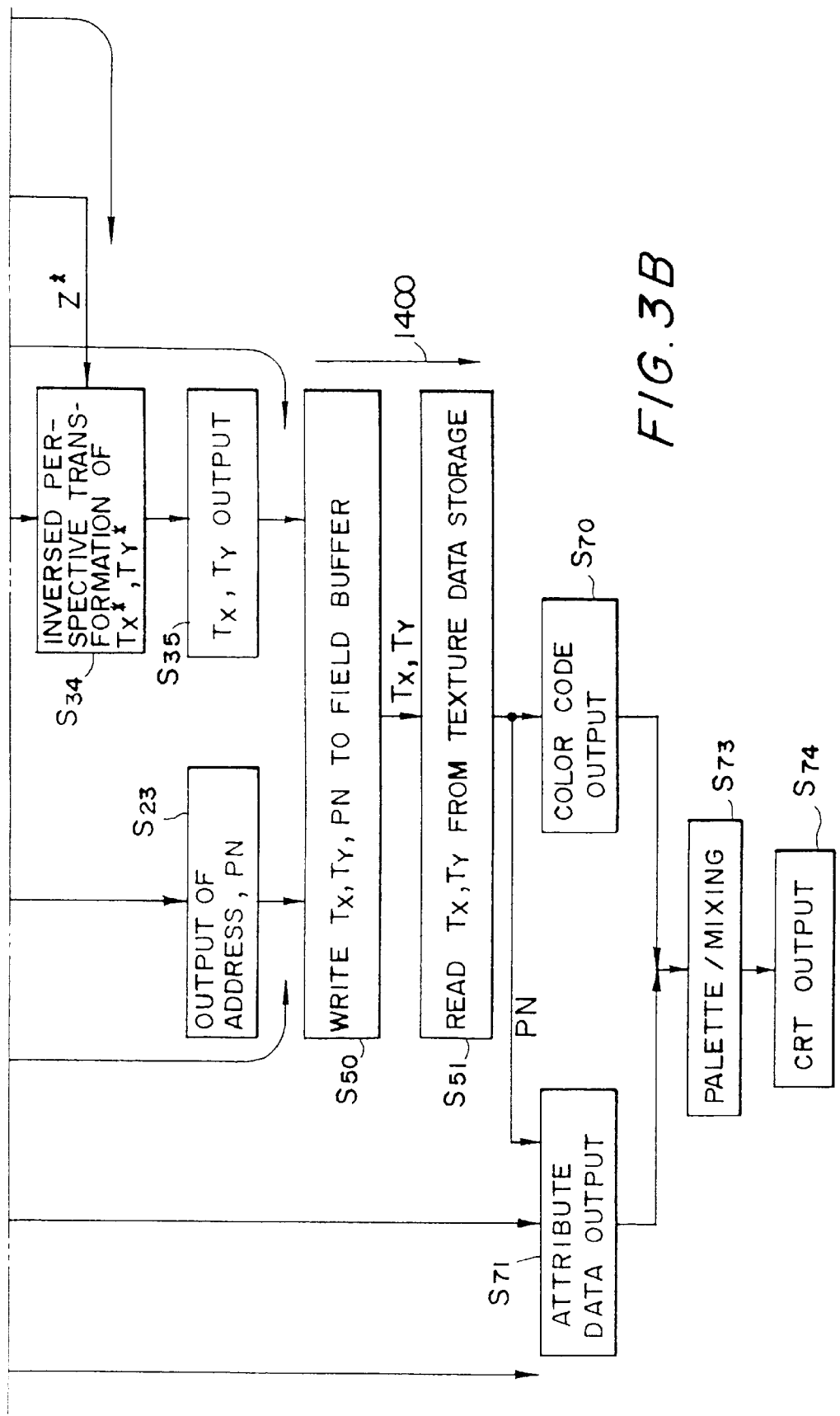

FIG. 3 shows a flowchart illustrating the operation of the image synthesizing system according to the present embodiment. FIGS. 4A–4K visually show the computing techniques which are carried out in the flows 1100, 1200 and 1300 of this flowchart.

The operations shown by the flow 1000 in FIG. 3 are executed by the image supply unit 10 and sorting unit 22. The sorting unit 22 outputs polygon data for each polygon. Since the polygons have already been given their priority levels, the polygon data are outputted from the sorting unit 22 according to the priority. The polygon data of each polygon includes perspective-transformed representing coordinates and texture coordinates for the vertices of that polygon.

The perspective-transformed representing coordinates VX* and VY* from the sorting unit 22 are inputted into the main processor 32 wherein the computation along the flow 1100 is executed. More particularly, left and right outline points are computed and the perspective-transformed representing coordinates X* and Y* for each dot on a scan line surrounded by the left and right outline points are also computed. These computations are repeated until all the dots defining a polygon have been processed. The resulting perspective-transformed representing coordinates X* and Y* for each dot are outputted to the field buffer 40 as write addresses. A polygon identification number PN is written in the field buffer unit 40 at its addressed area.

In parallel with the operation shown by the flow 1100, the co-processor 34 executes the other flows 1200 and 1300.

Namely, the co-processor 34 receives the texture coordinates VTX, VTY, perspective-transformed representing coordinate VZ* and brightness data for each vertex in the polygons from the sorting unit 22.

In accordance with the flow 1200, the co-processor 34 determines perspective-transformed texture coordinates VTX* and VTY* from the texture coordinates VTX and VTY for each vertex. The coordinates VTX* and VTY* are then used to compute left and right outline points. Perspective-transformed texture coordinates TX* and TY* are then computed for each dot on a scan line surrounded by the left and right outline points. The computations are repeated until all the dots of the polygon have been processed.

In parallel with such computations, the co-processor 34 executes the computations along the flow 1300 to calculate perspective-transformed representing coordinate Z* for each dot.

In a step 34 along the flow 1200, the perspective-transformed texture coordinates TX* and TY* determined for each dot are inversely perspective-transformed into output texture coordinates TX and TY using the perspective-transformed representing coordinate Z*. The output texture coordinates TX and TY will be written into the field buffer unit 40 at a write address which is outputted at a step 23 along the flow 1100.

In such a manner, the texture coordinates TX, TY and polygon identification number PN will be written into the field buffer unit 40 at addresses specified by the flow 1100, that is, addresses for the respective dots defining the polygon.

In parallel with such a write operation, attribute data for the respective polygon that are outputted from the sorting unit 22 are sequentially stored in the attribute RAM unit 38 according to the flow 1500.

Such a series of operations are repeated each time when each polygon data is outputted from the sorting unit 22. Thus, the data write operation is repeated to the field buffer 40 and attribute RAM 38.

When the data write operation corresponding to one scene has terminated, the data readout operation from the field buffer 40 and attribute RAM 38 is initiated. In the present embodiment, however, each of the field buffer and attribute RAM units 40, 38 has its image data storage space corresponding to two scenes. Therefore, the write and readout operations are actually simultaneously carried out. This improves the efficiency in the process.

First, the field buffer unit 40 outputs the texture coordinates TX and TY written therein for each dot to the texture data storage unit 42 as write addresses, for example, in synchronism with the horizontal scan in the display. At the same time, the polygon identification number PN is outputted to the attribute RAM unit 38 as a write address.

Thus, the color code specified by the address is outputted from the texture data storage unit 42 to the palette/mixer circuit 44. Further, the attribute data corresponding to the polygon identification number PN is outputted from the attribute RAM unit 38 to the palette/mixer circuit 44. Thus, the palette/mixer circuit 44 outputs color data (e.g. RGB output) to the CRT 46 wherein a desired pseudo 3-D image will be synthesized and displayed.

Figure 4:
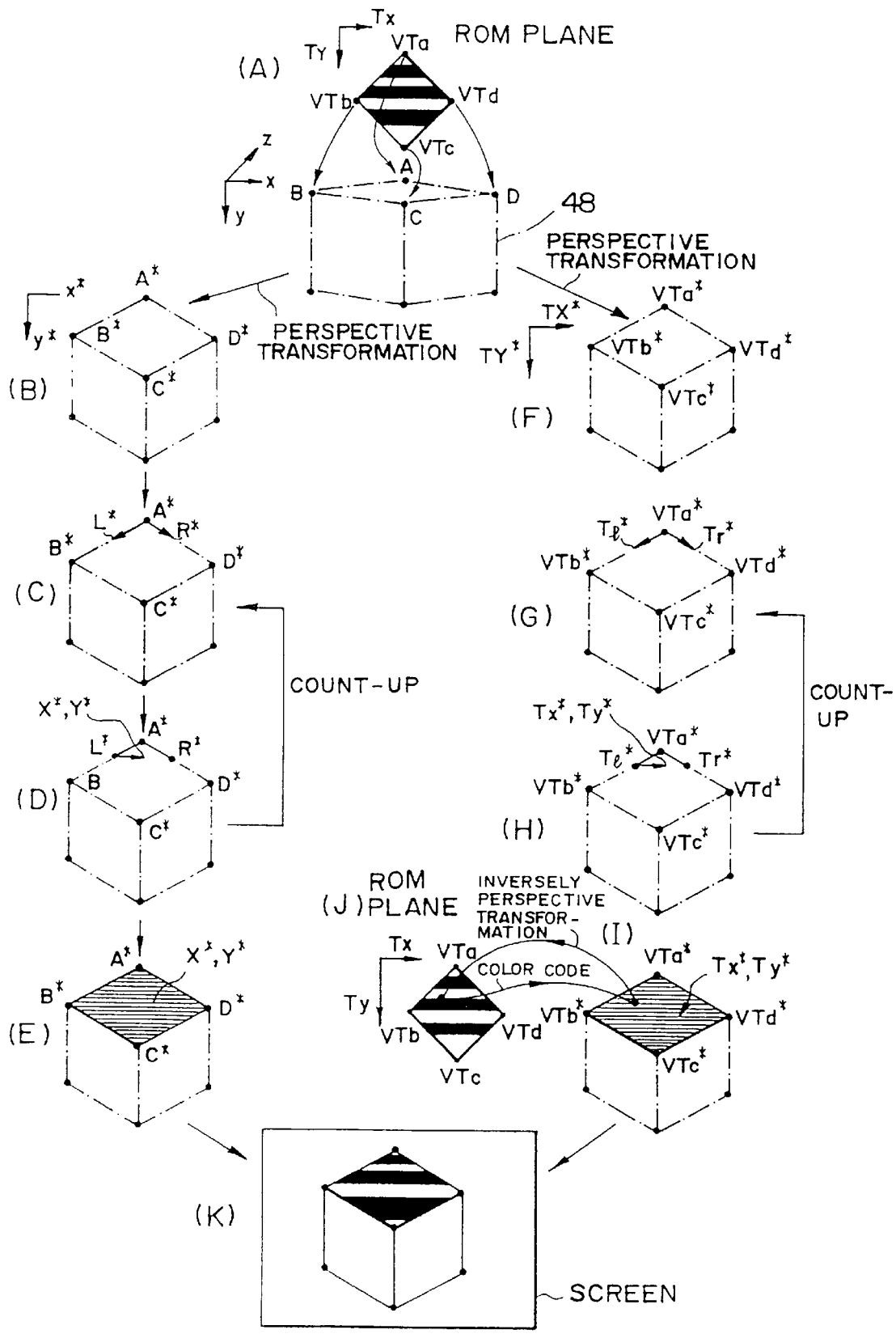
FIG. 4 are schematic views visually illustrating the summary of the image processing computation in the image synthesizing system relating to the present invention.

FIG. 4 visually shows the summary of the computation carried out in the image forming unit 23. As described, the image forming unit 28 is responsive to the image data of vertices to perform a computation for forming all the image data in the Polygon. In this case, the texture data to be applied to the polygon has been stored in the texture data storage unit 42. The texture coordinates TX and TY are thus required to read out this texture data from the texture data storage unit 42. Further, FIGS. 4F, 4G, 4H and 4I visually show a computation for determining all the perspective-transformed texture coordinates TX* and TY* in the polygon. This computation is carried out by the co-processor 34. Further, FIGS. 4B, 4C, 4D and 4E visually show a computation for determining perspective-transformed representing coordinates X* and Y* which are used to display the texture data. This computation is carried out by the main processor 32. As shown in FIG. 4J, the computed perspective-transformed texture coordinates TX* and TY* are inversely perspective-transformed into texture coordinates TX and TY through which the texture data is read out from the texture data storage unit 42. Finally, as shown in FIG. 4K, the image synthesization will be performed by relating the read texture data to a location represented by the computed coordinates X* and Y*. The summary of the computation through the respective steps shown in FIGS. 4A–4K will be described below.

As shown in FIG. 4A, texture coordinates VTa, VTb, VTc and VTd are applied to a polyhedron 48 at vertices (e.g. A, B, C and D). These texture coordinates of vertices VTa–VTd are used to address a texture data which is mapped to a polygon formed by the vertices A–D. More particularly the texture coordinates VTa–VTd are used to specify addresses for reading out texture data which have been stored in the texture data storage unit 42 at its memory means.

As shown in FIGS. 4B and 4F, the vertex representing coordinates A*–D* and vertex texture coordinates VTa–VTd are perspectively transformed into perspective-transformation vertex representing coordinates VTa*–VTd*. Thus, the perspective transformation is carried out not only to the X-Y coordinate system but also to the TX-TY coordinate system, such that the linearity between these coordinate system will be maintained.

As shown in FIGS. 4C and 4G, polygon outline points formed by the perspective-transformed representing coordinates A*–D* and perspective-transformed texture coordinates VTa*–VTd* are linearly interpolated. More particularly, coordinates L*, R* of left and right outline points and texture coordinates Tl*, Tr* of left and right outline points all of which are shown in FIGS. 4D and 4H are linearly interpolated.

As shown in FIGS. 4D and 4H, coordinates of dots on a scan line connecting the left and right outline points are linearly interpolated from the coordinates L*, R* of left and right outline points and coordinates Tl*, Tr* of left and right outline points texture.

The computations shown in FIGS. 4C, 4G and 4D, 4H are repeated until the perspective-transformed representing coordinates X*, Y* and perspective-transformed texture coordinates TX*, TY* are linearly interpolated for all the dots defining a polygon, as shown in FIGS. 4E and 4I.

As shown in FIG. 4J, inversed perspective transformation is performed on the perspective-retransformed texture coordinates TX* and TY* to obtain texture coordinates TX and TY which are in turn used to read out color codes from the texture data storage unit 42.

In this manner, the color codes can be applied to the perspective-transformed representing coordinates X* and Y*. As shown in FIG. 4K, thus, an image is synthesized on the screen and the texture mapping can be performed without damage of the far and near sense and linearity.

Figure 5:
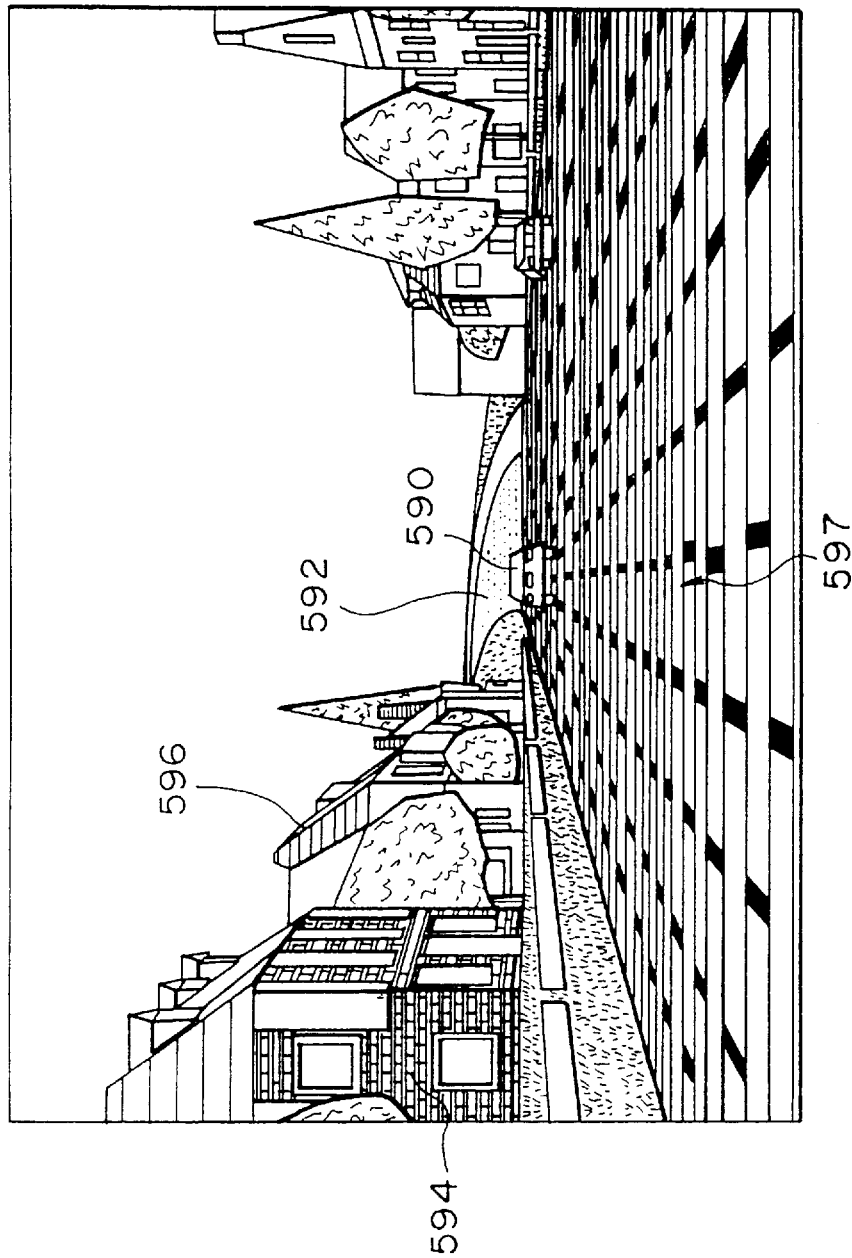
FIG. 5 is a view showing a pseudo 3-D image synthesized by the image synthesizing system relating to the present invention.

FIG. 5 shows a pseudo 3-D image synthesized in the above manner. As can be seen from FIG. 5, the desired texture mapping is performed at houses 594, a distant road 592, a brick-topped road 597 and others. This provides a very real image, compared with the prior art which would paint the surface of each polygon with a single color. In addition, the far and near sense and linearity of the texture mapped to the brick-topped road 597 are not degraded as can be seen from FIG. 5. In such a manner, the image synthesizing system of the first embodiment can synthesize a pseudo 3-D image greatly improved in quality and reality.

Although FIG. 4 does not show the computation of the perspective-transformed representing coordinate Z* and brightness data BRI, they may be computed in substantially the same manner as in the computation of TX and TY in FIG. 4. The interpolation of brightness data is also carried out in the same manner as in TX and TY. Therefore, the linear relationship between these coordinate systems can be maintained to synthesize an image with a more increased reality.

(4) Field Buffer Unit

Figure 6B:
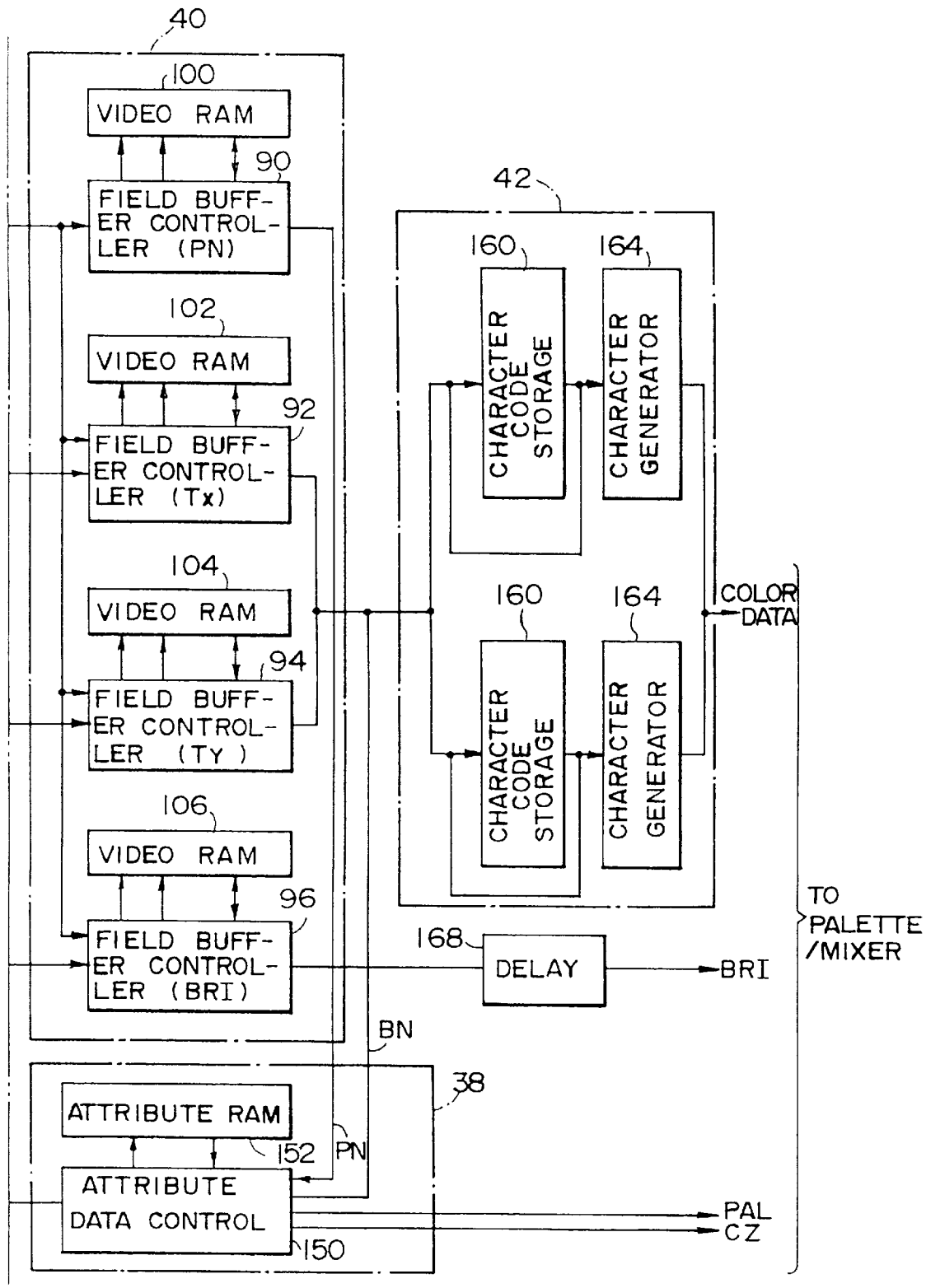

FIG. 6 shows the details of the present embodiment which include the sorting unit 22, processor unit 30, attribute RAM unit 38, field buffer unit 40 and texture data storage unit 42.

As shown in FIG. 6, the field buffer unit 40 comprises video RAMs 100, 102, 104 and 106 and field buffer controllers 90, 92, 94 and 96 for controlling these video RAMs.

A field buffer space defined by the video RAMs 100–106 stores data corresponding to dots in the CRT display screen in one-to-one ratio. In the first embodiment, data stored in the field buffer space includes texture coordinates TX and TY, brightness data BRI and polygon identification numbers PN which are computed by the co-processor 34. Addresses at which the data are to be written are decided from the perspective-transformed representing coordinates X* and Y* which are computed by the main processor 32.

Each of the video RAMs is of a multi-port type and divided into a random port (RAM) and a serial port (SAM). In the present embodiment, the data are written to the field buffer space in random access and read out serially in synchronism with dot clocks. The field buffer space is divided into write and read banks which are switched from one to another for every field (1/60 seconds).

Figure 7:
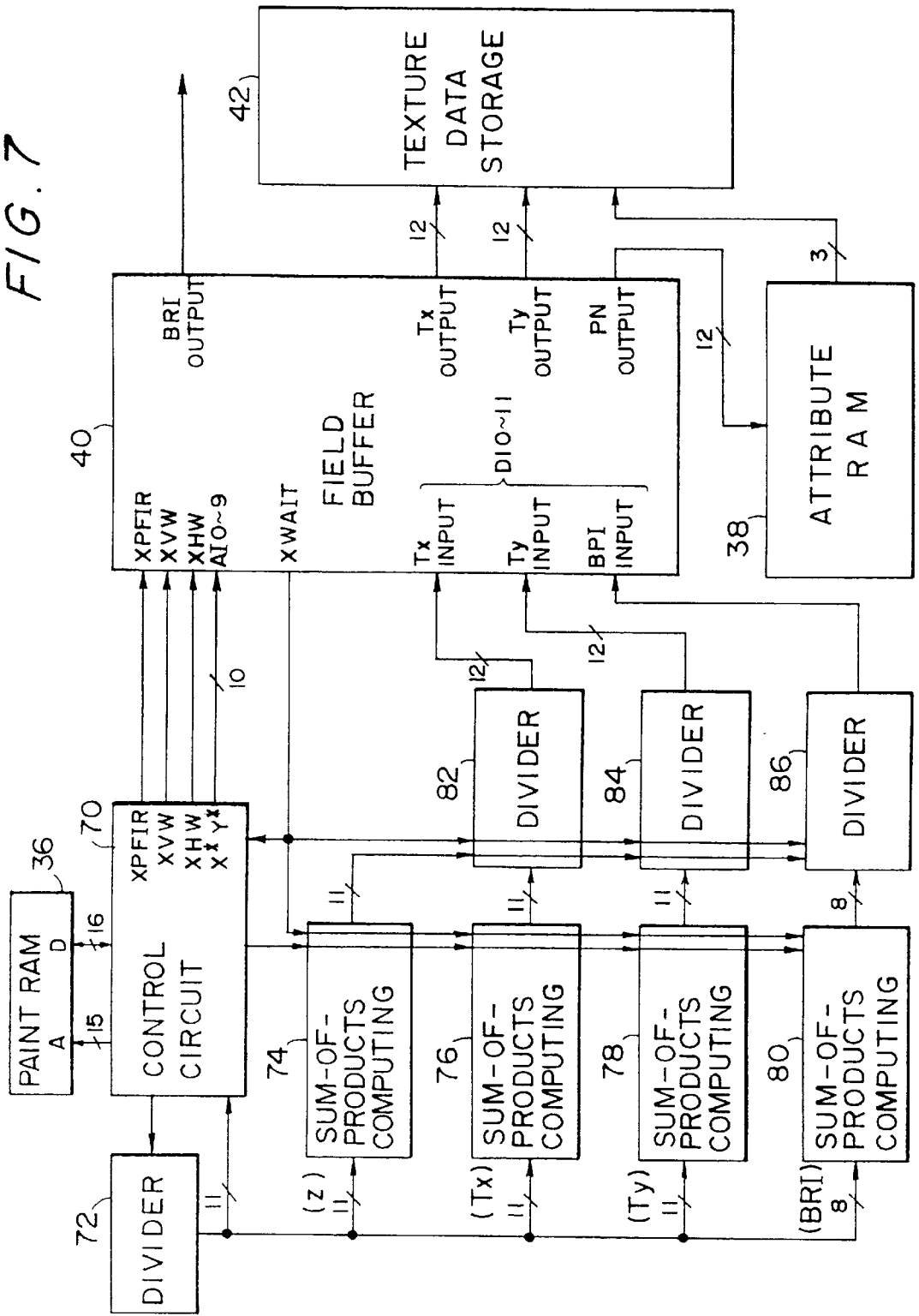
FIG. 7 is a block diagram showing the peripheral circuits of the field buffer unit and the connection therebetween.
Figure 8B:
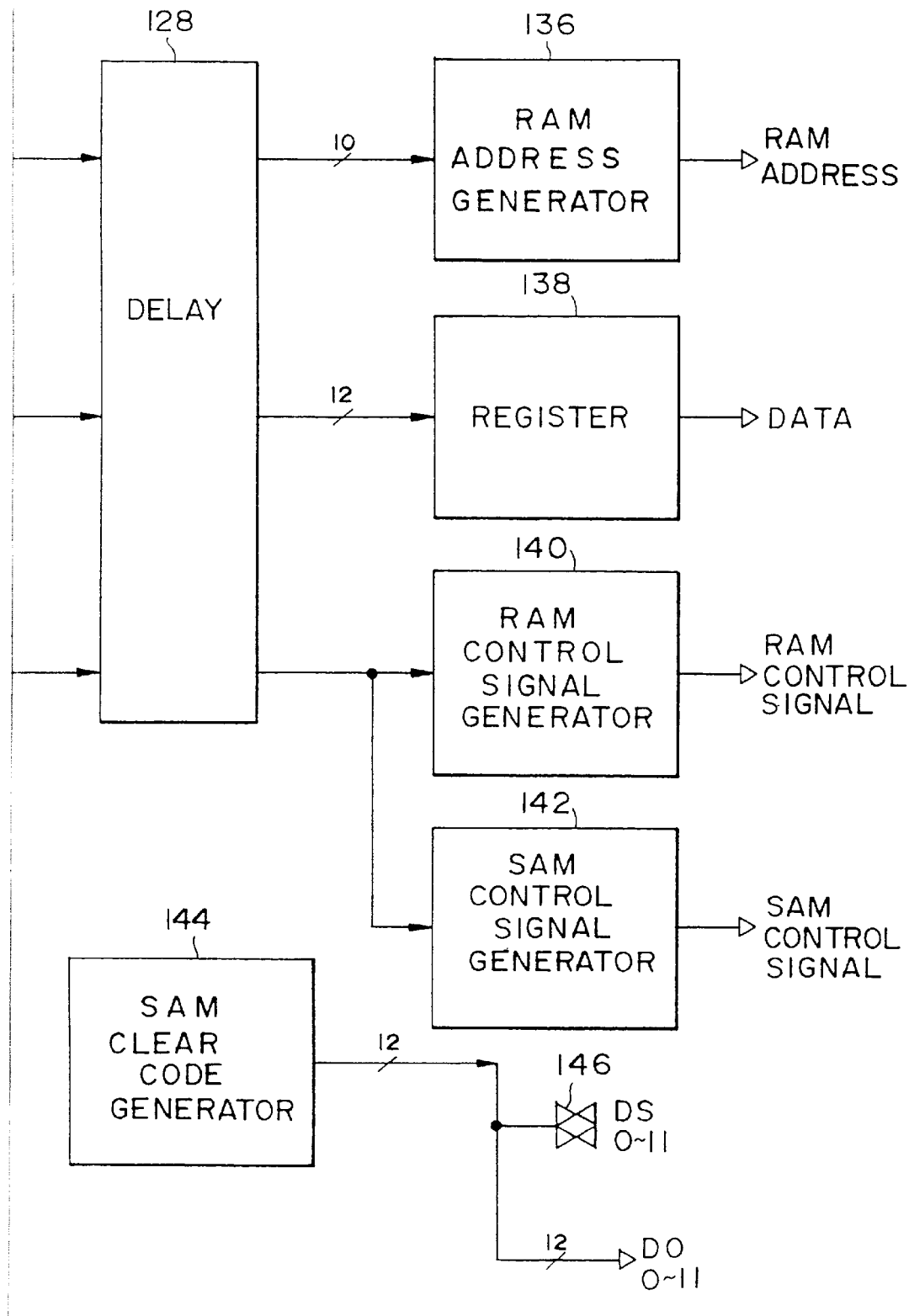

FIG. 7 shows the details of the peripheral circuits and connections therebetween in this field buffer unit 40 while FIG. 8 shows an internal circuitry in each of the field buffer controllers 90–96 which defines the field buffer unit 40. FIG. 9 shows a sequence of writing data to the field buffer unit 40.

As shown in FIG. 7, the field buffer unit 40 receives the following signals: the perspective-transformed representing coordinates X* and Y* are inputted from the control circuit 70 to the field buffer unit 40 as address signals AI0–9 and XPFIR, XVW and XHW are inputted to the field buffer unit 40 as control signals for the field buffer controllers 90–96. The texture coordinates TX, TY and BRI are also inputted from dividers 82–86 to the field buffer unit 40 as input DI0–11 for the field buffer controllers 92–96. Program signals of a program resistor clocks, synchronization signals and other signals are further inputted to the field buffer unit 40.

As shown in FIG. 7, the following signals are outputted from the field buffer unit 40. The field buffer unit 40 outputs XWAIT signal used to inhibit the data writing to the processor unit 30 which comprises the control circuit 70 and the like. The field buffer unit 40 also outputs texture coordinates TX and TY being read data to the texture data storage unit 42. The field buffer unit 40 further outputs polygon identification numbers PN to the attribute RAM unit 38 and brightness data BRI to a palette/mixer circuit 44.

The internal circuitry of each of the field buffer controllers 90–96 is as shown in FIG. 8.

The field buffer controllers in the present embodiment have three modes, which are master slave and extension. In the present embodiment, the field buffer controller 90 for handling the polygon identification numbers PN is used in the master mode; the field buffer controllers 92–94 for handling the texture coordinates TX and TY are used in the slave mode; and the field buffer controller 96 for handling the brightness data BRI is used in the extension mode. The field buffer controllers 92–96 used in the slave and extension modes are thus controlled under the management of the field buffer controller 90 used in the master mode and in synchronism with the field buffer controller 90. Therefore, a larger field buffer space can be simultaneously controlled by the field buffer controllers 90–96 which have the same circuit structure. In this case as shown in FIG. 8, the switching of master, slave and extension modes from one to another is carried out by a selector 116. In the master mode, a polygon identification number PN generated by a PN counter 118 is selected by the selector 116 and inputted to a data Queue 124. In the slave and extension modes, DI0–11 are selected and inputted to the data Queue 124.

Clock signals and external synchronization signals inputted to the field buffer controllers 90–96 are then inputted to an internal clock & synchronization signal generating circuit 134 which in turn generates internal clocks and a group of synchronization signals used as control signals for the field buffer controllers 90–96. A program signal is inputted to a programmable register 132 wherein internal parameter groups in the controllers are determined.

Address signals AI0–9 input data DI0–11 and control signals XPFIR, XVW and XHW are temporally latched by latches 110, 112 and 114.

The signal XPFIR is used to count up the PN counter 118, the count-up value thereof being used to determine the polygon identification number PN. In other words, as shown in FIG. 9, the signal XPFIR is outputted from the control circuit 70 of the main processor 32 such that XPFIR=L is established at each time when a new polygon begins to be processed. When XPFIR=L, the PN counter 118 will be counted up. Before the next field begins to be processed, the PN counter 118 is reset. In such a manner, polygon identification numbers PN 0 1, 2, 3, 4 and so on will sequentially be set at the respective polygons, starting from the highest priority thereof.

According to this embodiment, thus, the polygon identification numbers PN can be generated internally or in the field buffer controller 90 without any external input of polygon identification number PN. By utilizing this polygon identification number PN, the process can be carried out while separating the common and non-common polygon image representing data for dots forming a polygon from each other. Consequently, the hardware can be increased in speed and reduced in scale.

Address signals AI0–9 and input data DI0–11 are once accumulated in a coordinate Queue 122 of an eight-stage FIFO 120 and the data Queue 124 and then stored in the video RAMs. In this case, whether the address signals AI0–9 are recognized as X or Y address depends on the control signals XVW and XHW inputted into a Queue controller 126. As shown in FIG. 9, the addresses AI0–9 are recognized as Y address when XVW=L and XHW=H and as X address when XVW=H and XHW=L. Further, the signals XVW and XHW also serve as signals identifying whether or not the input data DI0–11 are effective.

A sequencer 130 monitors the data accumulated in the eight stage FIFO 120 to control the data by outputting XWAIT signal to the external and read control signal to the eight-stage FIFO 120. The sequencer 130 also generates sequence signal for controlling the video RAMs.

The X and Y data accumulated in the eight-stage FIFO 120 and Tx, Ty and BRI data are outputted to a RAM address generating circuit 136 and a register 138 through a delay circuit 128, respectively. The data accumulated in the register 138 will be written in the video RAMs according to RAM addresses which are generated by the RAM address generating circuit 136. Thus, by providing the eight-stage FIFO 120, data can be written into the video RAMs 100–106 without interruption of the computation in the forward stage processor unit 30 and so on. This can improve the process in efficiency. If the data output of the processor unit 30 varies too much, the number of stages in the FIFO may further be increased.

The sequence signal is outputted from the sequencer 130 to RAM control signal generating circuit 140 and SAM control circuit 142 through the delay circuit 128, respectively. Thus, these circuits will generate control signals for RAM being write port and control signals for SAM being read port, respectively.

A terminal 146 is a bidirectional data bus capable of switching from input to output and vice versa. When the serial port SAM is to be initialized, the terminal 146 is switched to the output side, through which clear codes generated by SAM clear code generating circuit 144 are outputted to initialize the memory. When it is wanted to read data from the SAM, the terminal 146 is switched to the input side through which the data stored in the SAM are inputted. The inputted data will be outputted from the field buffer controllers 90–96 as serial outputs D0–11. More particularly, the polygon identification number PN being output from the field buffer controller 90 is outputted toward the attribute RAM unit 38; the texture data TX and TY being outputs of the field buffer controllers 92 and 93 are outputted toward the texture data storage unit 42; the brightness data BRI being output of the field buffer controller 96 is outputted to the palette/mixer circuit 44 through the delay circuit 168.

FIG. 9 shows a sequence of writing data into the field buffer unit 40. As shown in FIG. 9, an image data is written into each polygon at each time when XPFIR=L. The addresses AI0–9 are controlled by using the XVW and XHW signals such that the data for every polygon will be written thereinto for one line.

(5) Attribute RAM Unit

As shown in FIG. 6, the attribute RAM unit 38 comprises an attribute RAM section 152 and an attribute data control section 150.

Attribute data inputted from the sorting unit 22, including palette number PAL, color Z value CZ, block number N and so on, are inputted into the attribute data control unit 150. The palette number PAL is a number used to specify a palette table; the color Z value CZ is used to deal with variations in color depending on variations in depth; and the block number N is used to specify a block in the memory space of the texture data storage unit 42. These attribute data have been stored in the attribute RAM 152 through the attribute control unit 150. The reading of data from the attribute RAM 152 performed in accordance with the polygon identification numbers PN from the field buffer unit 40. The read data will then be supplied so the palette/mixer circuit 44 for every polygon.

The block numbers BN used to specify the blocks in the storage space of the texture data storage unit 42 are generated by the attribute control circuit 150 and then supplied to the texture storage unit 42.

(6) Texture Data Storage Unit (Rendering Data Storage Unit)

The texture data storage unit 42, as shown in FIG. 6, comprises a character code storage section 160 and a character generator 164. The texture data storage unit 42 has stored data (e.g. color codes) that are used to display an actual scene on the texture coordinates TX and TY from the field buffer unit 40. To aid the storage unit in speed, the texture data storage unit 42 is of two-stage structure. These storage units may be formed by any suitable memory means such as mask ROM, EEPROM, SRAM, DRAM or the like. If a RAM is particularly used to rewrite the contents of the RAM for every one field (1/60 seconds), a unique image effect may be obtained as by feeding back its own image and by monitoring back to the texture.

Figure 10:
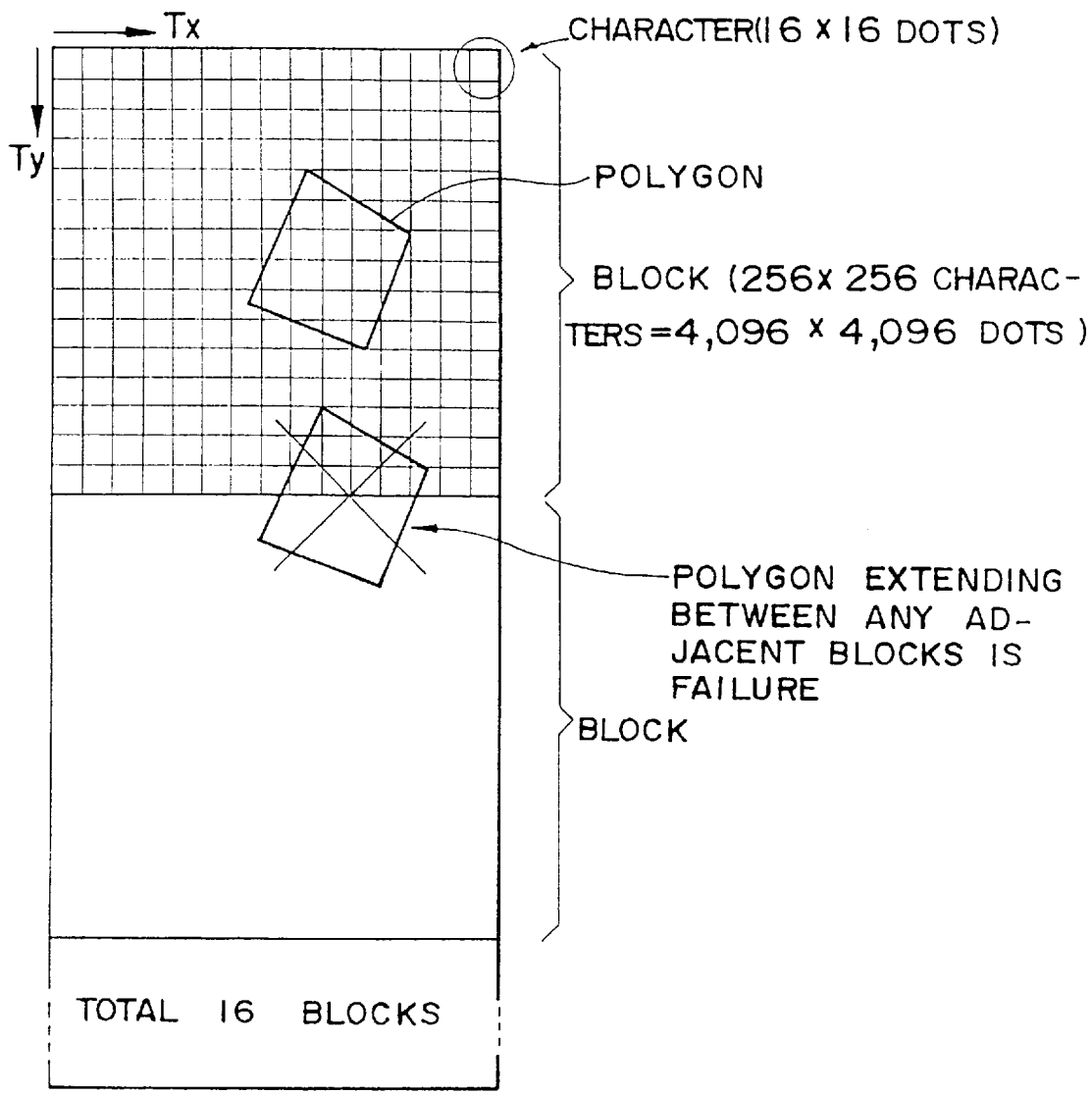
FIG. 10 is a schematic view illustrating the structure of a texture storage plane.

FIG. 10 shows a plane of texture storage that is defined by the texture data storage unit 42.

The texture storage plane is of such a stratum structure as shown in FIG. 10. This provides a larger texture storage plane realized by a smaller storage capacity. More particularly, the texture storage plane may be divided into 16 blocks each of which blocks is divided into 256×256 characters. Each of the characters is further divided into 16×16 dots and has stored a pattern used to define the texture storage plane. The texture storage plane is fully filled with such a pattern.

As shown in FIG. 10, the texturing to a polygon is performed by specifying vertex coordinates of the texture applied to that polygon. However, the polygon cannot be specified to extend between adjacent blocks.

Figure 11:
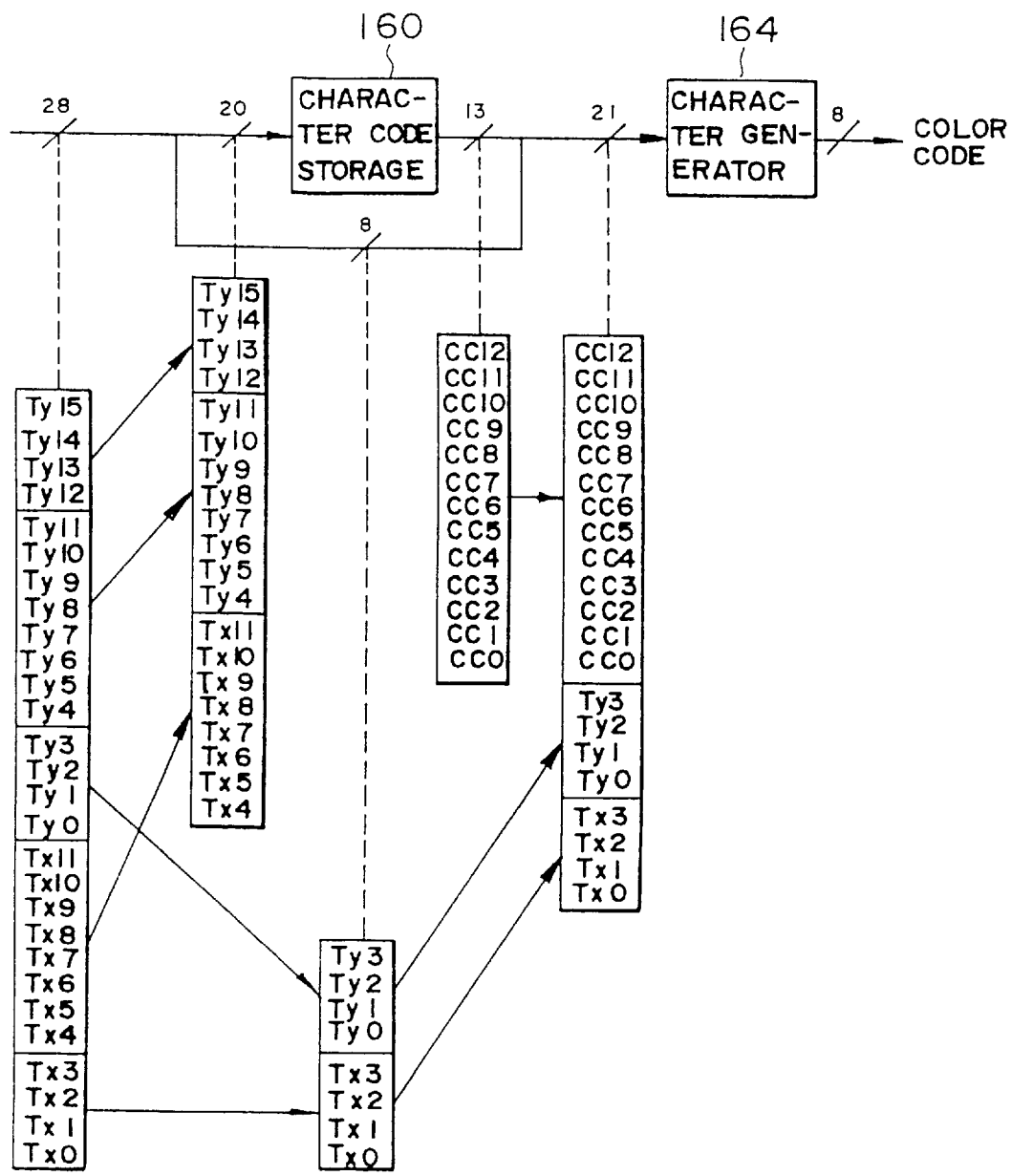
FIG. 11 is a schematic view illustrating the flow of data in the texture data storage unit.

FIG. 11 shows a flow of data in the texture data storage unit 42.

In the present embodiment, the texture data storage unit 42 receives a data of total 28 bits including texture X coordinates TX0–TX11 of 12 bits and texture Y coordinates TY0–TY15 of 16 bits.

The low-order bits TX0–TX3 and TY0–TY3 in these texture coordinates are used to address characters in the character generator 164 while the high-order bits TY12–TY15 of the texture Y coordinates are used to specify block numbers BN in the texture storage plane. In other words, blocks in the texture storage plane are specified by the high-order bits TY12–TY15 while characters in each of the blocks are addressed by the bits TX4–TX11 and TY4–TY11. Thus, character codes CC0–CC12 will be read out from the character code storage section 160. On the other hand, the low-order bits TX0–TX3 and TY0–TY3 are joined directly with the character codes CC0–CC12 bypassing the character code storage section 160 and then supplied to the character generator 164. Subsequently, the character generator 164 will output an 8-bit color code which is the final output thereof to the palette/mixer circuit 44.

(7) Palette/Mixer Circuit

The Palette/mixer circuit 44 one hat synthesizes RGB data used to output an image from the brightness data BRI, color data COL, palette numbers PAL and color Z values CZ. More particularly, an output image is synthesized by taking RGB data out of a preset palette using dot data stored in the field buffer unit 40 and polygon data stored in the attribute RAM 38. The palette has stored color data of total 24 bits including each RGB of 8 bits. The palette is totally divided into 128 banks which are addressed by palette numbers PAL. Each of the banks has data of 256 colors which are specified by color codes COL.

Figure 12:
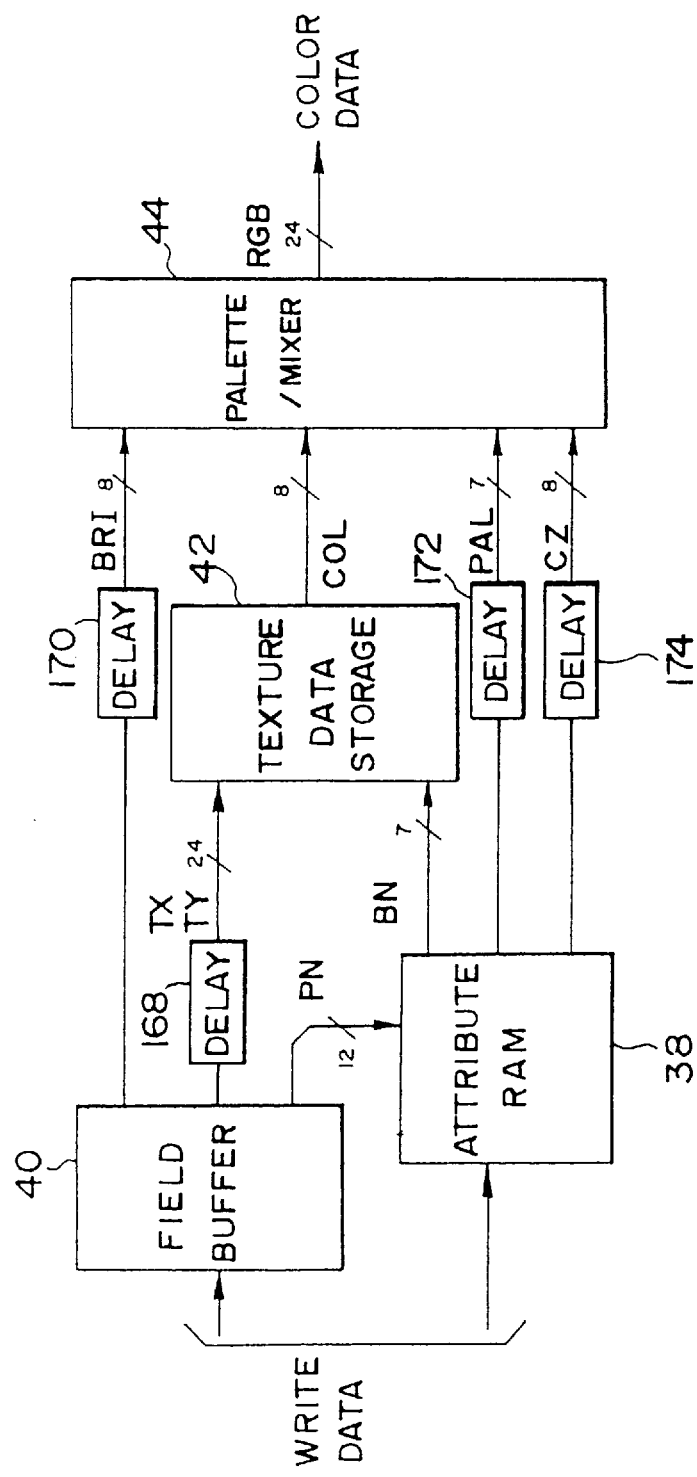
FIG. 12 is a block diagram illustrating the flow of data until an image is outputted after the data have been written to the field buffer unit.

FIG. 12 shows a flow of signal in a period after data have been written in the field buffer unit 40 and attribute RAM unit 38 and until a final image is outputted from the system.

① Data (PN, TX, TY, BRI) are outputted from the field buffer unit 40 for every one dot.

② Polygon data (BN, PAL, CZ) corresponding to said polygon identification number PN are outputted from the attribute data RAM unit 38.

③ The data TX, TY and BN are inputted into the texture data storage unit 42 which in turn outputs the corresponding color data COL. In this case, the data TX and TY are inputted into the texture data storage unit 42 through a delay circuit 168 to time with the input of the data BN through the attribute RAM unit 38.

④ The data COL, BRI and CZ are timed with each other by delay circuits 170, 172 and 174 so that these data will simultaneously be inputted into the palette/mixer circuit 44. A bank and color code therein in the palette are specified by PAL and COL to select one color data from the palette. The selected color data is computed in color by the values BRI and CZ. Thereafter, the color data is gamma corrected before D/A conversion. The converted color data is a RGB data which is outputted from the palette/mixer circuit 44 to the CRT 46 Wherein an image is displayed.

(8) Subsampling(thinning)/Interpolation (A) Summary

As described, the present embodiment stores the texture coordinates in the field buffer unit 40, rather than the color data itself. This enables the image synthesization to use such a subsampling/interpolation technique as will be described below. As a result, the hardware can be increased in speed and reduced in scale.

In order to decrease the number of computations in the hardware to increase in speed and to reduce in scale, the number of computations for the most data that is, the number of linear interpolations for representing coordinates, texture data, brightness data and other data in the displayed scene for the respective dots, may be reduced. To this end, there is one effective means for subsampling these data and interpolating data on output.

In the bit-map type image synthesizing system of the prior art, however, the color data themselves are stored in the field buffer unit. If the subsampling/interpolation is to be carried out in the prior art, it raises the following problems. In this case, if the color data stored in the field buffer unit includes color codes or are coded color data, the interpolation itself is impossible. This is completely out of the question. If the stored color data is RGA output or the like, the quality of a synthesized image is extremely degraded. More particularly, the texture data is optionally provided depending on an image to be displayed. The row of the texture data has neither linearity nor mathematical regularity. As a result, subsampling such data means that the image data itself is partially lost. Such a partially lost image data cannot be recovered by interpolation. Thus, the quality of the synthesized image is very inferior in partial loss of data and others.

Figure 13B:
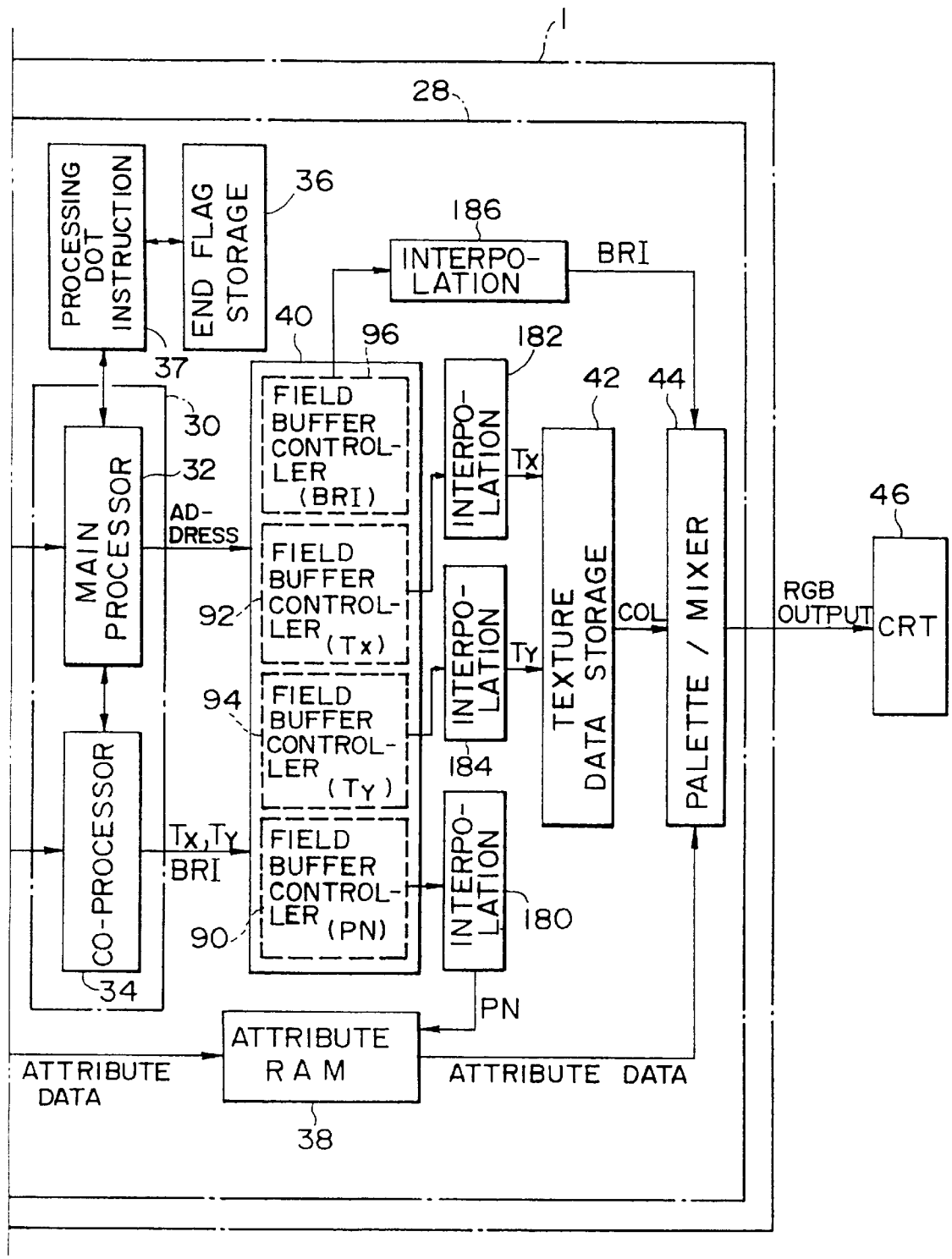

In the contrast, in the present embodiment the texture coordinates TX and TY are stored in the field buffer controller 40. Therefore, the subsampling/interpolation is possible. More particularly, the subsampling of the texture coordinates and others can be carried out by the processor unit 30. As shown in FIG. 13, interpolation circuits 180, 182, 184 and 186 may be disposed in the output of the field buffer unit 40 to execute the interpolation such that texture coordinates and other data at the ignored points by subsampling are determined to read the texture data from the texture data storage unit 42. In such a case, the texture coordinates on the screen are nonlinear data. However, by linearly interpolating such non-linear data by small sections, it is possible to obtain a high-quality image without substantial deterioration.

Thus, the image synthesizing system of the present invention can maintain the quality of a synthesized image very well while the number of computations which required the most amount of data can be reduced one-half or less at each time when data are subsampled. Therefore, the hardware can be increased in speed and reduced in scale.

The summary of this embodiment for performing the subsampling/interpolation will now be described. As shown in FIG. 13, the structure of this embodiment is substantially the same as that of FIG. 1 except that it further comprises a subsampling means and in interpolation means.

Figure 14:
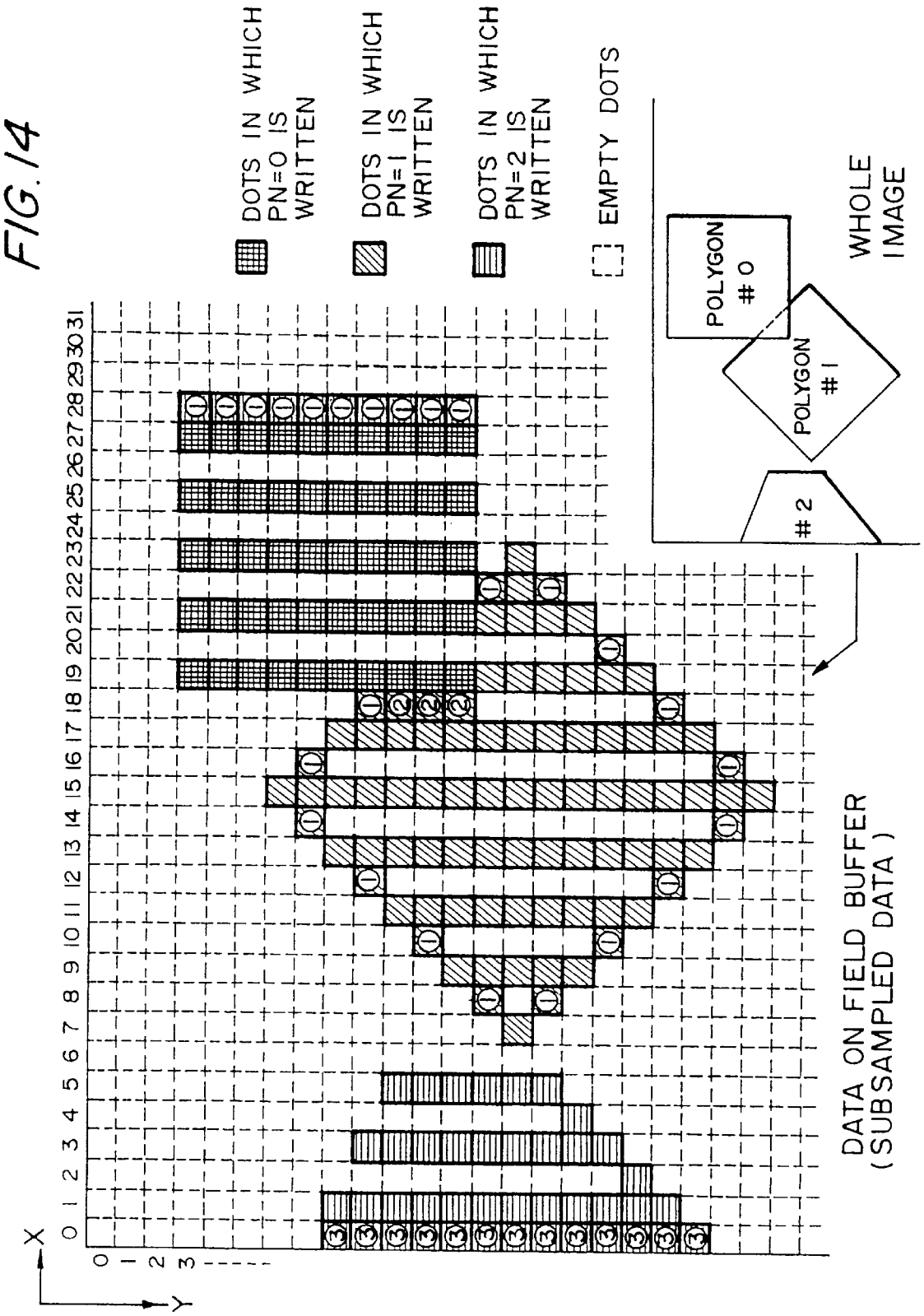
FIG. 14 is a schematic view exemplifying subsampled data on the thinned field buffer unit.

In the image synthesizing system shown in FIG. 13, the subsampling means is included in the processor unit 30. More particularly, this is realized by performing the subsampling when each dot on the scan lines in the processor unit 30 is processed. This subsampling is carried out, for example, according to the following rule, as shown in FIG. 14.

The subsampling process is carried out for each dot in the horizontal direction (X direction), for example, for each dot in which X is an even number. However, the following dots will not be ignored by subsampling:

① Dots representing the outline of a polygon;

② Dots on the boundary between adjacent polygons; and

③ Dots on left and right side of the scene.

Images from subsampled data on the field buffer according to the above rule are shown in FIG. 14. As shown in this figure, dots corresponding to those described in the above items ①–③ are not ignored by subsampling, with the other dots being ignored by subsampling for every dot.

Empty dots are dots ignored by subsampling according to the above rule or background dots which are not used to draw the polygon. Empty dots are set, for example, at TX=TY=FFFh. When the data for one scene begin to be written, all the dots in the field buffer are cleared (all bits are set to be 1) and the value of FFFh will be set at all the dots.

The interpolation means will now be described. The interpolation means in this embodiment is realized by connecting the interpolation circuits 180, 182, 184 and 186 to output of the field buffer unit 40, as shown in FIG. 13. One of the interpolation circuits 180 is used to interpolate the polygon identification number PN; two other interpolation circuits 182 and 184 are used to interpolate the texture coordinates TX and TY. The last interpolation circuit 186 is used to interpolate the brightness data BRI. More particularly, the operations of these interpolation circuits 180–186 are carried out, for example, according to the following rule as shown in FIG. 15.

The interpolation is performed to the following dots:

① Empty dots (i.e., TX=TY=FFFh) and also

② Dots adjacent to the empty dots, which have the same identification number and are not empty dots.

The interpolation is carried out by applying the following process to the empty dots above:

① The polygon identification number PN of the empty dots are changed to the same PN as in the adjacent dots.

② The texture coordinates TX, TY and brightness data BRI are set to be an average value between the data TX, TY and BRI in the adjacent dots.

FIG. 15 shows an interpolation carried out according to the above rule. As shown in FIG. 15, the interpolation is performed to empty dots which are surrounded by dots having the same polygon identification number PN. Namely, in FIG. 5, the interpolation is executed for dots which are empty dots and which are adjacent to dots that have the polygon identification number PN of "0". In constrast, the interpolation will not be made to dots which are empty, but adjacent to dots having different polygon identification numbers PN, because it is judged that such dots are not ignored dots by subsampling and judged to be space between adjacent polygons.

As shown in FIG. 15, the following interpolation is performed on dots to be interpolated. First, the interpolation circuit 180 sets the polygon identification number of empty dots that is the same polygon identification number PN as in the adjacent dots. In this example, there is set to be PN=0.

The interpolation circuits 182 and 184 determine, for example, an average value between the texture coordinates TX and TY of the adjacent dots to the empty dot. This value is set as the texture coordinates TX and TY in that empty dot. In this example, values of TX=150 and TY=30 will be set.

Similarly, the interpolation circuit 186 determines, for example, an average value between the brightness data BRI of the adjacent dots. This value is set as the brightness data BRI at the empty dot. In this example, a value of BRI=48 will be set.

The details of the present embodiment for performing the subsampling/interpolation will now be described on arrangement and operation.

(B) Details of Subsampling Means

The subsampling process in this embodiment is carried out when each dot on the scan lines shown in FIGS. 4D and 4H is computed. This is accomplished by changing the count-up value of X coordinate when each dot on the scan line is computed. For example, if the rate of subsampling is to be one-half, this count-up value is two. If the rate of subsampling is to be one-third, the count-up value may be three. Thus, the computation for dots on the scan fine will be performed for every set of two or three dots. This enables the subsampling process to be carried out.

Although this embodiment has been described as to the subsampling carried out when each dot on the scan line is computed, the present invention is not limited to it. For example, the subsampling process may be carried out on computing outline points shown in FIGS. 4C and 4G. In such a case, the rate of subsampling can be changed by changing the count-up of Y coordinate when the outline points are computed.

(C) Details of Interpolation Means

Figure 16:
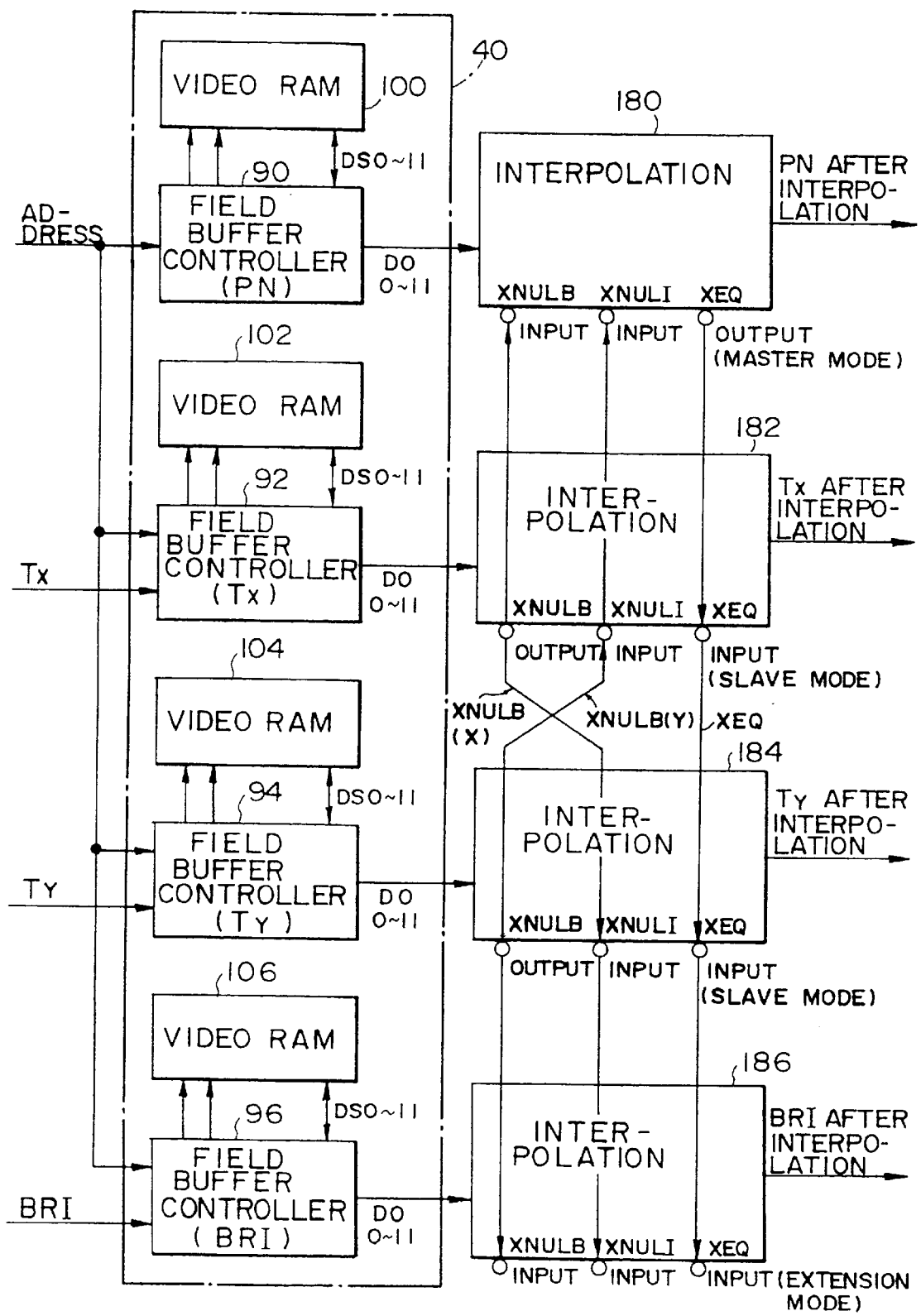
FIG. 16 is a block diagram showing the concrete circuit form of the present embodiment for carrying out the subsampling/interpolation.
Figure 17B:
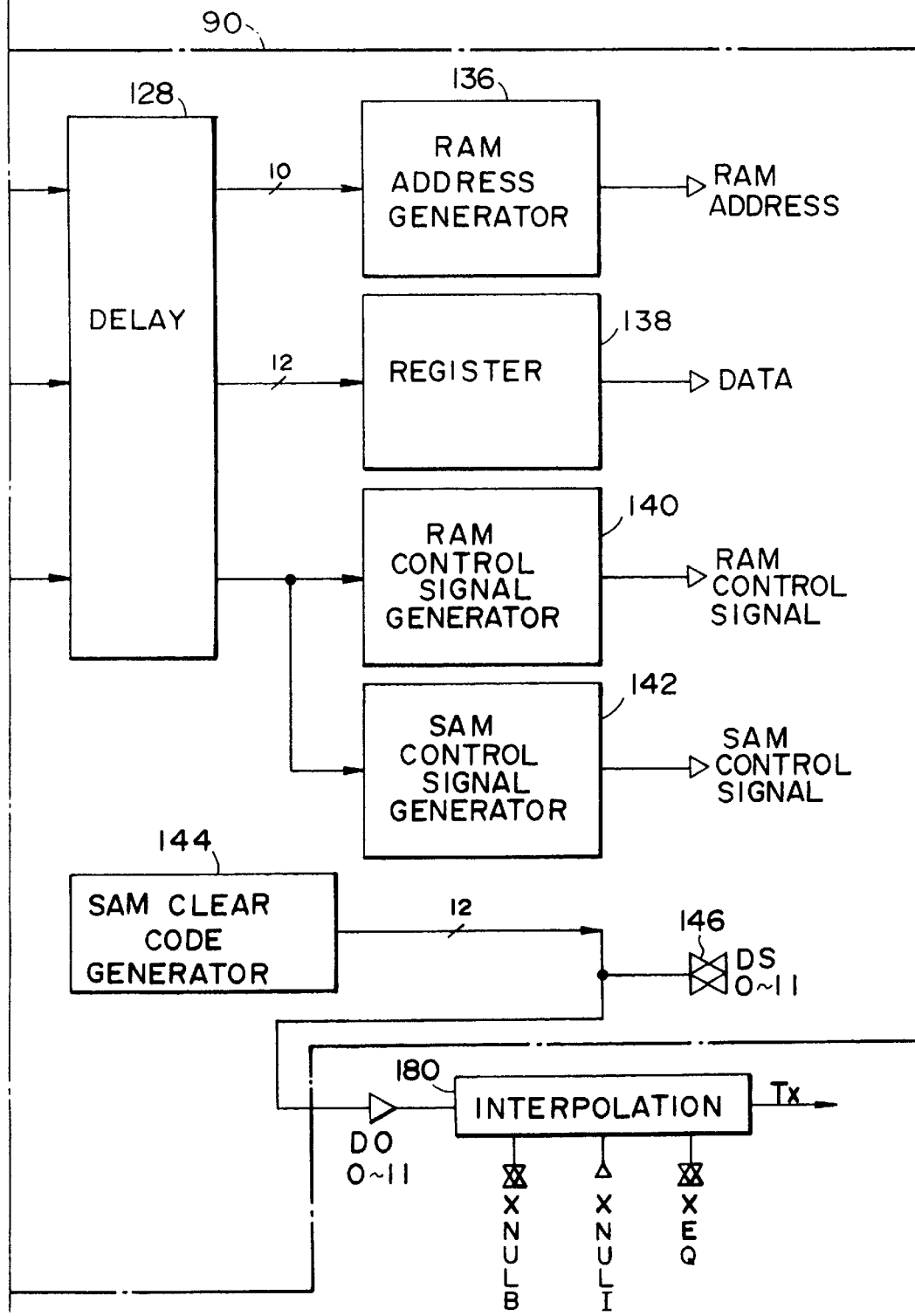
Figure 18:
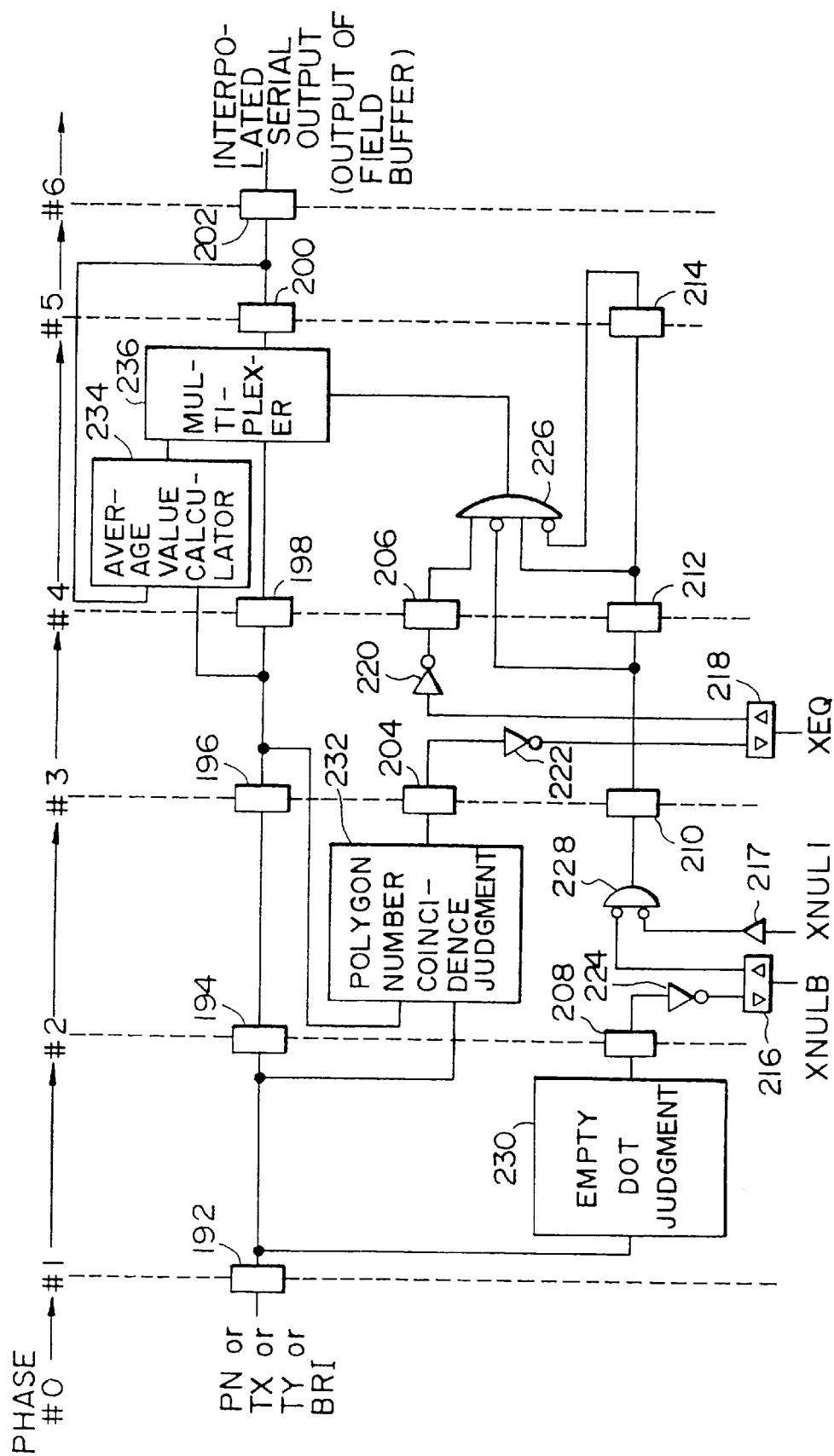
FIG. 18 is a block diagram showing the internal circuits of the interpolation circuit.

As described, the interpolation means in the present embodiment is defined by providing the interpolation circuits 180–186 in the output of the field buffer unit 40. FIG. 16 shows the relationship between the video RAMs 100–106 field buffer controllers 90–96 and interpolation circuits 180–186 which are connected together in this embodiment. FIG. 17 shows the relationship between the PN field buffer controller 90 and PN interpolation circuit 180 connected to each other (the connection between the TX, TY and BRI field buffer controllers 92, 94, 96 and the interpolation circuits 182, 184, 186 being in the similar relationship). FIG. 18 shows an internal circuitry in each of the interpolation circuits 180–186.

As shown in FIG. 16, the writing operation of this embodiment to the video RAMs 100–106 is carried out by randomly writing data through the field buffer controllers 90–96 in response to a given address signal. On the other hand, the reading operation of data from the video RAMs 100–106 is carried out by serially reading data through DS0–11 terminals in synchronism with dot clocks. In such a case, data inputted from the bi-directional buffers DS0–11 of the field buffer controller 90 are serially outputted toward the interpolation circuit 180 through the outputs DO0–11 as shown in FIG. 17. Similarly, data are serially outputted from the outputs D0–11 of the field buffer controllers 92–96 toward the interpolation circuits 182–186. In this case, the interpolation circuits 180–186 are formed into the same structure as shown in FIG. 18. The control between the respective interpolation circuits 180–186 will be carried out through XNULB, XNULI, XEQ terminals.

In the internal circuit of each of the interpolation circuits 180–186 shown in FIG. 18, registers 192–214 have a data holding/shifting function. Logic circuits 220, 222, 224, 226 and 228 function to perform logical computations such as NOR and others. An empty dot judging circuit 230 is used to judge whether or not a dot to be processed is empty dot. A polygon number coincidence judgment circuit 232 is used to judge whether or not dots adjacent to the dot to be processed have the same polygon identification number PN. An average value computing circuit 234 is used to determine average values between the texture coordinates TX, TY and brightness data BRI of the adjacent dots when the interpolation is carried out. A multiplexer 236 is used to select one of the Interpolated and original data to be outputted.

As described, in this embodiment, the field buffer controller 90 for handling the polygon identification numbers PN is used in the master mode; the field buffer controllers 92 and 94 for handling the texture coordinates TX and TY are used in the slave mode; and the field buffer controller 96 for handling the brightness data BRI is used in the extension mode. The XNULB and XEQ terminals of the interpolation circuits 180–186 which are bi-directional buffers are used as output or input terminals depending on the respective mode, as shown in FIG. 16. More particularly, the XNULB terminal of the interpolation circuit 180 (master mode) becomes an input terminal and the XEQ terminal becomes an output terminal. The XNULB and XEQ terminals of the interpolation circuits 182 and 184 (slave mode) become output and input terminals, respectively. Both the XNULB and XEQ terminals of the interpolation circuit 186 (extension mode) become input terminals. Further, the XNULI terminals in all the interpolation circuits 180–186 are used as input terminals.

In order to perform the interpolation as shown in FIG. 15, the values PN, TX, TY and BRI of dots before and behind a dot to be interpolated must be referred to. Therefore, signals used to perform a communication between the interpolation circuits 180–186 are required. The interpolation control signals XNULB, XNULI and XEQ can be used as such signals.

As shown in FIG. 18, the XNULB terminal 216 is a bi-directional buffer. The interpolation circuit 182 in the slave mode outputs a signal representing whether or not the value TX of a dot to be processed is FFFH as an XULB signal (which will be referred to "XNULB (X) signal" hereinafter). Similarly, the interpolation circuit 184 also outputs a signal representing whether or not the value TY is FFFH as an XNUB signal (which will be referred to "XNULB (Y)" signal hereinafter). Whether or not the TX or TY is FFFH is judged by an empty dot judging circuit 230. When TY=FFFH, the XNULB (X) signal becomes "0". When TY=FFFH, the XNULB (Y) signal becomes "0". If both XNULB (X) and XNULB (Y) signals are "0", it is judged that that dot is an empty dot.

As shown in FIG. 16, the XNULB (X) signal which is the output signal of the interpolation circuit 182 is inputted into the XNULB terminal of the interpolation circuit 180 and into the XNULBI terminals of the interpolation circuits 184 and 186. Similarly, the XNULB (Y) signal which is the output signal of the interpolation circuit 184 is inputted into the XNULI terminals of the interpolation circuit 180 and 182 and into the XNULB terminal of the interpolation circuit 186. Therefore, the logic circuits 228 of the interpolation circuits 180–186 shown in FIG. 18 will receive the XNULB (X) and XNULB (Y) signals through the XNULB and XNULI terminals. As a result, the output of the logic circuit 228 becomes "1" when both XNULB (X) and XNULB (Y) signals are "0" that is, when it is judged that the dot to be processed is an empty dot. The output of this logic circuit 228 is then transmitted to registers 212, 214, logic circuit 226 and others.

The XEQ terminal 218 also is a bi-directional buffer. In the master mode, the interpolation circuit 180 outputs a signal showing whether or not dots adjacent to that to be processed have the same polygon identification number as an XEQ signal. More particularly, the polygon identification numbers PN of the dots held in the registers 192 and 196 are inputted into the polygon number coincidence judgment circuit 232. If there is a coincidence, the output of the XEQ terminal becomes "0".

In the slave and extension modes, the XEQ terminals 218 of the interpolation circuits 182–186 are input terminals. As shown in FIG. 16, the XEQ signal which is output of the interpolation circuit 180 is inputted into the interpolation circuits 182–186. Thus, they will be informed whether or not the polygon identification numbers PN of the dots adjacent to the dot to be processed is coincide with each other. If the polygon identification numbers PN of the adjacent dots are coincide with each other, the output of the XEQ terminal of the interpolation circuit 180 becomes "0" and then inputted into inverters 220 in the interpolation circuits 180–186. The outputs of the inverters 220 will be inputted into register 206 and logic circuit 226.

If a dot to be processed is an empty dot and when the polygon identification numbers PN of not-empty dots adjacent to that dot coincide with each other, it is judged that that dot should be interpolated. Thus, the output of the logic circuit 226 in FIG. 18 becomes "1" and the multiplexer 236 selects the output of the average value computing circuit 234, rather than the output of the register 198. As a result, the average values of PN, TX, TY and BRI which have been held in the registers 196 and 200 are calculated to compute the interpolation data. In this case, further, the calculation of average value at the adjacent dots is equivalent to the setting of the same polygon identification number PN as in the adjacent dots because the polygon identification numbers PN of the adjacent dots are coincide with each other. In his embodiment, thus, the interpolation of the polygon identification number PN, texture coordinates TX, TY and brightness data BRI can be carried out through the interpolation circuits of the same circuit arrangement.

Figure 19:
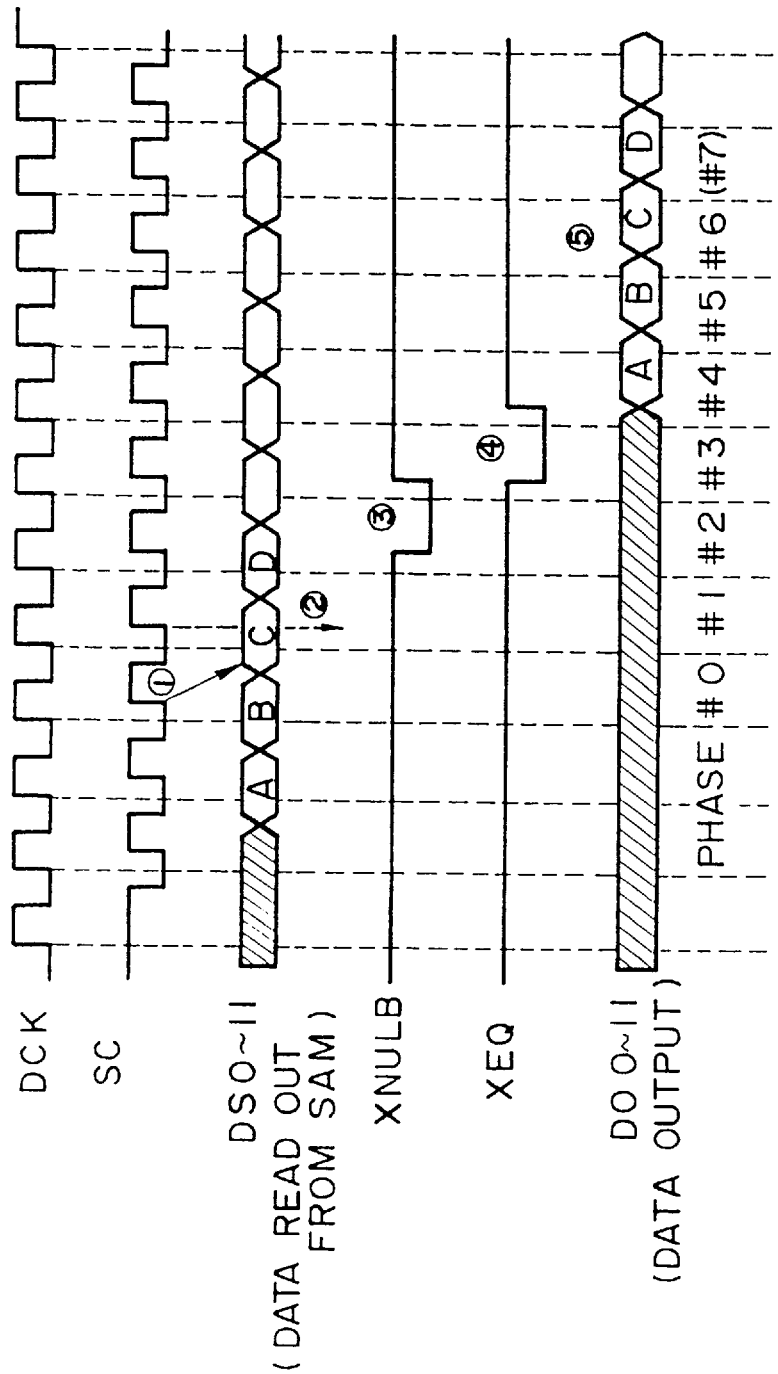
FIG. 19 is a timing chart illustrating the operation of the interpolation circuit.

FIG. 19 shows data which are read out from the video RAMs and interpolated by the field buffer controllers before they are outputted therefrom.

As shown in FIG. 19, the present embodiment performs the interpolation in a pipe-line manner through seven phases (#0–#6) which will be described below:
0 SAM Reading Phase
On rising of SAM reading clock SC, the corresponding dot data is outputted from the multi-port video RAMs.
1 SAM Data Taking Phase
Data reaching DS0–11 are taken in the field buffer controllers 90–96 and interpolation circuits 180–186 in synchronism with the clock SC.

2 Empty Dot Judgment Phase
The interpolation circuits 182 and 184 (slave mode) check whether or not the values of TX and TY are FFFh and outputs XNULB signals.
3 Subsampled Dot Judgment Phase
The interpolation circuit 180 (master mode) compares the polygon identification numbers PN in the adjacent dots with each other and outputs an XEQ signal representing whether or not there is a coincidence.
4 and #5 interpolation Phase
Interpolation of the polygon identification number PN, texture coordinates TX, Ty and brightness data BRI is carried out by determining an average value between adjacent dots. With respect to dots which are not interpolated, however, the multiplexer 236 permits the data to pass therethrough without any treatment.
6 Data Output Phase
Data is outputted in synchronism with the rising of dot clock DCK.

Items ① to ⑤ in FIG. 19 represent the following matters: ① Data is read out from the video RAM through the rising of SC (Phase #0); ② Data is taken in the field buffer controllers 90–96 and interpolation circuits 180–186 (Phase #1); ③ XNULB corresponding to data (C) is outputted (Phase #2); ④ XEQ corresponding to data (C) is outputted (Phase #3); and ⑤ The interpolated data is outputted.

(9) Parallel Arranged Systems and Common Texture Data Storage

As described, the present embodiment causes the texture coordinates rather than color data to be stored in the field buffer unit 40 so that the subsampling/interpolation can be carried out. The present embodiment has another advantage in that by storing the texture coordinates in the field buffer unit 40, a common texture data storage unit 42 can be shared by the image computing units if part of or all of the computation is done in parallel. The image computing unit is one that can perform an image computation such as a formation of 3-D image, a 3-D computation to data of 3-D image, a computation of coordinates and corresponding texture coordinates at each dot in polygons defining a 3-D image or the like. In this embodiment, the image computing units correspond to the same space processing unit 13, image supply unit 10, processor unit 30 and others.

In order to increase the quality of a displayed image, the number of polygons processable during one field may be increased or the number of displayable dots may be increased to increase the image resolution. To this end, a plurality of image supply units 10, processor units 30 or field buffer units 40 may be provided to perform the computations in parallel. For example, if a plurality of image supply units 10 are provided to perform the computations in parallel, the number of polygons processable during one field may be increased. If a plurality of processor units 30 are provided to execute the computations in parallel, the number of dots drawable during one field may be increased to improve resolution of image.

Figure 20:
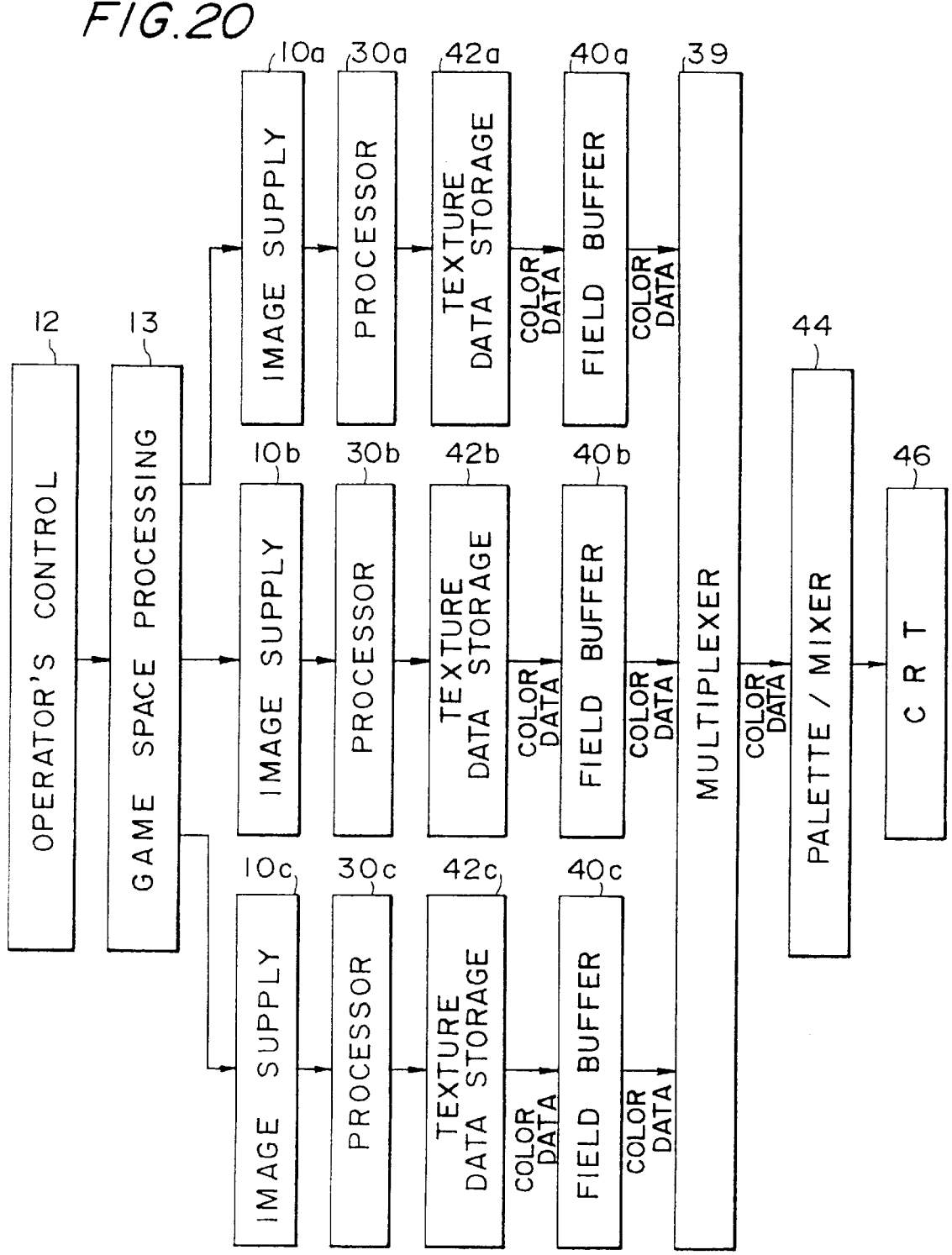
FIG. 20 is a block diagram of the parallel image processing computation through the bit-map system of the prior art, that is, through such a system that color data are stored in the field buffer unit.

In the bit-map type image synthesizing system of the prior art, however, the color data itself is stored in the field buffer unit. If such a bit-map type image synthesizing system of the prior art is to perform a parallel computation through the image supply unit 10, processor unit 30 and field buffer unit 40, it will be a form shown in FIG. 20. In such an arrangement, as shown in FIG. 20, the image synthesizing system requires a plurality of texture data storage units 42a–42c in addition to a plurality of image supply units 10a–10c, a plurality of processor units 30a–30c and a plurality of field buffer units 40a–40c. The multiplexer 39 will select, when required, color data outputted from the field buffer units 40a–40c and output an image through the palette/mixer circuit 44 and CRT 46. To perform the parallel computation in the bit-map type image synthesizing system of the prior art, a plurality of texture data storage units 42a–42c corresponding to the respective processor units 30a–30c and field buffer units 40a–40c must be provided.

Figure 21:
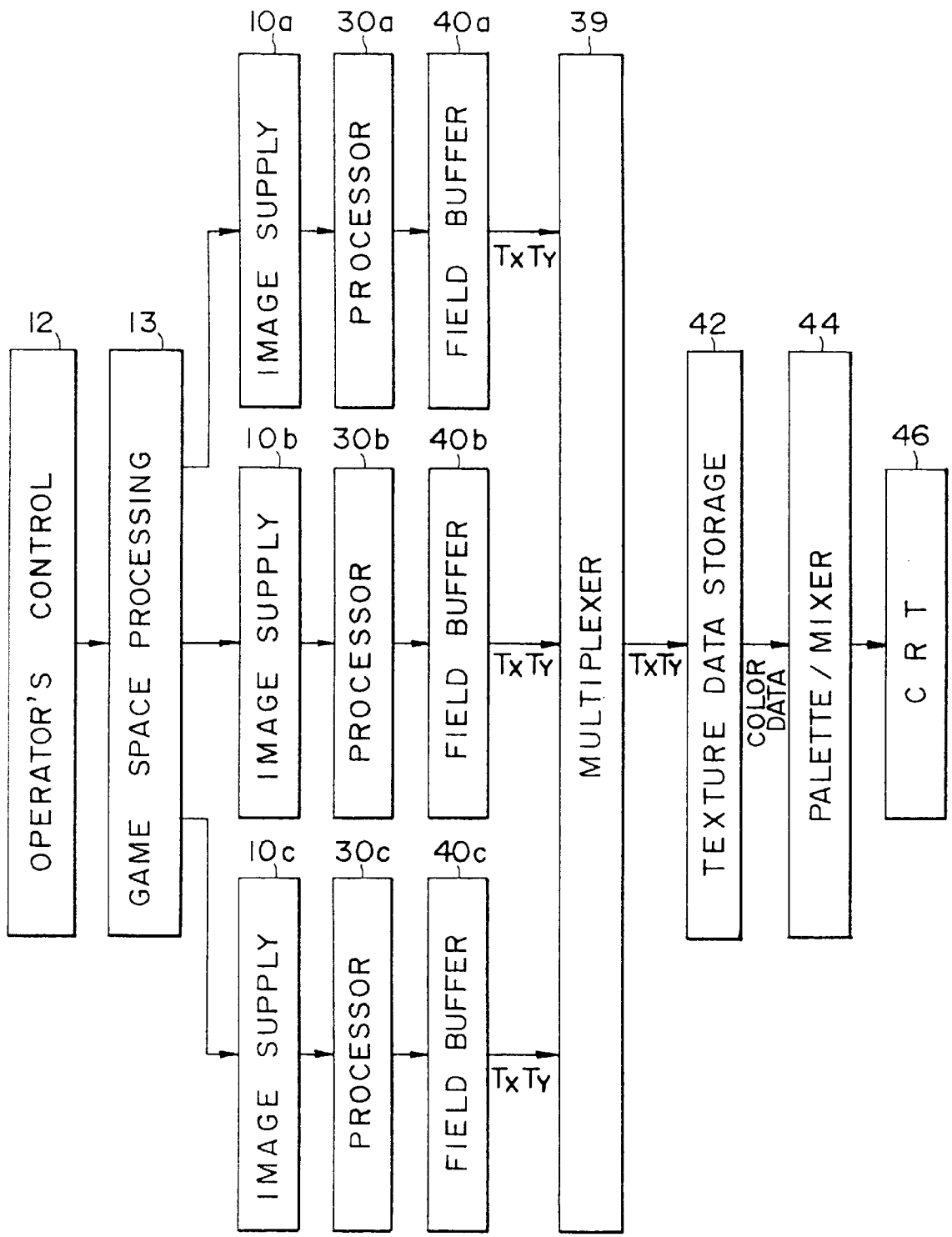
FIG. 21 is a block diagram of the parallel image processing computation according to the present embodiment, that is, through such a system that texture coordinates are stored in the field buffer unit.

In contrast, the present embodiment is arranged such that the texture coordinates are stored in the field buffer units 40a–40c. If it is required to make the parallel computation as shown in FIG. 21, therefore, at least one-texture data storage unit 42 may be provided in the rearward stage of the multiplexer 39. The parallel computation can be carried out only by the image supply units 10a–10c, processor units 30a–30c and field buffer units 40a–40c, as shown in FIG. 21. The texture coordinates TX and TY which are outputs of the field buffer units 40a–40c are selected when required by the multiplexer 39 to read out the desired color data from the texture data storage unit 42 and to output an image through the palette/mixer circuit 44 and CRT 46.

In the texture mapping type image synthesizing system, the texture data storage unit 42 is normally of a very large-scale capacity, for example, a capacity of 100 or more MBIT in this embodiment. To improve the quality of a displayed image, more detailed texture data must be stored in the texture data storage unit 42. In order to improve the quality of a displayed image, therefore, the storage capacity of the texture data storage unit 42 must be further increased. Particularly in such a texture mapping type image synthesizing system different textures can be applied to polygons of the same shape to synthesize images having different impressions. For example, a number of houses having completely different impressions from one another can be represented by changing textures of roof, door and wall, even if they are 3-D objects formed from the same polygons. In this sense, for forming a more delicate image improved in quality more storage capacity is required in the texture data storage unit 42 as large as possible.

However, the image synthesizing system shown in FIG. 20 must have a plurality of texture data storage units 42a–42b as shown in the same figure. This results in very increased scale in the entire hardware of the image synthesizing system. If the texture data storage units 42a–42c are made of SRAM, DRAM or the like, writing, reading and other operations should be controlled by CPU and the like, also requiring their control signals. The control circuits are thus complicated and the wiring areas for control signals are also increased into a huge scale. As a result, the hardware will extremely be increased in scale. Even if the parallel computation is carried out in the present embodiment as shown in FIG. 21, however, the texture data storage unit 42 may not be divided into a plurality of units. A circuit for controlling the writing, reading and other operations may be of a simplified form without increasing wiring areas for control signals. Therefore, the hardware can be reduced in scale.

Figure 22A:
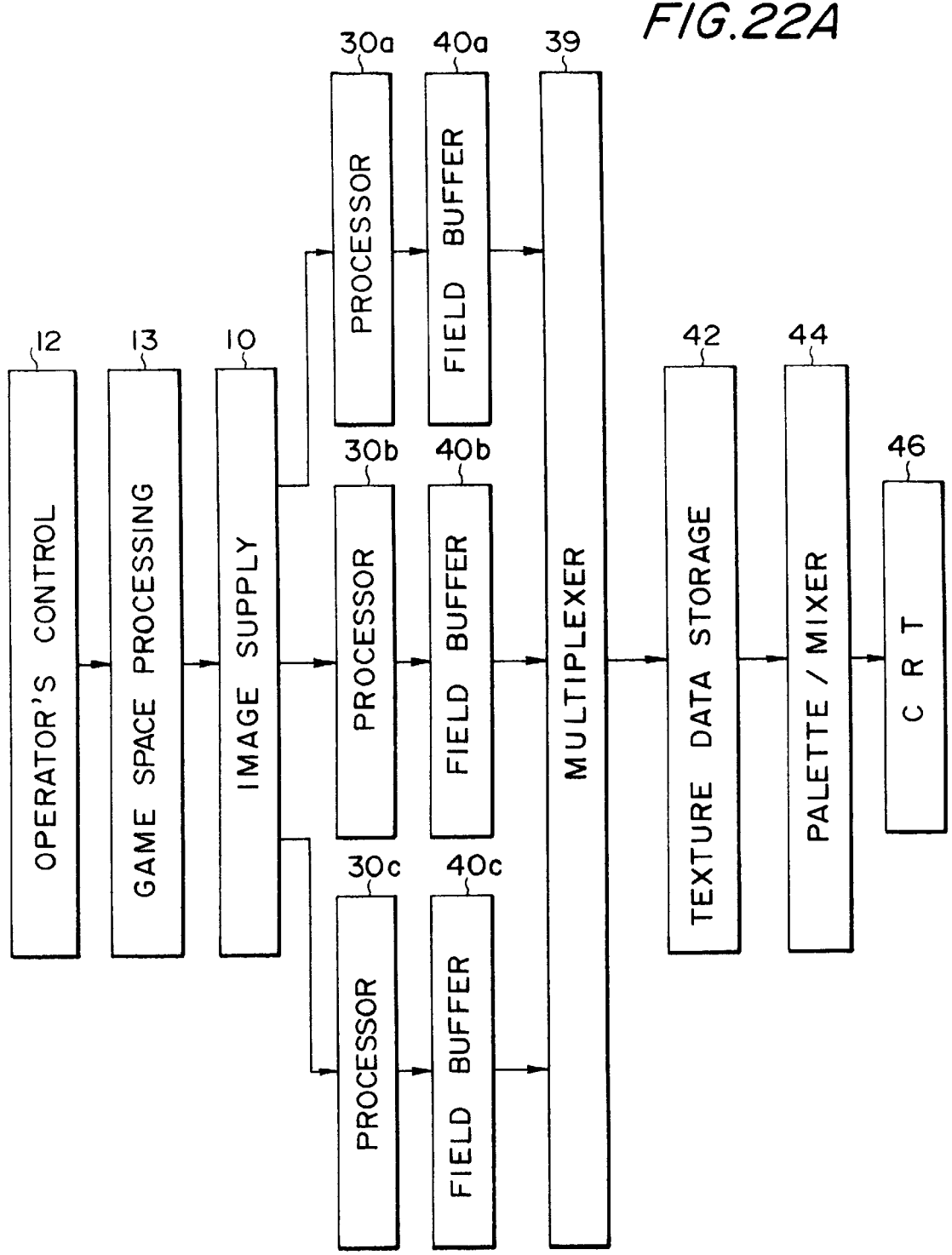
FIGS. 22A and 22 are block diagrams of the parallel image processing computation in forms different from that of FIG. 21.
Figure 22B:
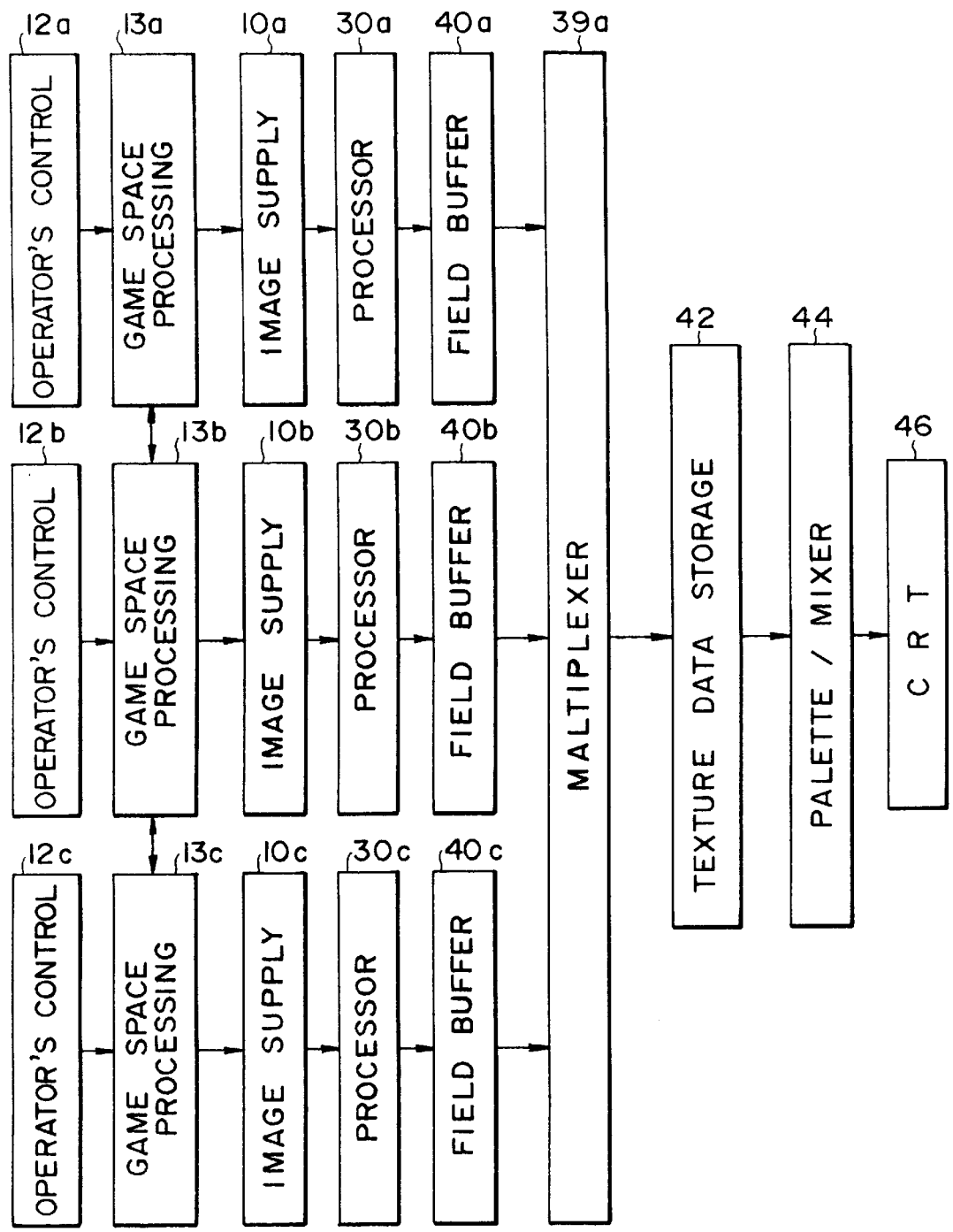

The configuration of the present embodiment for performing the parallel computation is not limited to the illustrated form, but may be realized in any one of various other configurations. For example, as shown in FIG. 22A, a single image supply unit 10 may be used while a set of processor units 30a–30c and a set of field buffer units 40a–40c may be connected in parallel to one another, respectively. This is effective, for example, particularly when the number of processable dots is to be increased to improve resolution of a displayed image. As shown in FIG. 22B, further, all the operator's controls 12a–12c game space processing units 13a–13c image supply units 10a–10c and processor units 30a–30c may be arranged in parallel. This is one effective arrangement which realize a multi-player type game for a plurality of competing players. In such an arrangement, the speed of the processing computation in the hardware can be maintained at a level sufficient to continue the game even if the number of players increases, for example, to three, four or five. Simply by increasing the capacity of a single texture data storage unit 42 with the texture data being detailed, all displayed images observed by the respective players can be very improved.

Figure 23:
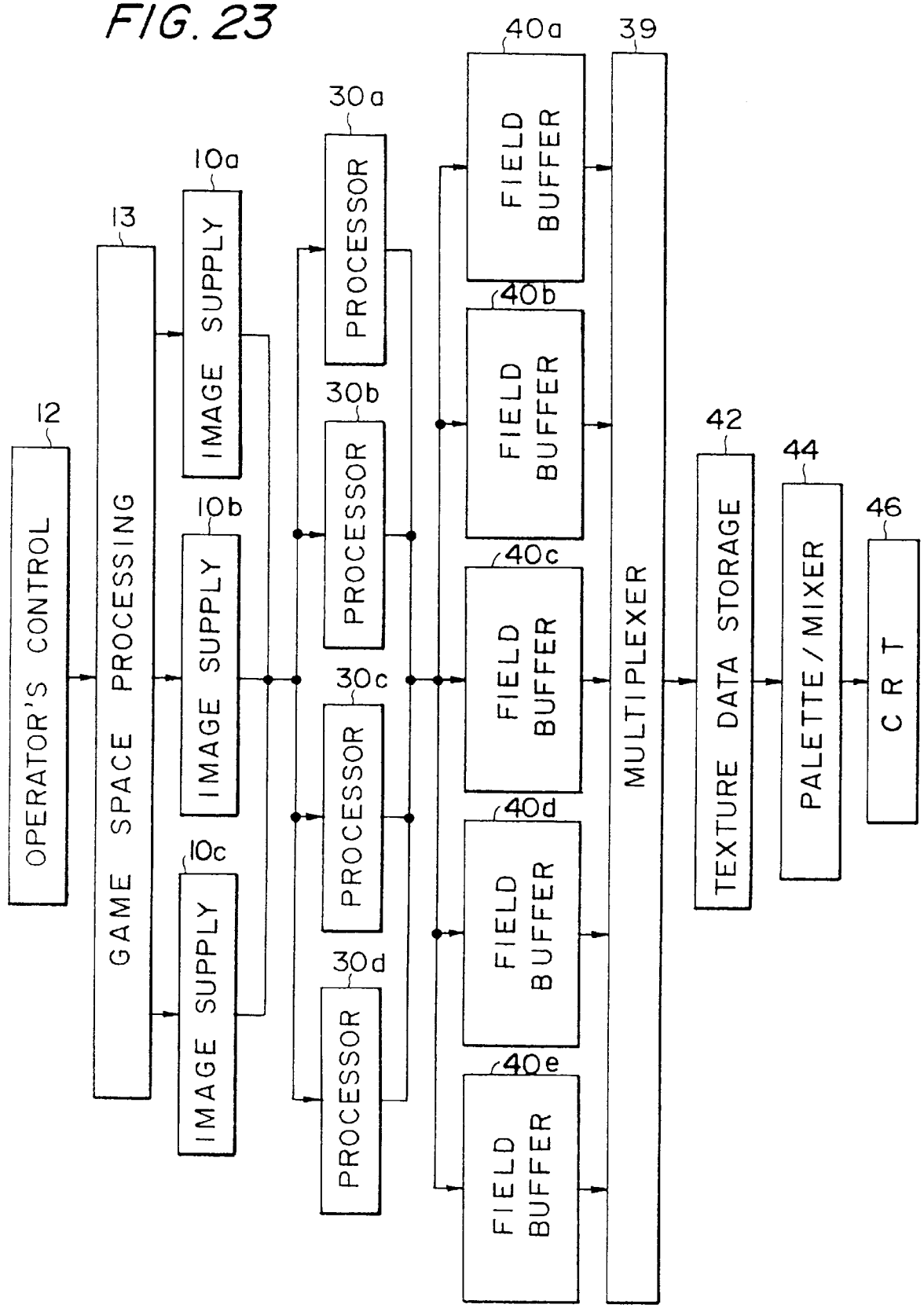
FIG. 23 is a block diagram of the parallel image processing computation in a form different from that of FIG. 21.

For the parallel computation, it is not necessarily required that one image supply unit is combined with one processor unit or one processor unit is combined with one field buffer unit. As shown in FIG. 23, an arrangement is possible to comprise three image supply units (10a–10c), four processor units (30a–30d) and five field buffer units (40a–40e). That arrangement is effective for a case where the number of processable polygons is desired to be increased with the number of processable dots during one field and particularly for a case where the number of processable dots is desired to be increased. Unlike the arrangement shown in FIG. 23, the number of image supply units may be increased while decreasing the number of processor and field buffer units. Where the image supply units 10 are arranged in parallel, only a cart of each image supply unit 10 such as clipping unit 19, perspective-transformation unit 20 and other components may be arranged in parallel.

Although the field buffer units 40 has been described as to its parallel arrangement in addition to those of the image supply units 10 and processor units 30, the present invention may be applied to a non-parallel arrangement of field buffer units 40. In such a case, a single field buffer unit 40 may only be provided in the rearward stage of the multiplexer 39 as shown in FIG. 21.

(10) Simple Background Image Generating Unit

In the present embodiment the texture coordinates are stored in the field buffer unit 40. This can provide a background image generating unit through a very simple technique.

Figure 24:
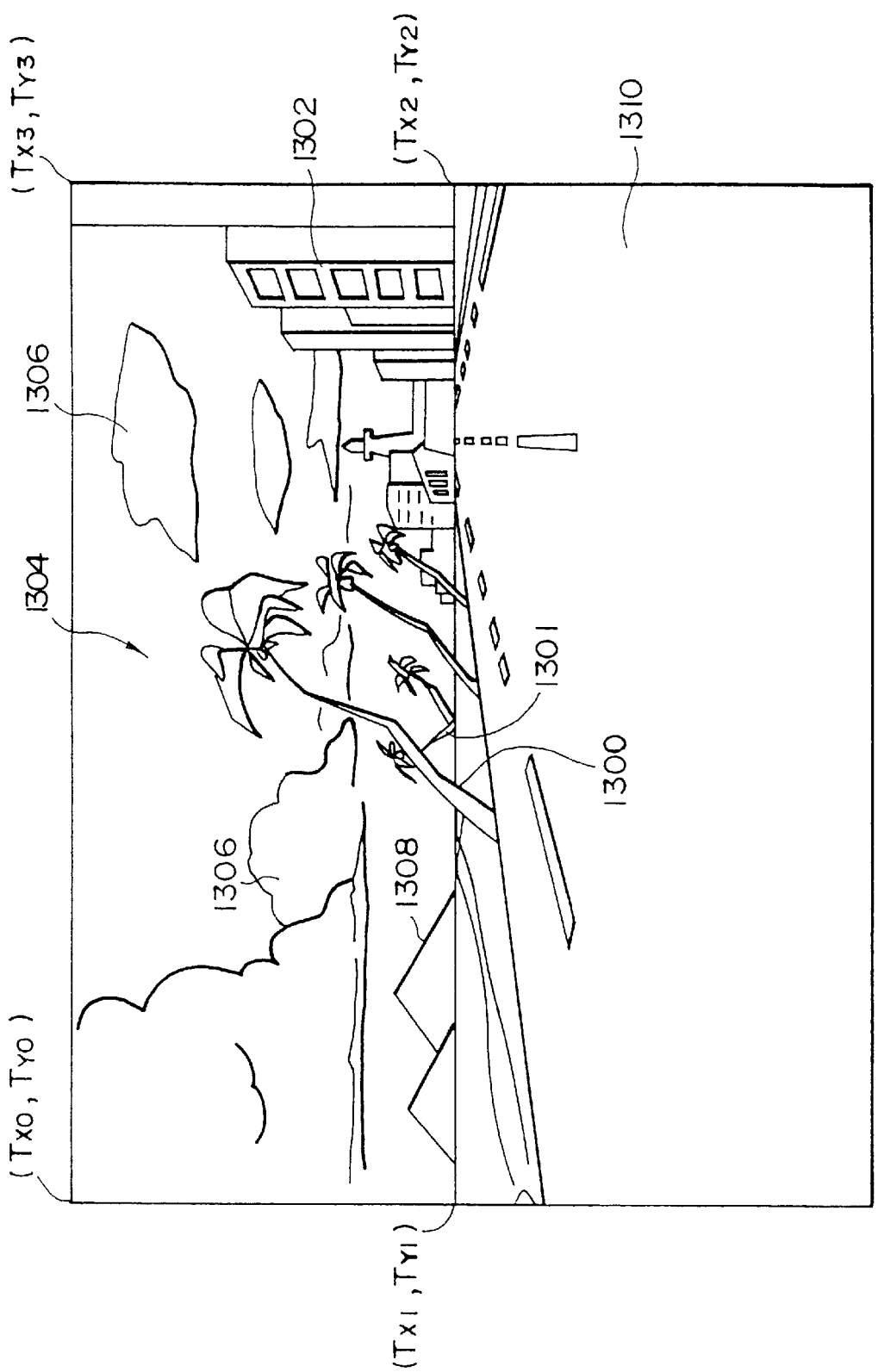
FIG. 24 is a view showing a pseudo 3-D image generated by an image synthesizing system used in a 3-D driving game.

FIG. 24 shows a pseudo 3-D image produced by an image synthesizing system for 3-D driving game. In FIG. 24, trees 1300, buildings 1302 and other objects all of which define the pseudo 3-D image are represented as a set of polygons. Clouds 1306 floating in the sky 1304, mountains 1308 and others can be similarly represented as a set of polygons and the images can be displayed through a 3-D computation and others in a virtual 3-D space. Normally, however, these objects such as clouds 1306, mountains 1308 and others are sufficiently far from the players. Even if the player's view point is variable on proceeding of the game, they do not require such a high-precision 3-D computation as required for the trees 1300, buildings 1302 and others.

Figure 25A:
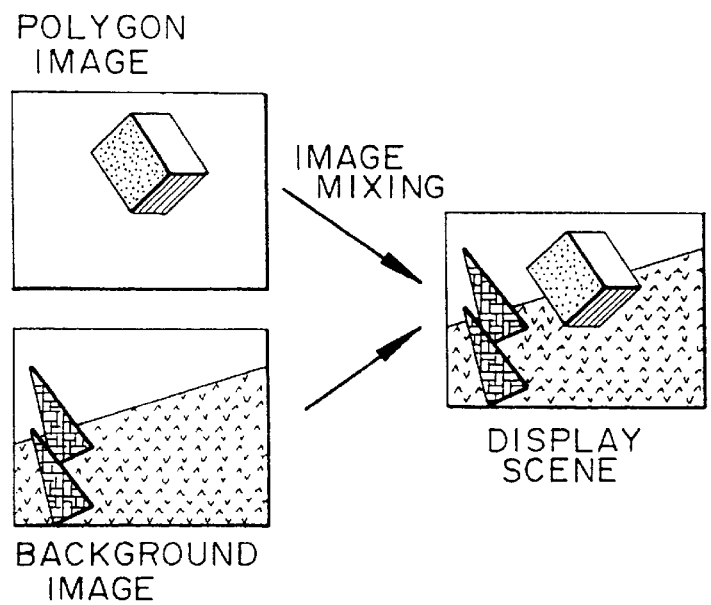
FIG. 25A shows a technique of forming a display scene while separately forming a polygon image and a background image.
Figure 25B:
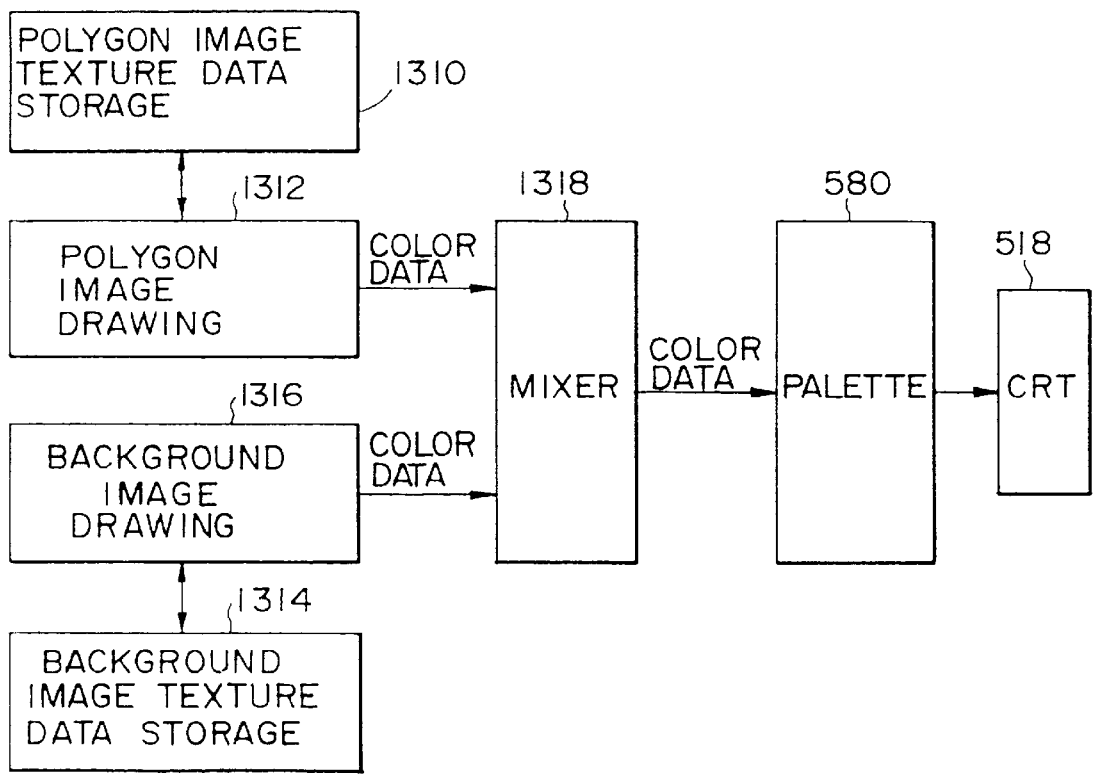
FIG. 25B is a block diagram showing a image synthesizing system used in such a case.

In this case, as shows in FIG. 25A, there is known a technique in which polygon images are formed being separated from the background images, these image being mixed to form images to be displayed. More particularly, the polygon images formed by the trees 1300, buildings 1302 and others and the background images formed by the sky 1304, clouds 1306, mountains 1303 and others are separately formed and mixed together to form images to be displayed. When that technique is used to form an image synthesizing system using the texture mapping, it will be an arrangement as shown in FIG. 25B. In that image synthesizing system, the texture data storage unit comprises a polygon image texture data storage unit 1310 and a background image texture data storage unit 1314. Polygon image drawing unit 1312 and background image drawing unit 1316 are used to read out color data being texture data from these texture data storage units 1310 and 1314. The read color data are mixed together to form a scene to be displayed at a mixer circuit 1318.

As shown in FIG. 24B, however, this image synthesizing system must comprise two texture data storage units 1310 and 1314 for polygon and background images. This leads to increase of the hardware in scale. In this case, it may be considered that these texture data storage units are combined into a common unit. However, such a common arrangement requires two accesses to the common texture data storage unit per one dot clock. This is disadvantageous in that the processing speed is reduced.

The image synthesizing system shown in FIG. 25B further newly requires a mixer circuit 1318 for mixing the color data together. This mixer circuit 1313 is required to mix images as by comparing and judging Z-coordinate (depth-coordinate) at each of dots forming the polygon images with Z-coordinate at each of dots forming the background images. This requires a relatively large-scale circuit and then leads to increase of the hardware in scale.

In the contrast, in the image synthesizing system of this embodiment, the texture coordinates are stored in the field buffer unit 40. Therefore, the image synthesization by separating the polygon and background images can be realized simply by adding a background image generating unit 240 of such a very simple structure as shown in FIG. 26.

Figure 26B:
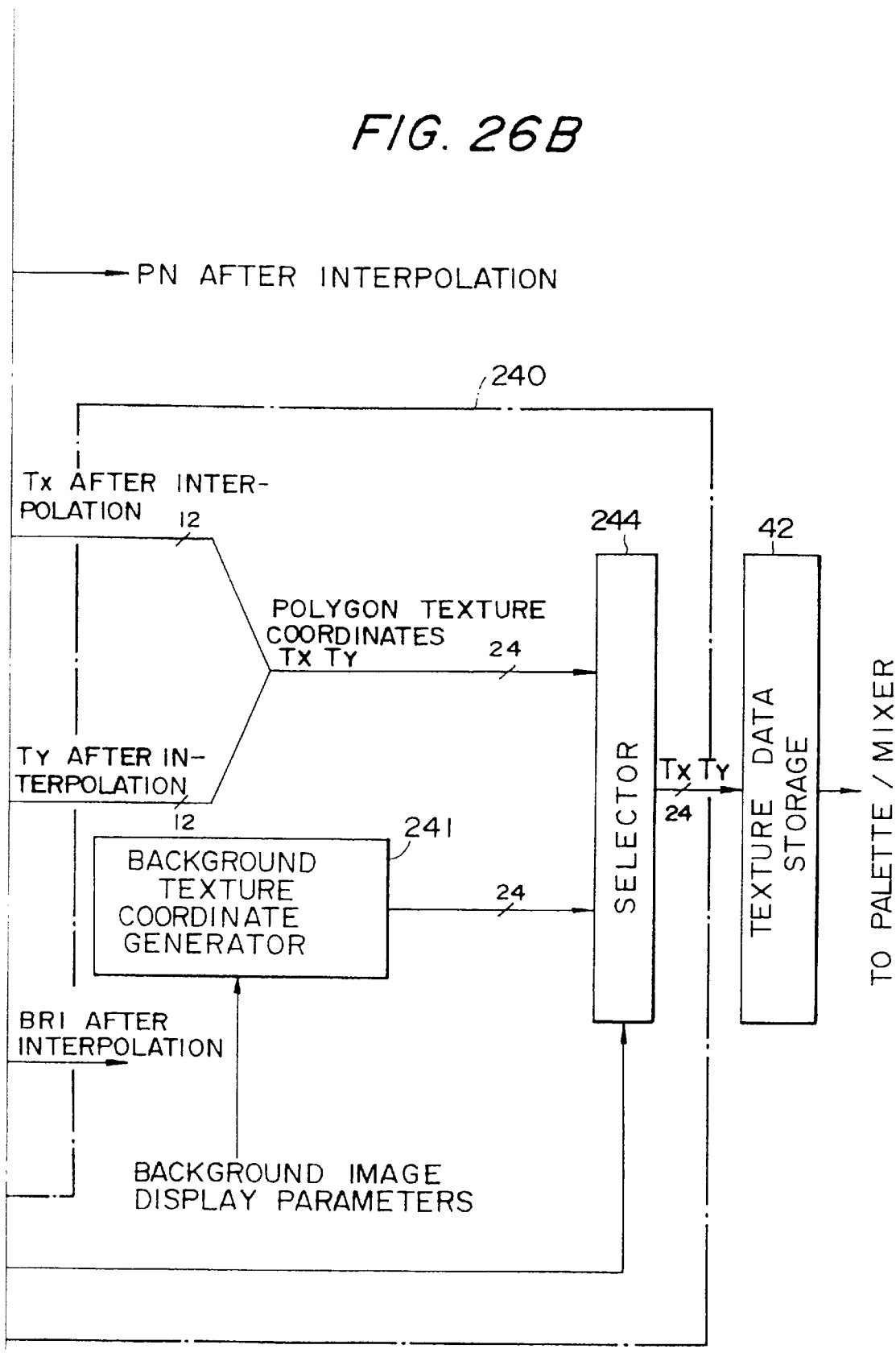

As will be apparent from comparison between FIGS. 26 and 16, this image synthesizing system is formed by adding the background image generating unit 240 to the arrangement as shown in FIG. 16. A background texture coordinate generating unit 241 is used herein to generate background image depending on given background image display parameters. A background dot judgment unit 242 is used to judge whether or not drawing dots are background dots. A selector 244 is used to select polygon or background texture coordinates, depending on whether the drawing dots are polygon or background dots.

Figure 27:
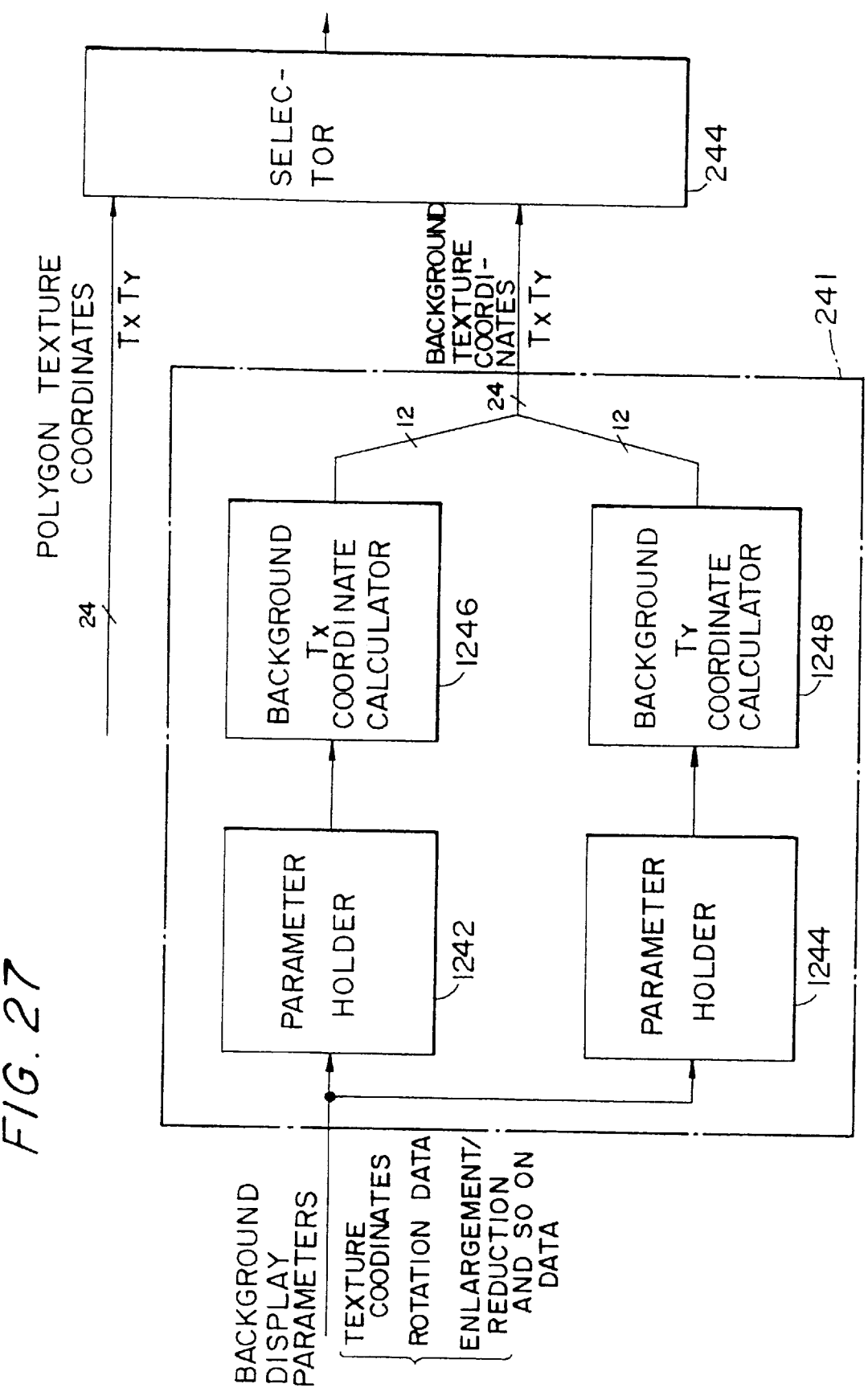
FIG. 27 is a block diagram of a background texture coordinate generating unit.

FIG. 27 exemplifies an arrangement of the background texture coordinate generating unit 241. As shown in FIG. 27 the background texture coordinate generating unit 241 comprises parameter holding units 1242, 1244, a background TX coordinate computing unit 1246 and a background TY coordinate computing unit 1248.

Background image display parameters inputted into the background texture coordinate generating unit 241 are held in the parameter holding units 1242 and 1244. The background image display parameters relate to background texture coordinates display locations background rotation data, enlargement data, reduction data and other data.

The background TX coordinate computing unit 1246 and background TY coordinate computing unit 1248 perform the computations depending on the rotation, enlargement, reduction and other data which are set at the parameter holding units 1242 and 1244. For example, in the pseudo 3-D image shown in FIG. 24, (TX0, TY0)—(TX3, TY3) are provided as background texture coordinates. In other words, all the background images formed by the sky 1304, clouds 1306, mountains 1308 and others will be stored in the texture data storage unit 21 as texture data. It is now assumed that a sports car controlled by a player banks depending on a bank of road 1310. Thus, the background TX coordinate computing unit 1246 and background TY coordinate computing unit 1248 execute the computations on rotation about Z-axis (in the depth direction) relative to the texture coordinates (TX0, TY0)—(TX3, TY3). As the sports car controlled by the player moves forwardly, the background TX coordinate computing unit 1246 and background TY coordinate computing unit 1248 perform the computation of reduction relative to the texture coordinates (TX0, TY0)—(TX3, TY3).

It is now assumed that the 3-d game represented by the present image synthesizing system is a game in which a player explores a labyrinth. In such a case, the ceiling and floor which form the labyrinth can be taken as backgrounds. The backgrounds such as ceiling and floor will be tilted by executing the rotation about X-axis (in the horizontal direction) relative to the texture coordinates (TX0, TY0)—(TX3, TY3).

Figures 28, 28A, 28B:
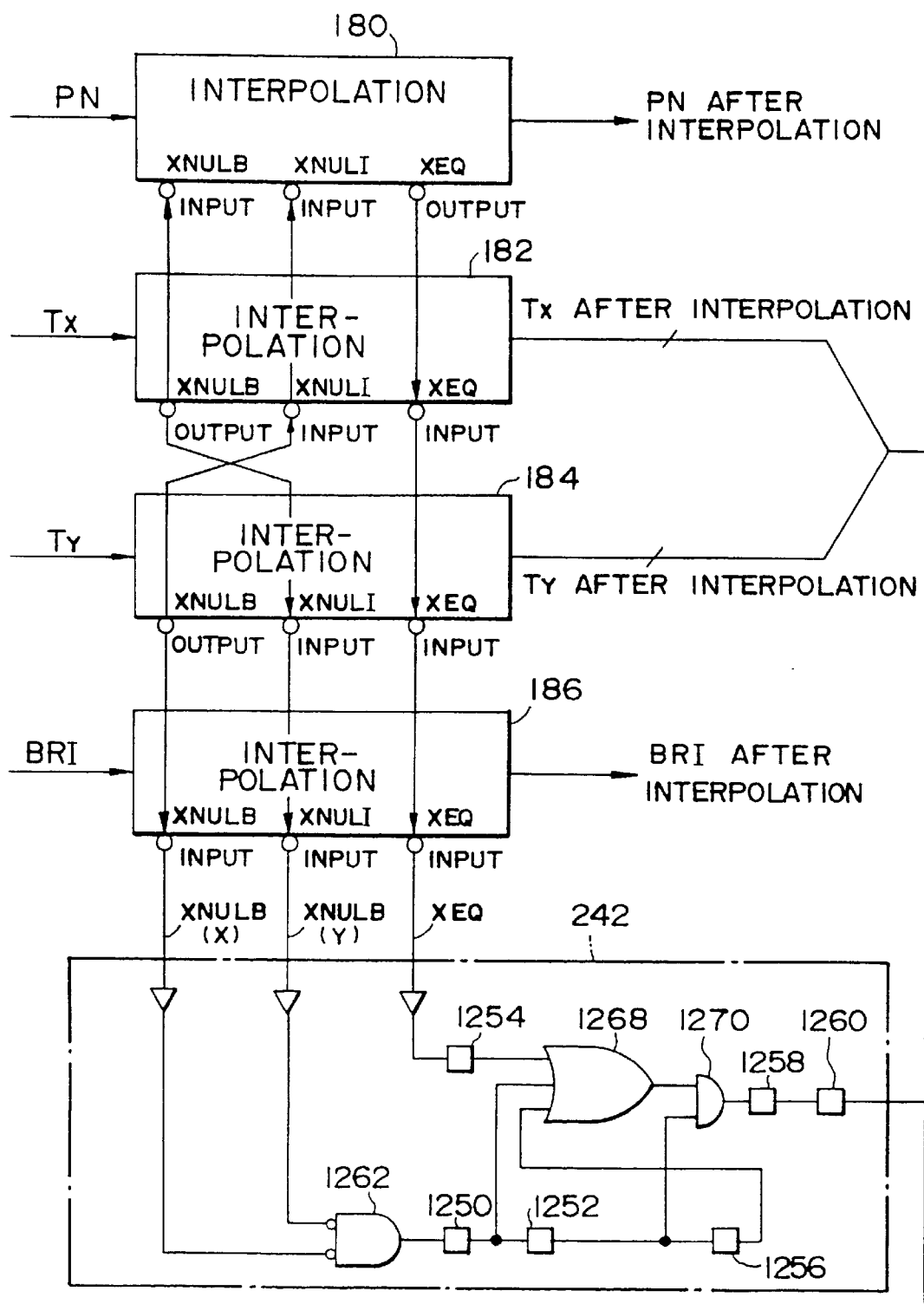
FIGS. 28A and 28B is a block diagram of a background dot judging unit.
Figure 28B:
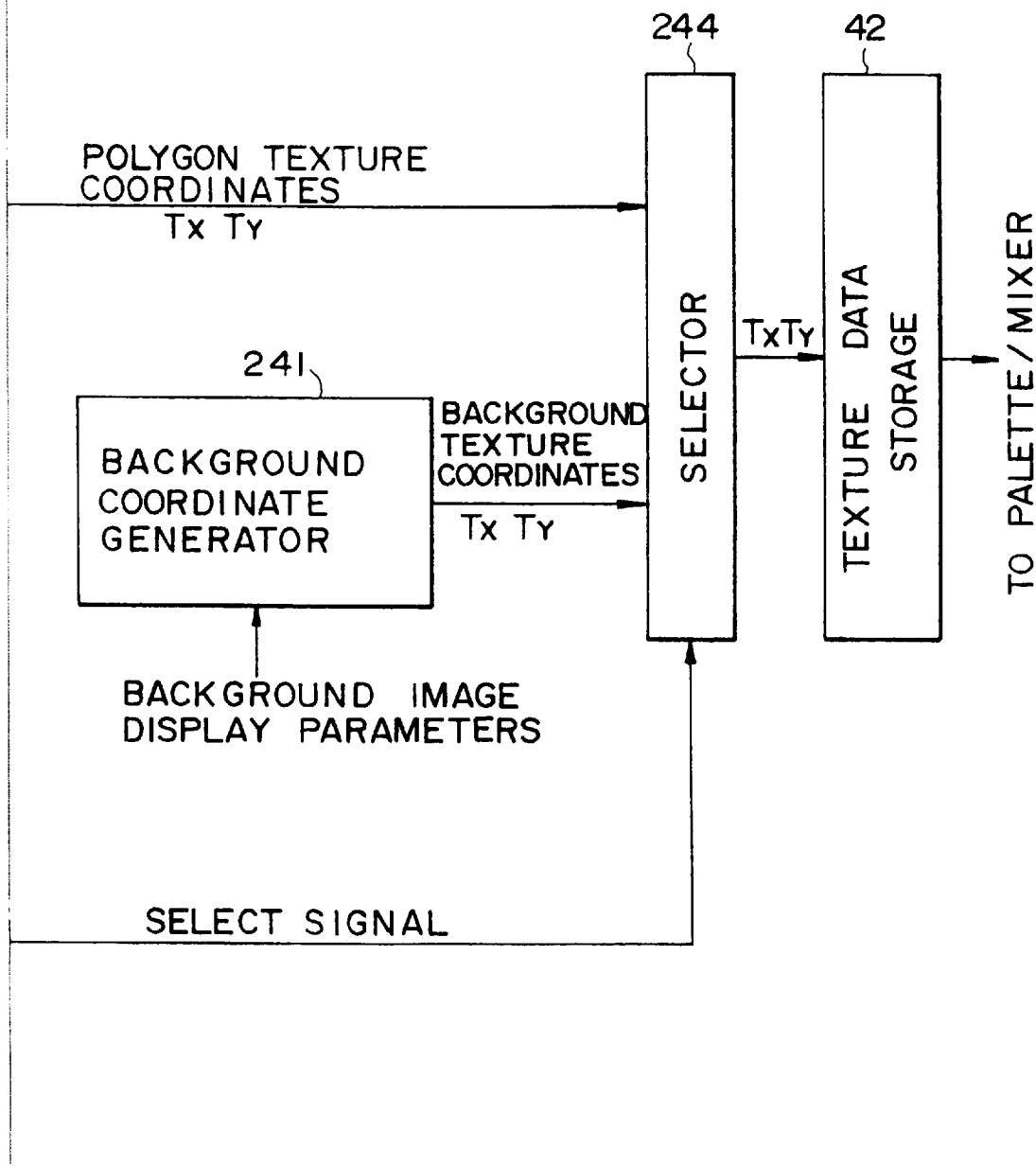

FIG. 28 exemplifies a circuit arrangement of the background dot judgment circuit 242.

In this embodiment, the interpolation is carried out to dots which are empty dots and which have the same polygon identification number PN as those of dots adjacent to the dot to be processed. Dots which are empty dots, but do not have the same PN as those of the adjacent dots are dots representing space between the adjacent polygons and will not be interpolated. Thus, these dots are for the background, for example, dots between threes 1300 and 1301 in FIG. 24 are dots in the space. As described, whether or not the dots are empty can be judged by the output signals XNULB (X) and XNULB (Y) of the interpolation circuits 182 and 184. The output signal XEQ of the interpolation circuit 180 can also be used to judge whether or not the PNs coincide with one another. Therefore, dots in which the XNULB (X) and XNULB (Y) signals are "0" and the XEQ signal is "1" will be judged to be dots used to display the backgrounds.

As shown in FIG. 23, thus, the background dot judgment unit 242 in this embodiment judges whether or not there are dots used to display the backgrounds, depending on the XNULB (X), XNULB (Y) and XEQ signals.

As shown in FIG. 28, the background dot judgment unit 242 comprises registers 1250–1260 and logic circuits 1262–1270. The output of the logic circuit 1262 is "1" when dots to be processed are empty dots. The output of the logic circuit 1268 is "1" when those dots are not to be interpolated. Therefore, the output of the logic circuit 1270 is "1" if dots are empty but not interpolated. This output is inputted into a selector 244 through registers 1258 and 1260 as selector signal. If this selector signal is "1", the selector 244 selects background texture coordinates TX and TY. On the contrary, if the selector signal is "0" the selector 244 selects polygon texture coordinates TX and TY. The texture coordinates so selected are then outputted toward the texture data storage unit 42. Texture data are read out from the texture data storage unit 42 by these selected texture coordinates for every dot. In such a manner, the polygon and background images can be combined as shown in FIG. 25A.

As will be apparent from the foregoing, the present embodiment provides a very simple arrangement which can synthesize images while separating the polygon and background images. Particularly, when it is required to perform the subsampling/interpolation through the interpolation circuits 180–186 and others, a necessary and minimum circuit may only be added to the system. Further, the present embodiment does not require two separate texture data storage units for polygon and background images. Furthermore, a common texture data is available to the polygon and background images in common. The circuit scale of the texture data storage unit 42 which has a very large storage capacity and must have a further large storage capacity to improve the quality of images can be maintained necessary and minimum. Since the texture data storage unit 42 can be formed as a single unit, reading the texture data from the texture data storage unit 42 may be performed only by one access per dot clock. Generally, thus, time required to read the texture data from the texture data storage unit 42 can be shortened to reduce the processing time in the image synthesizing system. Further, there is not required such a synthesizing circuit 1318 as shown in FIG. 25B, that is, a complicated and large-scaled circuit which can inhibit the whole speed of the image synthesizing system. In such a manner, the quality of image synthesization can be improved while putting up processing speed of the hardware with its scale being reduced.

(11) Logic-Arithmetic Circuit usable as Texture Data Storage Unit

The texture data storage unit is not limited to the storage means for texture data like ROM or RAM, but may be realized in the form of a function for inputs such as texture coordinates or the like. In such a case, the texture data storage unit may be formed as a logic-arithmetic circuit.

Figure 29:
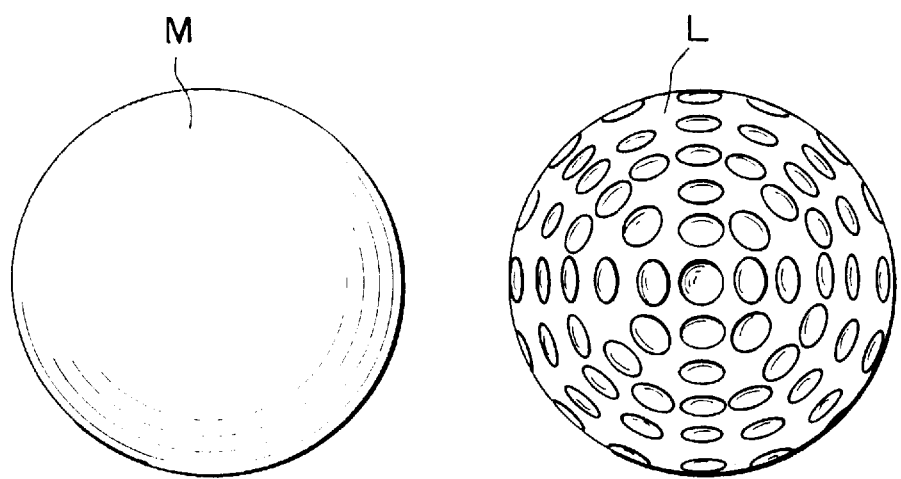
FIG. 29 is a schematic view illustrating the bump mapping.

Color data have been described as texture data applied to the polygons. The present invention is not limited to texture data, but may be applied to all kinds of rendering data which can be applied to the polygons. For example, surface shape data may be applied to the polygons. That mapping technique is known as bump mapping. According to the technique, a crater-like mapping as shown by L may be carried out relative to a 3-D object M as shown in FIG. 29.

The bump mapping is also called perturbation mapping which has perturbation components (which are frequently displacements of normal vectors) relative to the surface shape of an article as texture data. The texture data comprising the perturbation components will be referred to bump. Texture coordinates used to read out the bump texture data will be referred to bump texture coordinates BX and BY.

Figure 30:
FIG. 30 is a schematic view illustrating the concept of the perturbation bump mapping.

The present embodiment has "a normal rector on the polygon surface" as a kind of attribute data (constant for each polygon). The "normal vector on the polygon surface" is subjected to perturbation for every dot through the perturbation components. Thus, a normal vector N for each dot will be determined. This manner is shown in FIG. 30.

When the normal vector for each dot is determined, the brightness data BRI for each dot is determined based on the normal vector data. In such a case, a lighting model is required to determine the brightness data BRI from the normal vector for each dot.

In the present embodiment the lighting model includes parallel rays from a single light source specular reflection, diffuse reflection and ambient light. The lighting model may be computed by the use of the following formula that is called a shading function and obtained theoretically in part but empirically in part:

$$BRI = I_a K_a + \{II/(Z+K)\} \times (K_d \cos \Phi + K_s \cos^n \psi), \quad (1)$$

where

BRI: rightness data for each dot;
Ia: Intensity of ambient light;
II: Intensity of incident light;
Ka: Diffuse reflection coefficient of ambient light [0];
Kd: Diffuse reflection coefficient [0];
Ks: Specular reflection coefficient [0];
 (a: ambient)
 (d: diffuse)
 (s: specular)
K: Constant (for correcting the brightness in a less distant object) [F];

Z: Z-axis coordinate for each dot [0 in certain cases];
φ: Angle between a light source vector L and a normal vector N;=Angle between a reflective light vector R and a normal vector N;
ψ: Angle between a reflective light vector R and a visual vector E=[0, 0, 1]; and
n: Constant (sharpness in highlight) [0]
 [F]: Constant for each scene (field).
 [0]: Constant for each object (or polygon).

The angles φ and ψ in the formula (1) are determined using the normal vectors N determined by the interpolation. If necessary, Z-axis coordinates may be determined for each dot. The other coefficients are given as attribute data for each polygon. When these data are substituted into the formula (1), brightness data for each dot will be determined.

Thus, by determining the brightness data for each dot and also determining the color data on this brightness data for each dot, an image in which crater-like forms are applied to the surface of an article can be synthesized, as shown in FIG. 29.

When such a bump mapping is used, the surface shape data of the article, such as normal vector data or normal vector perturbation components, will be stored in the texture data storage unit. The surface shape data will be read out through the bump texture coordinates. However, the present embodiment is not limited to this case, but may be used to apply a given function computation to the bump texture coordinates to determine the surface shape data for each dot.

Figure 31A:
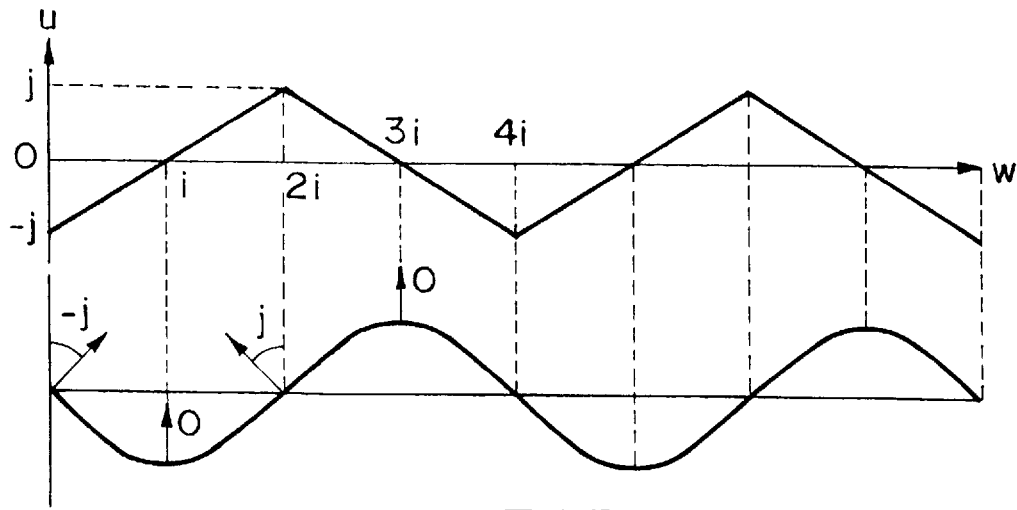
FIGS. 31A–31C are schematic views illustrating a texture data storage unit which is formed by a logic-arithmetic circuit.

Since a zigzag-shaped function as shown in FIG. 31A is a complex of linear functions, the zigzag-shaped function can be expressed by:

$$u = \begin{pmatrix} +\{(j/i) \cdot (w \bmod 2i) - j\} & ((w \bmod 4i) < 2i) \\ -\{(j/i) \cdot (w \bmod 2i) - j\} & ((w \bmod 4i) \geq 2i) \end{pmatrix}$$

where w is bump texture coordinate (Bx, By); u is perturbation component (α,β); and i and j are constants (a mod b means a remainder in division a/b). This function can generate the surface shape of a pseudo sin curve. The function has various uses since it is the most basic bump. The function may be applied to both the bump texture coordinates Bx and/or By.

Figure 31B:
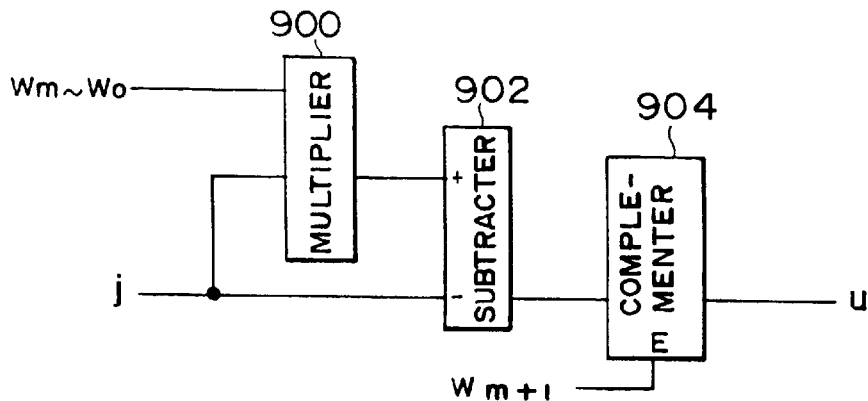

If the constant i is a multiple of 2, there may be realized a circuit comprising such multiplier 900, subtracter 902 and complementer 904 as shown in FIG. 31B.

Then $W_m$–$W_0$ (low order m+1 bits of W) and j are inputted to the multiplier 900. And low order m bits of the multiplier 900 output is rounded off before being inputted to the subtracter 902. An output of the subtracter 902 is inputted to the complementer 904 which has $W_{m+1}$ (bit m+1 of W) as an E input.

Figure 31C:
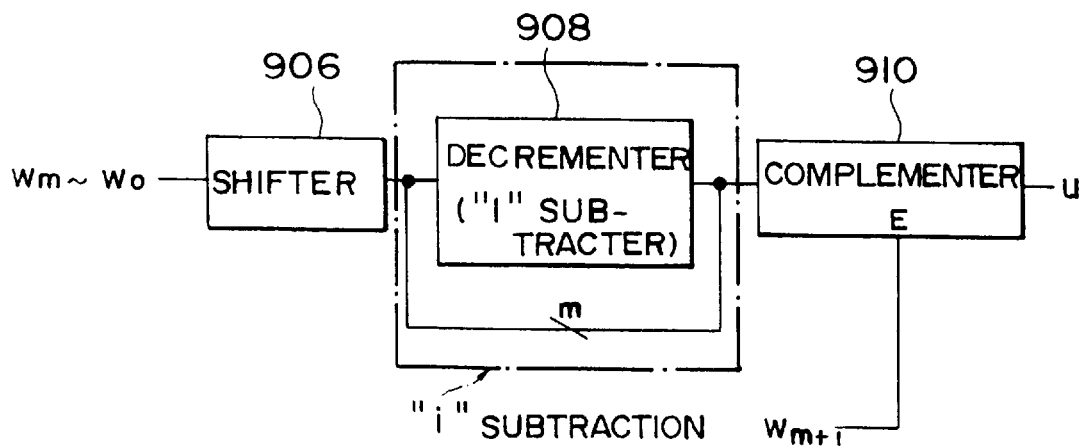

If the constant j is also a multiple of 2, the circuit may further be simplified as shown in FIG. 31C. Such a circuit comprises a shifter 906, a decrementer 908 and a complementer 910, $W_m$–$W_0$ (low order m+1 bits of W) are inputted to the shifter 906, which operates to fix the input to one of the following three conditions.

i<j (m<n): add (j−i) number of bits of "0" as low order bits (leftward shifting)
 i=J (m=n): no action
 i>j (m>n): delete (i−j) number of low order bits (rightward shifting)

An output of the shifter 906 is inputted to the decrementer 908 except for the lowest order m bits which will be inputted to the complementer 910 bypassing the decrementer 908. An E input of the complementer 910 has $W_{m+1}$ (bit m+1 of W) inputted.

The shifter 906 is not an active circuit, but merely one that is expressed by drawing difference wirings of the respective bits into a black box. If the attribute data contains the depth data BDEPTH of the bumps, the circuit shown in FIG. 31C is sufficient to accomplish the objects of the present invention.

Figure 32A:
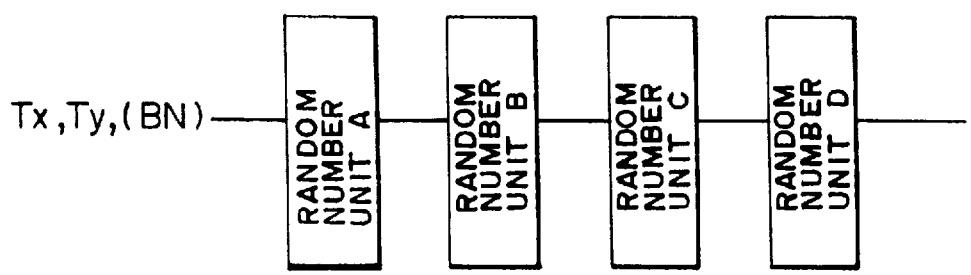
FIGS. 32A and 32B are schematic views illustrating a logic-arithmetic circuit which is formed by a random number generator.
Figure 32B:
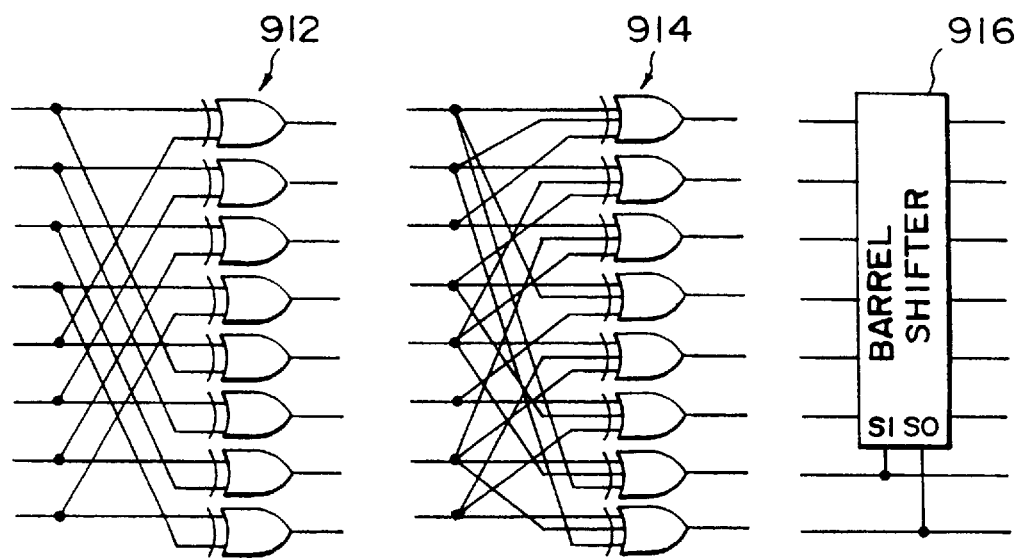
Figure 33:
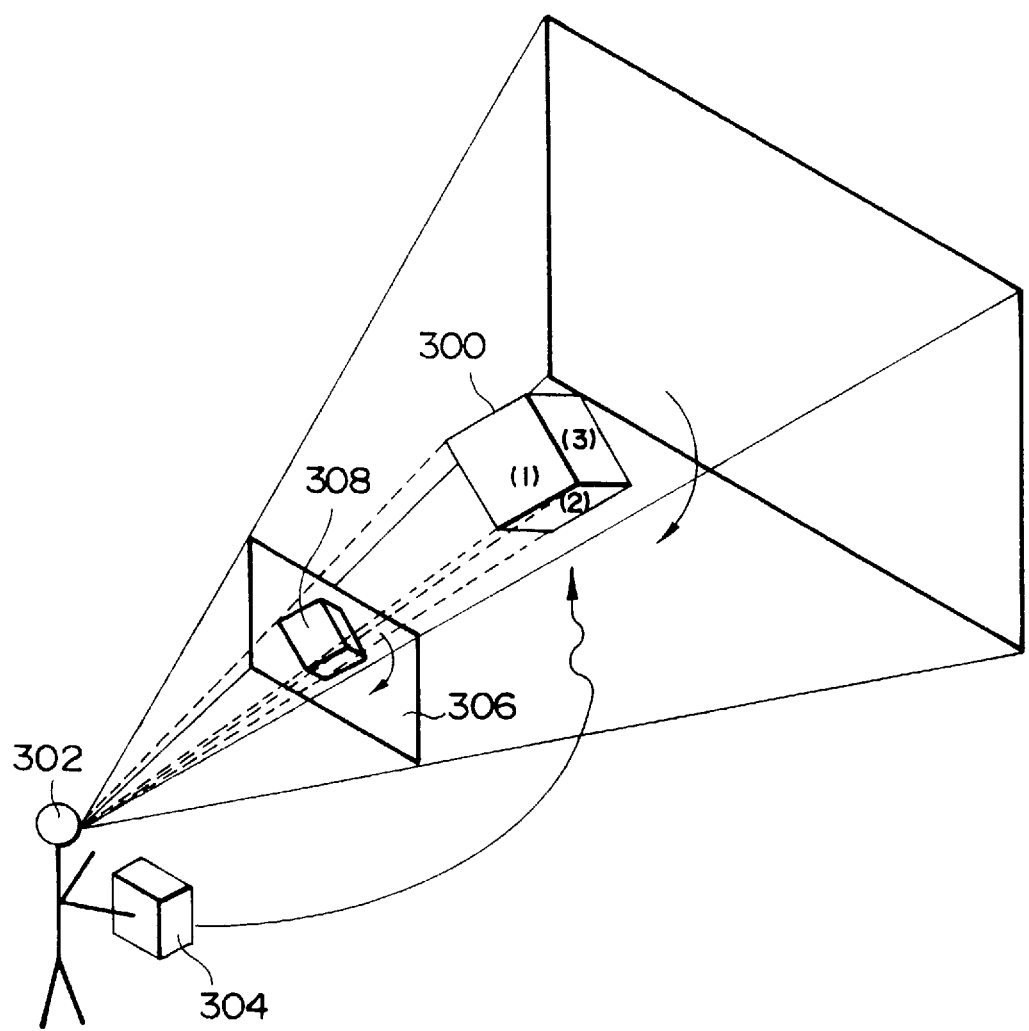
FIG. 33 is a schematic view illustrating the concept of an image processing system constructed in accordance with the prior art.
Figure 34:
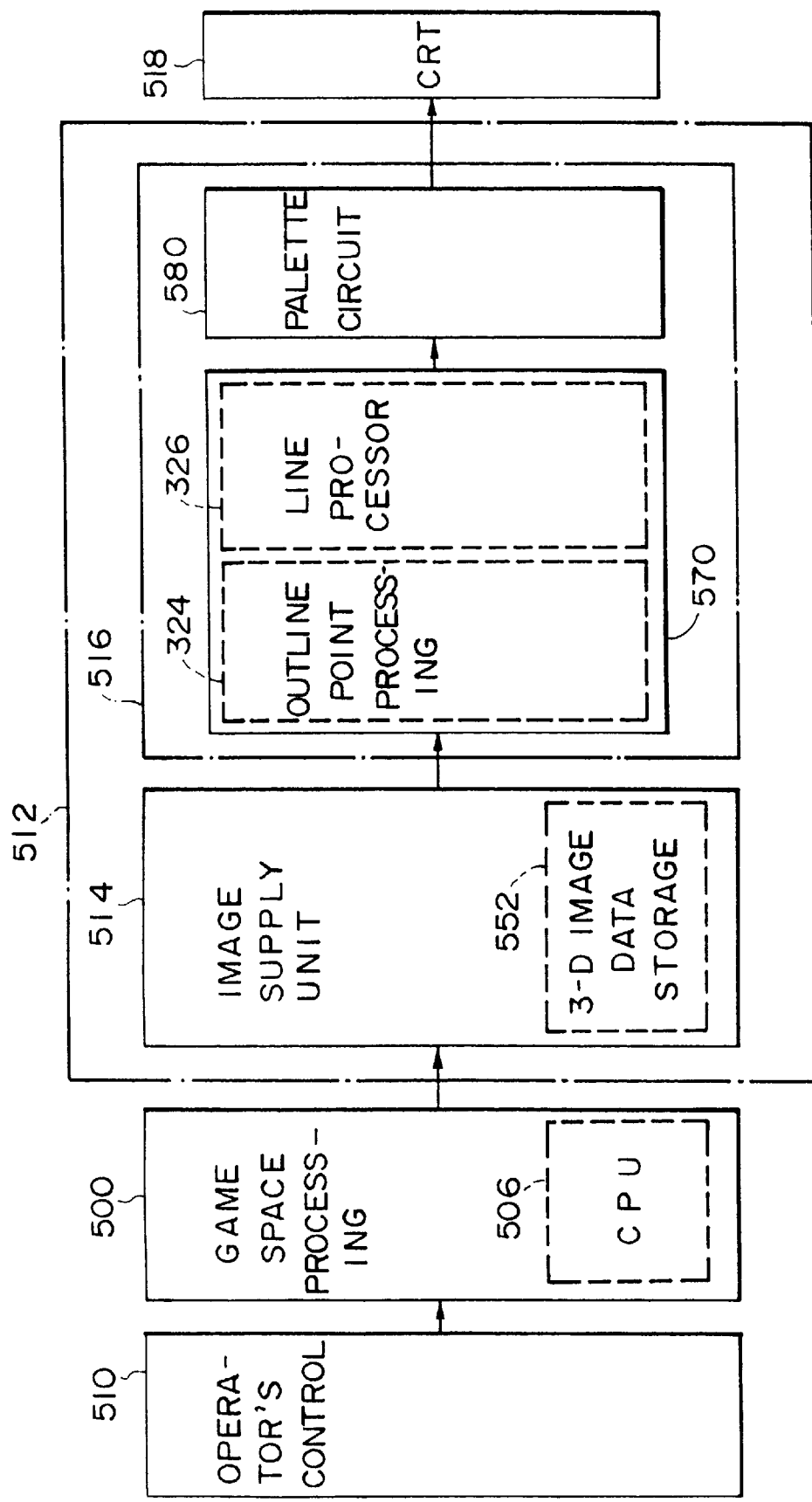
FIG. 34 is a block diagram of an image processing system constructed in accordance with the prior art.
Figure 35:
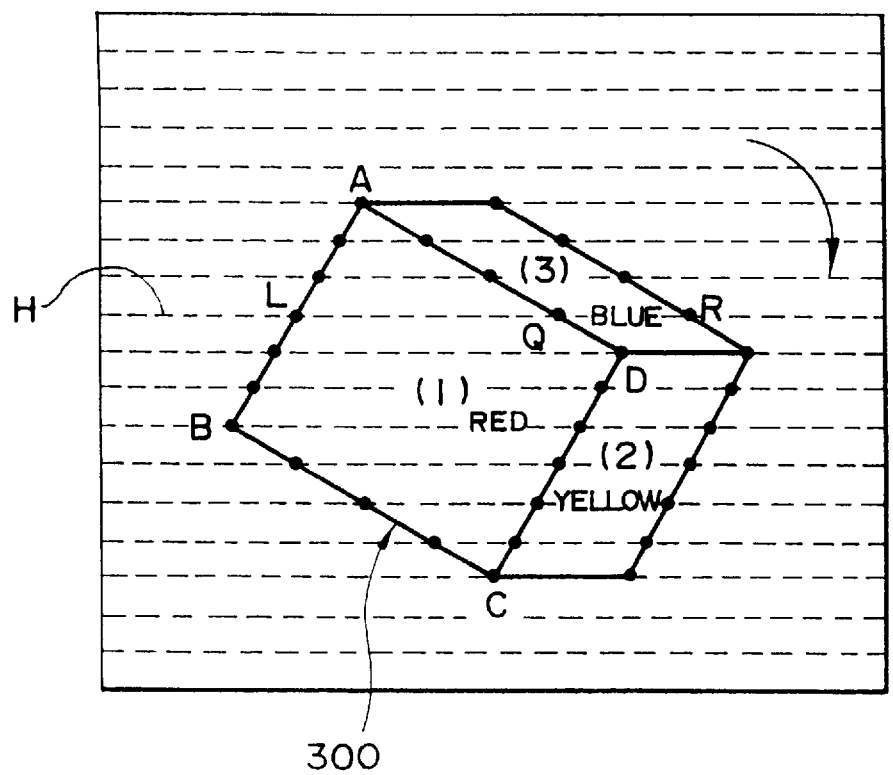
FIG. 35 is a schematic view illustrating a pseudo 3-D image projected onto a screen.

One of the simple and very useful elements is a random number generator which generates uniformized pseudo random numbers relative to the input of texture coordinates or the like. This is shown in FIG. 32A. The random number generating circuit is united to provide a multi-stage structure consisting of random number units A–D. As shown in FIG. 32, various random number units 912, 914, 916 may be selected to find an appropriate bump pattern.

The present invention is not limited to the aforementioned embodiments, but may be carried out in various changes and modifications within the scope of the invention.

For example, the storage device defining the texture data storage means can be replaced by any one of various types such as EEPROM, SRAM, DRAM, mask ROM and the like.

The texture data (rendering data) stored in the texture data storage unit may be in any form of various data such as color data, surface shape data, brightness data, transparency data, diffuse-reflectance data and the like. For example, when the transparency data is used as the rendering data, a misty object can be represented such that part of the object changes from transparent to semi-transparent and from semi-transparent to transparent. When diffuse-reflectance data is used as the rendering data, an object having different glossy parts can be represented.

The texture mapping technique by which textures are applied to the polygons may be replaced by any one of various texture mapping techniques known in the art. For example, a technique may be used in which textures are directly applied to polygons through the linear interpolation at the sacrifice of some degradation in image quality. Further, a texture fragmentation algorithm may be used to fragment a texturing surface patch into subpatches for texture mapping. The interpolation used when the textures are applied to polygons may be performed by a given function such as quadratic function or the like. A further technique may be considered that a relational formula between the vertex coordinates X, Y and Z of a polygon and the texture coordinates in a polygon to be interpolated is determined on perspective-transformation the relational function being then used to interpolate the texture coordinates to be determined. There may further be used a technique described in SHIBAMOTO Takeshi and KOAYASHI Makoto, "*Texture Mapping* (1)" *in the collected papers of Thirty-First Information Processing Institute Lecture.* Sep. 9, 1985. Such a technique subjects the perspective-transformed representing coordinates for each vertex in a polygon to an inverse perspective-transformation such that they are returned to their original states. Based on the texture coordinate corresponding to each vertex, a "transformation matrix" is determined that transforms the representing coordinates before being perspective-transformed into texture coordinates. The respective texture coordinates for every dot on the polygon are inversely perspective-transformed and the texture coordinates are determined by the transformation matrix.

The rate of subsampling in the subsampling/interpolation means is not limited to one-half, but may be any of one-third, one-fourth and so on. In that case, interpolation in the interpolation means is carried out for a plurality of dots such as two dots or three dots. The "dots adjacent to dots to be processed" mean a left-hand dot adjacent to the leftward-most dot among the dots to be processed and a right-hand dot adjacent to the rightward-most dot. In such a case, the subsampling/interpolation means may use a linear interpolation or the like.

The shape of the texture mapped on a polygon is not limited to the same or substantially the same configuration as that of the polygon, but may be mapped in any one of various configurations. For example, by mapping a texture completely different in shape from a polygon, a special image effect such as distorted texture can be provided.

Although she embodiments have been described without any particular distinction between "scan line in computation" and "CRT scan line",these scan lines may be different from each other and, for example, intersect With each other, depending on the limitation on hardware such as SAM capacity of the video RAM or the like.

We claim:

1. An image synthesizing system for forming a displayed image which includes a polygon image and a background image comprising:

an image computing unit for determining coordinates of dots in polygons forming said polygon image and polygon texture coordinates corresponding to said coordinates of dots, said coordinates of dots and said polygon texture coordinates being determined by three dimensional computation which includes perspective transformation, a field buffer unit for storing said polygon texture coordinates determined by said image computing unit at an address specified by said coordinates of dots, instead of storing color data, a background dot judgment unit for judging that a dot not used to display polygons in the displayed image is a background dot, a background texture coordinate generating unit for generating background texture coordinates by given computation, a selector for selecting for output one of said polygon texture coordinates input from said field buffer unit and said background texture coordinates input from said background texture coordinate generating unit, based on a judgment of said background dot judgment unit, and a rendering data storage unit for storing rendering data which include color data at an address specified by said polygon texture coordinates and said background texture coordinates input from said selector, wherein said rendering data storage unit is shared by said field buffer unit and said background texture coordinate generating unit.

2. The image synthesizing system as defined in claim 1 wherein said background texture coordinate generating unit varies said background texture coordinates to perform at least one of two dimensional rotation and two dimensional scaling of said background image.

3. The image synthesizing system as defined in claim 2, wherein empty dot information is written to a dot not used to draw the polygon image and said background dot judgment unit judges that a dot is used to draw the background image when said empty dot information is written to a dot to be processed.

4. The image synthesizing system as defined in claim 3, further comprising an interpolation unit and wherein said image computing unit computes coordinates of subsampled dots and corresponding subsampled polygon texture coordinates, said subsampled polygon texture coordinates and a polygon identification number for identifying a polygon are written in said field buffer unit, said interpolation unit carries out interpolation of the subsampled polygon texture coordinates written in said field buffer unit, based on said empty dot information and said polygon identification number, and said background dot judgment unit judges whether or not a dot to be processed is the background dot, based on said empty dot information and said polygon identification number.

5. An image synthesizing system as defined in claim 4, wherein said subsampling in said image computing unit is carried out by ignoring a plurality of dots and wherein the background dot judgment in said background dot judgment unit and said interpolation are carried out for a plurality of dots.

6. The image synthesizing system as defined in claim 1, wherein empty dot information is written to a dot not used to draw the polygon image and said background dot judgment unit judges that a dot is used to draw the background image when said empty dot information is written to a dot to be processed.

7. The image synthesizing system as defined in claim 6, further comprising an interpolation unit and wherein said image computing unit computes coordinates of subsampled dots and corresponding subsampled polygon texture coordinates, said field buffer unit stores said subsampled polygon texture coordinates and a polygon identification number for identifying a polygon, said interpolation unit carries out interpolation of the subsampled polygon texture coordinates written in said field buffer unit, based on said empty dot information and said polygon identification number, and said background dot judgment unit judges whether or not a dot to be processed is a background dot, based on said empty dot information and said polygon identification number.

8. An image synthesizing system as defined in claim 7, wherein said subsampling in said image computing unit is carried out by ignoring a plurality of dots and wherein the background dot judgment in said background dot judgment unit and said interpolation are carried out for a plurality of dots.

9. An image synthesizing system for forming a displayed image which includes a polygon image and a background image comprising:

an image computing unit for determining coordinates of dots in polygons forming said polygon image and polygon texture coordinates corresponding to said coordinates of dots, said coordinates of dots and said polygon texture coordinates being determined by three dimensional computation which includes perspective transformation, a field buffer unit for storing said polygon texture coordinates determined by said image computing unit at an address specified by said coordinates of dots, instead of storing color data, a background dot judgement unit for judging that a dot not used to display polygons in the displayed image is a background dot, a background texture coordinate generating unit for generating background texture coordinates by given computation, a selector for selecting for output one of said polygon texture coordinates input from said field buffer unit and said background texture coordinates input from said background texture coordinate generating unit, based on a judgement of said background dot judgement unit, and a function computing unit that applies function computation to said polygon texture coordinates and said background texture coordinates to determine rendering data which include color data, wherein said function computing unit is shared by said field buffer unit and said background texture coordinate generating unit.

10. The image synthesizing system as defined in claim 9, wherein said background texture coordinate generating unit varies said background texture coordinates to perform at least one of two dimensional rotation and two dimensional scaling of said background image.

11. The image synthesizing system as defined in claim 10, wherein empty dot information is written to a dot not used to draw the polygon image and said background dot judgment unit judges that a dot is used to draw the background image when said empty dot information is written to a dot to be processed.

12. The image synthesizing system as defined in claim 11, further comprising an interpolation unit and wherein said image computing unit computes coordinates of subsampled dots and corresponding subsampled polygon texture coordinates, said subsampled polygon texture coordinates and a polygon identification number for identifying a polygon are written in said field buffer unit, said interpolation unit carries out interpolation of the subsampled polygon texture coordinates written in said filed buffer unit, based on said empty dot information and said polygon identification number, and said background dot judgment unit judges whether or not a dot to be processed is the background dot, based on said empty dot information and said polygon identification number.

13. The image synthesizing system as defined in claim 9, wherein empty dot information is written to a dot not used to draw the polygon image and said background dot judgment unit judges that a dot is used to draw the background image when said empty dot information is written to a dot to be processed.

14. The image synthesizing system as defined in claim 13, further comprising an interpolation unit and wherein said image unit computes coordinates of subsampled dots and corresponding subsampled polygon texture coordinates, said field buffer unit stores said subsampled polygon texture coordinates and a polygon identification number for identifying a polygon, said interpolation unit carries out interpolation of the subsampled polygon texture coordinates written in said field buffer unit, based on said empty dot information and said polygon identification number, and said background dot judgment unit judges whether or not a dot to be processed is a background dot, based on said empty dot information and said polygon identification number.

* * * * *